United States Patent [19]
Haneda et al.

[11] Patent Number: 6,016,502
[45] Date of Patent: Jan. 18, 2000

[54] DATA PROCESSING APPARATUS

[75] Inventors: Isamu Haneda, Kyoto, Japan; Yoshiro Kihara, Hamburg, Germany; Masami Morioka, Nara, Japan

[73] Assignee: Sharp Kabushiki Kaisha, Osaka, Japan

[21] Appl. No.: 08/684,851

[22] Filed: Jul. 25, 1996

[30]      Foreign Application Priority Data

Jul. 28, 1995   [JP]   Japan ..................................... 7-193801

[51] Int. Cl.⁷ .............................. G06F 15/00; G09G 3/36
[52] U.S. Cl. ............................................. 707/509; 345/87
[58] Field of Search .................................... 707/504, 505, 707/508, 517, 500, 503, 509, 507; 345/341, 102, 116, 326, 87, 98, 100, 156, 157, 162

[56]              References Cited

U.S. PATENT DOCUMENTS

| | | | |
|---|---|---|---|
| 5,704,028 | 12/1997 | Schanel et al. ......................... | 395/140 |
| 5,844,558 | 12/1998 | Kumar et al. ............................ | 345/339 |

FOREIGN PATENT DOCUMENTS

| | | |
|---|---|---|
| 0375328 | 6/1990 | European Pat. Off. . |
| 0400620 | 12/1990 | European Pat. Off. . |
| 0509160 | 10/1992 | European Pat. Off. . |
| 4-344562 | 12/1992 | Japan . |
| 6-075953 | 3/1994 | Japan . |
| 6-266743 | 9/1994 | Japan . |

OTHER PUBLICATIONS

"About Microsoft Excel", Microsoft Excel Help, (1994), Hididng and unhiding a row or column Protect Sheet Comand and Unprotect Sheet Command.

Lenorovitz, D. R. et al., "Integrating Human Factors Guidance Information Within the USI Design/Rapid Prototyping Process1", vol. 3, No. Conf. 38, (1986), pp. 926–934.

"User Viewports for Columnar Lists", Research Disclosure, No. 311, (1990), p. 211, Para. 3.

Anonymous, "Spatially displaced rows and columns of spread–sheet display method displaying pop–down on screen allowing operator to select option to hide certain rows and columns", Derwent Publications, Ltd. (1986).

*Primary Examiner*—Joseph H. Feild
*Assistant Examiner*—Alford W. Kindred

[57]                ABSTRACT

A display of an electric device displays data which are stored in a chart data part, in the form of a chart. When deleting of a column or row of the chart using a coordinates inputting device is instructed, the column or row is deleted, the remaining columns or rows are moved closer to each other, and the chart is accordingly edited and displayed. Simultaneously, at the position at which the column or row is deleted, an identifier is displayed. A user may also optionally select whether or not to display the identifier. In addition, when the coordinates inputting device on the identifier is touched, the deleted column is restored and displayed at the original position. In the case where there are a plurality of deleted columns, one column may be selectively designated from the plurality of columns so that only the designated one column is restored. Further, the identifier may be displayed in the form of a menu display, so that a user may designate a column to restore simply by touching the coordinates inputting device on the menu display corresponding to the designated column.

25 Claims, 37 Drawing Sheets

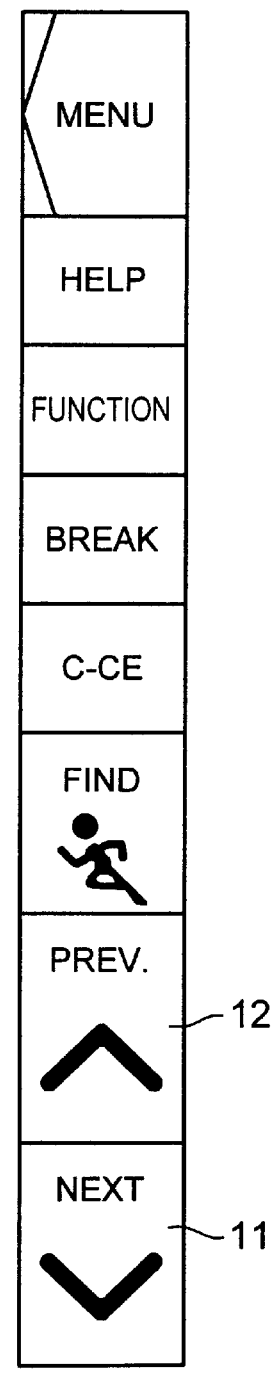

FIG. 5

| | MODEL | SHIPMENT PRICE (¥) | PROPER PRICE (¥) | SELLING PRICE (¥) | DESTINATION | | ANNUAL SALES (QUANTITY:UNITS; AMOUNT:1000YEN) | | | | | TOTAL |
|---|---|---|---|---|---|---|---|---|---|---|---|---|
| | | | | | | | 1990 | 1991 | 1992 | 1993 | 1994 | |
| Y01 | | | | | | | | | | | | |
| Y02 | | | | | | | | | | | | |
| Y03 | | | | | | | | | | | | |
| Y04 | X1000JP | 4,600 | 13,500 | 9,450 | DOMESTIC | QUANTITY | 250 | 12,645 | 35,517 | 57,500 | 24,981 | 130,893 |
| Y05 | | | | | | AMOUNT | 2,963 | 149,856 | 420,912 | 681,433 | 296,050 | 1,551,213 |
| Y06 | X1000US | 5,200 | 14,600 | 10,800 | N.AMERICA | QUANTITY | 195 | 5,008 | 1,304 | 28,394 | 6,887 | 51,984 |
| Y07 | | | | | | AMOUNT | 1,285 | 68,213 | 145,268 | 364,840 | 88,441 | 668,046 |
| Y08 | X1000EU | 4,800 | 14,900 | 11,920 | EUROPE | QUANTITY | 50 | 2,094 | 46,018 | 27,886 | 6,000 | 82,048 |
| Y09 | | | | | | AMOUNT | 648 | 27,119 | 595,979 | 361,152 | 77,706 | 1,062,604 |
| Y10 | X1500JP | 7,800 | 21,000 | 14,700 | DOMESTIC | QUANTITY | 580 | 1,099 | 3,863 | 7,000 | 398 | 12,940 |
| Y11 | | | | | | AMOUNT | 10,992 | 20,827 | 73,208 | 132,657 | 7,542 | 245,226 |
| Y12 | X1500US | 7,850 | 22,500 | 16,875 | N.AMERICA | QUANTITY | 230 | 14,328 | 38,619 | 22,000 | 0 | 75,177 |
| Y13 | | | | | | AMOUNT | 4,589 | 285,858 | 770,488 | 438,922 | 0 | 1,499,856 |
| Y14 | X1500EU | 7,900 | 23,200 | 18,560 | EUROPE | QUANTITY | 80 | 8,549 | 15,666 | 4,000 | 0 | 28,295 |
| Y15 | | | | | | AMOUNT | 1,604 | 171,416 | 314,119 | 80,204 | 0 | 567,343 |
| Y16 | X2000JP | 9,400 | 28,100 | 19,670 | DOMESTIC | QUANTITY | 0 | 120 | 1,900 | 38,008 | 42,108 | 82,136 |
| Y17 | | | | | | AMOUNT | 0 | 3,006 | 47,597 | 952,138 | 1,054,848 | 2,057,589 |
| Y18 | X2000US | 9,500 | 28,800 | 21,600 | N.AMERICA | QUANTITY | 0 | 596 | 1,708 | 29,000 | 24,521 | 55,825 |
| Y19 | | | | | | AMOUNT | 0 | 15,288 | 43,812 | 743,879 | 628,988 | 1,431,967 |
| Y20 | X3000JP | 12,060 | 35,400 | 24,780 | DOMESTIC | QUANTITY | 0 | 4,762 | 6,631 | 9,339 | 6,054 | 26,786 |
| Y21 | | | | | | AMOUNT | 0 | 155,484 | 216,509 | 304,928 | 197,669 | 874,590 |
| Y22 | X3000US | 12,200 | 36,200 | 27,150 | N.AMERICA | QUANTITY | 0 | 2,025 | 2,844 | 1,350 | 2,534 | 8,753 |
| Y23 | | | | | | AMOUNT | 0 | 66,523 | 93,428 | 44,349 | 83,244 | 287,545 |
| Y24 | X5000JP | 18,200 | 53,700 | 37,590 | DOMESTIC | QUANTITY | 0 | 2,520 | 4,407 | 5,712 | 8,817 | 21,456 |
| Y25 | | | | | | AMOUNT | 0 | 107,985 | 188,844 | 244,765 | 377,817 | 919,411 |
| Y26 | X5000US | 18,450 | 53,900 | 40,425 | N.AMERICA | QUANTITY | 0 | 1,056 | 2,047 | 2,780 | 3,412 | 9,295 |
| Y27 | | | | | | AMOUNT | 0 | 46,307 | 89,763 | 121,906 | 149,620 | 407,595 |
| Y28 | X5000EU | 18,300 | 54,100 | 43,280 | EUROPE | QUANTITY | 0 | 1,011 | 1,797 | 3,841 | 1,080 | 7,729 |
| Y29 | | | | | | AMOUNT | 0 | 46,355 | 82,394 | 176,114 | 49,519 | 354,382 |
| Y30 | X8000JP | 25,900 | 54,500 | 38,150 | DOMESTIC | QUANTITY | 0 | 0 | 659 | 6,400 | 8,722 | 15,781 |
| Y31 | | | | | | AMOUNT | 0 | 0 | 27,580 | 267,846 | 365,024 | 660,451 |
| Y32 | X8000US | 26,100 | 54,900 | 41,175 | N.AMERICA | QUANTITY | 0 | 0 | 244 | 1,207 | 2,565 | 4,016 |
| Y33 | | | | | | AMOUNT | 0 | 0 | 10,260 | 50,756 | 107,861 | 168,877 |
| Y34 | | | | | | | | | | | | |
| Y35 | TOTAL | | | | | QUANTITY | 1,290 | 56,113 | 173,224 | 244,413 | 138,074 | 613,114 |
| Y36 | | | | | | AMOUNT | 22,080 | 1,164,237 | 3,120,161 | 4,965,887 | 3,484,329 | 12,756,695 |

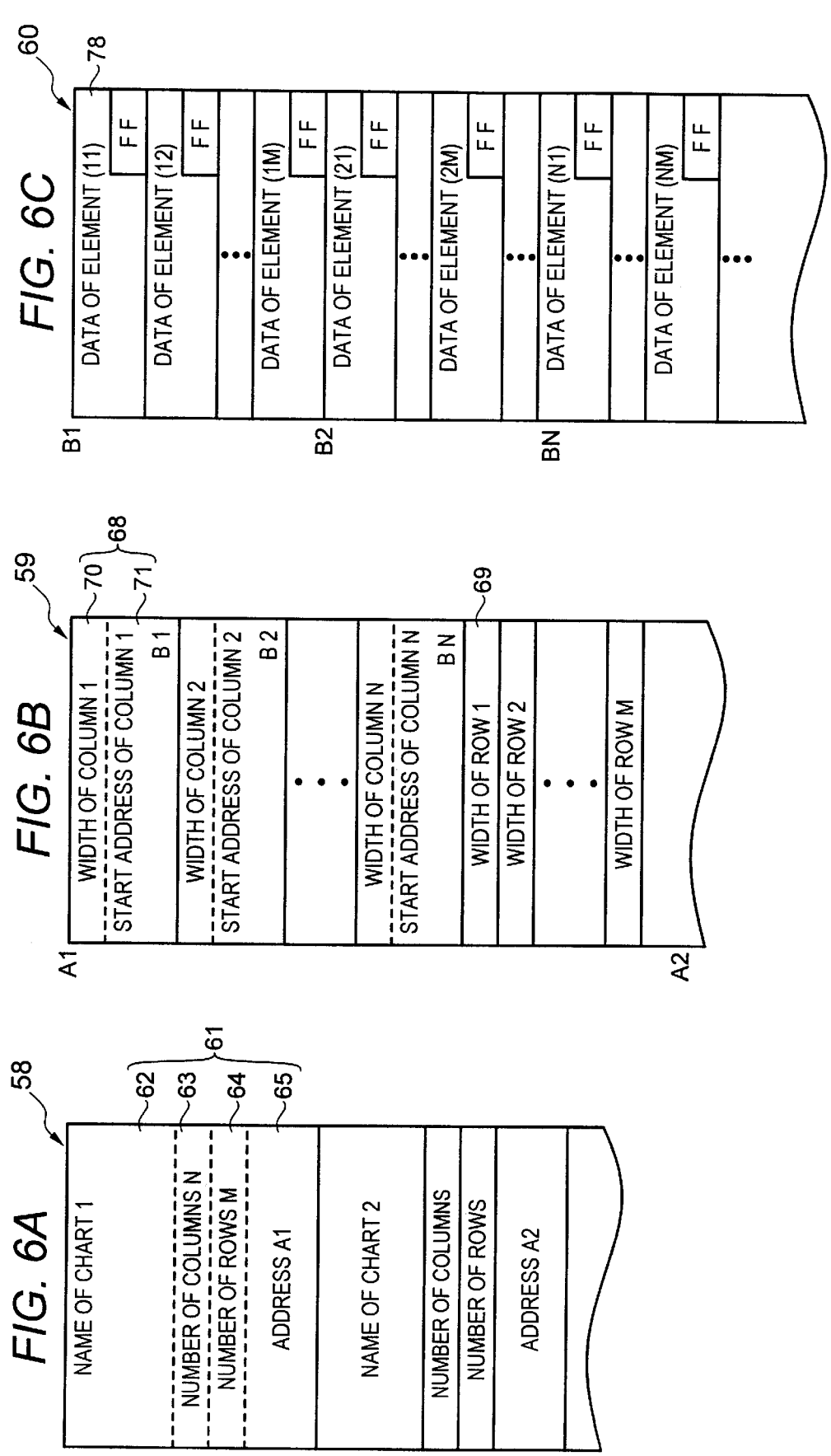

FIG. 14

| | MODEL | DESTINATION | | 1990 | ANNUAL SALES (QUANTITY:UNITS; AMOUNT:1000YEN) | | | | TOTAL |
|---|---|---|---|---|---|---|---|---|---|
| | | | | | 1991 | 1992 | 1993 | 1994 | |
| Y04 | X1000JP | DOMESTIC | QUANTITY | 250 | 12,645 | 35,517 | 57,500 | 24,981 | 130,893 |
| Y05 | | | AMOUNT | 2,963 | 149,856 | 420,912 | 681,433 | 296,050 | 1,551,213 |
| Y06 | X1000US | N.AMERICA | QUANTITY | 100 | 5,308 | 11,304 | 28,390 | 6,882 | 51,984 |
| Y07 | | | AMOUNT | 1,285 | 68,213 | 145,268 | 364,840 | 88,441 | 668,046 |
| Y08 | X1000EU | EUROPE | QUANTITY | 50 | 2,094 | 46,018 | 27,886 | 6,000 | 82,048 |
| Y09 | | | AMOUNT | 648 | 27,119 | 595,979 | 361,152 | 77,706 | 1,062,604 |
| Y10 | X1500JP | DOMESTIC | QUANTITY | 580 | 1,099 | 3,863 | 7,000 | 398 | 12,940 |
| Y11 | | | AMOUNT | 10,992 | 20,827 | 73,208 | 132,657 | 7,542 | 245,226 |
| Y12 | X1500US | N.AMERICA | QUANTITY | 230 | 14,328 | 38,619 | 22,000 | 0 | 75,177 |
| Y13 | | | AMOUNT | 4,589 | 285,858 | 770,488 | 438,922 | 0 | 1,499,856 |
| Y14 | X1500EU | EUROPE | QUANTITY | 80 | 8,549 | 15,666 | 4,000 | 0 | 28,295 |
| Y15 | | | AMOUNT | 1,604 | 171,416 | 314,119 | 80,204 | 0 | 567,343 |
| Y16 | X2000JP | DOMESTIC | QUANTITY | 0 | 120 | 1900 | 38,008 | 42,108 | 82,136 |
| Y17 | | | AMOUNT | 0 | 3,006 | 47,597 | 952,138 | 1,054,848 | 2,057,589 |
| Y18 | X2000US | N.AMERICA | QUANTITY | 0 | 596 | 1,708 | 29,000 | 24,521 | 55,82... |

FIG. 19

| | T1 | T2 | T3 | T4 | T5 | T6 | T7 | T8 | T9 | T |
|---|---|---|---|---|---|---|---|---|---|---|
| | MODEL | SHIPMENT PRICE (¥) | PROPER PRICE (¥) | SELLING PRICE (¥) | DESTINATION | | ANNUAL SALES (QUANTITY:UNITS; AM | | | |
| Y01 | | | | | | | 1990 | 1991 | 1992 | 199 |
| Y02 | | | | | | | | | | |
| Y03 | | | | | | | | | | |
| Y04 | X1000JP | 4,600 | 13,500 | 9,450 | DOMESTIC | QUANTITY | 250 | 12,645 | 35,517 | 5 |
| Y05 | | | | | | AMOUNT | 2,963 | 149,856 | 420,912 | 68 |
| Y06 | X1500JP | 7,800 | 21,000 | 14,700 | DOMESTIC | QUANTITY | 580 | 1,099 | 3,863 | 13 |
| Y07 | | | | | | AMOUNT | 10,992 | 20,827 | 73,208 | |
| Y08 | X1500US | 7,850 | 22,500 | 16,875 | N.AMERICA | QUANTITY | 230 | 14,328 | 38,619 | 2 |
| Y09 | | | | | | AMOUNT | 4,589 | 285,858 | 770,488 | 43 |
| Y10 | X1500EU | 7,900 | 23,200 | 18,560 | EUROPE | QUANTITY | 80 | 8,549 | 15,666 | 8 |
| Y11 | | | | | | AMOUNT | 1,604 | 171,416 | 314,119 | |
| Y12 | X2000JP | 9,400 | 28,100 | 19,670 | DOMESTIC | QUANTITY | 0 | 120 | 1900 | 3 |
| Y13 | | | | | | AMOUNT | 0 | 3,006 | 47,597 | 95 |
| Y14 | X2000US | 9,500 | 28,800 | 21,600 | N.AMERICA | QUANTITY | 0 | 596 | 1,708 | 2 |
| Y15 | | | | | | AMOUNT | 0 | 15,288 | 43,812 | 74 |
| Y16 | X3000JP | 12,000 | 35,400 | 24,780 | DOMESTIC | QUANTITY | 0 | 4,762 | 6,631 | |
| Y17 | | | | | | AMOUNT | 0 | 155,484 | 216,509 | 3 |
| Y18 | X3000US | 12,200 | 36,200 | 27,150 | N.AMERICA | QUANTITY | 0 | 2,025 | 2,844 | |

FIG. 22

|  | T1 | T2 | T3 | T4 | T5 | T6 | T7 | T8 | T9 | T |
|---|---|---|---|---|---|---|---|---|---|---|
|  |  |  |  |  |  |  | ANNUAL SALES (QUANTITY:UNITS; AMO | | | |
| | MODEL | SHIPMENT PRICE (¥) | PROPER PRICE (¥) | SELLING PRICE (¥) | DESTINATION | | 1990 | 1991 | 1992 | 199 |
| Y04 | X1000JP | 4,600 | 13,500 | 9,450 | DOMESTIC | QUANTITY | 250 | 12,645 | 35,517 | 5 |
| Y05 | | | | | | AMOUNT | 2,963 | 149,856 | 420,912 | 68 |
| Y06 | X1000US | 4,700 | 14,400 | 10,800 | N.AMERICA | QUANTITY | 100 | 5,308 | 11,304 | 2 |
| Y07 | | | | | | AMOUNT | 1,285 | 68,213 | 145,268 | 36 |
| Y08 | X1000EU | 4,800 | 14,900 | 11,920 | EUROPE | QUANTITY | 50 | 2,094 | 46,018 | 2 |
| Y09 | | | | | | AMOUNT | 648 | 27,119 | 595,979 | 36 |
| Y10 | X1500JP | 7,800 | 21,000 | 14,700 | DOMESTIC | QUANTITY | 580 | 1,099 | 3,863 | |
| Y11 | | | | | | AMOUNT | 10,992 | 20,827 | 73,208 | 13 |
| Y12 | X1500US | 7,850 | 22,500 | 16,875 | N.AMERICA | QUANTITY | 230 | 14,328 | 38,619 | 2 |
| Y13 | | | | | | AMOUNT | 4,589 | 285,858 | 770,488 | 43 |
| Y14 | X1500EU | 7,900 | 23,200 | 18,560 | EUROPE | QUANTITY | 80 | 8,549 | 15,666 | |
| Y15 | | | | | | AMOUNT | 1,604 | 171,416 | 314,119 | 8 |
| Y16 | X2000JP | 9,400 | 28,100 | 19,670 | DOMESTIC | QUANTITY | 0 | 120 | 1900 | 3 |
| Y17 | | | | | | AMOUNT | 0 | 3,006 | 47,597 | 9 |
| Y18 | X2000US | 9,500 | 28,800 | 21,600 | N.AMERICA | QUANTITY | 0 | 596 | 1,708 | |

FIG. 23

| | MODEL | SHIPMENT PRICE (¥) | DESTINATION | | ANNUAL SALES (QUANTITY:UNITS; AMOUNT:1000YEN) | | | | | TO |
|---|---|---|---|---|---|---|---|---|---|---|
| | | | | | 1990 | 1991 | 1992 | 1993 | 1994 | |
| Y04 | X1000JP | 4,600 | DOMESTIC | QUANTITY | 250 | 12,645 | 35,517 | 57,500 | 24,981 | |
| Y05 | | | | AMOUNT | 2,963 | 149,856 | 420,912 | 681,433 | 296,050 | 1 |
| Y06 | X1000US | 4,700 | N.AMERICA | QUANTITY | 100 | 5,308 | 11,304 | 28,390 | 6,882 | |
| Y07 | | | | AMOUNT | 1,285 | 68,213 | 145,268 | 364,840 | 88,441 | |
| Y08 | X1000EU | 4,800 | EUROPE | QUANTITY | 50 | 2,094 | 46,018 | 27,886 | 6,000 | |
| Y09 | | | | AMOUNT | 648 | 27,119 | 595,979 | 361,152 | 77,706 | 1 |
| Y10 | X1500JP | 7,800 | DOMESTIC | QUANTITY | 580 | 1,099 | 3,863 | 7,000 | 398 | |
| Y11 | | | | AMOUNT | 10,992 | 20,827 | 73,208 | 132,657 | 7,542 | |
| Y12 | X1500US | 7,850 | N.AMERICA | QUANTITY | 230 | 14,328 | 38,619 | 22,000 | 0 | |
| Y13 | | | | AMOUNT | 4,589 | 285,858 | 770,488 | 438,922 | 0 | 1 |
| Y14 | X1500EU | 7,900 | EUROPE | QUANTITY | 80 | 8,549 | 15,666 | 4,000 | 0 | |
| Y15 | | | | AMOUNT | 1,604 | 171,416 | 314,119 | 80,204 | 0 | |
| Y16 | X2000JP | 9,400 | DOMESTIC | QUANTITY | 0 | 120 | 1900 | 38,008 | 42,108 | |
| Y17 | | | | AMOUNT | 0 | 3,006 | 47,597 | 952,138 | 1,054,848 | 2 |
| Y18 | X2000US | 9,500 | N.AMERICA | QUANTITY | 0 | 596 | 1,708 | 29,000 | 24,521 | |

FIG. 26

| | | | | ANNUAL SALES (QUANTITY:UNITS; AMOUNT:1000YEN) | | | | |
|---|---|---|---|---|---|---|---|---|
| | MODEL | DE | | 1991 | 1992 | 1993 | 1994 | TOTAL |
| Y01 | | | | | | | | |
| Y02 | | | T2:SHIPMENT | | | | | |
| Y03 | | | T3:PROPER T4:SELLING | | | | | |
| Y04 | X1000JP | DOMESTIC | QUANTITY | 250 | 35,517 | 57,500 | 24,981 | 130,893 |
| Y05 | | | AMOUNT | 2,963 | 420,912 | 681,433 | 296,050 | 1,551,213 |
| Y06 | X1000US | N.AMERICA | QUANTITY | 100 | 11,304 | 28,390 | 6,882 | 51,984 |
| Y07 | | | AMOUNT | 1,285 | 145,268 | 364,840 | 88,441 | 668,046 |
| Y08 | X1000EU | EUROPE | QUANTITY | 50 | 46,018 | 27,886 | 6,000 | 82,048 |
| Y09 | | | AMOUNT | 648 | 595,979 | 361,152 | 77,706 | 1,062,604 |
| Y10 | X1500JP | DOMESTIC | QUANTITY | 580 | 1,099 | 3,863 | 7,000 | 12,940 |
| Y11 | | | AMOUNT | 10,992 | 20,827 | 73,208 | 132,657 | 398 245,226 |
| Y12 | X1500US | N.AMERICA | QUANTITY | 230 | 14,328 | 38,619 | 22,000 | 7,542 75,177 |
| Y13 | | | AMOUNT | 4,589 | 285,858 | 770,488 | 438,922 | 1,499,856 |
| Y14 | X1500EU | EUROPE | QUANTITY | 80 | 8,549 | 15,666 | 4,000 | 28,295 |
| Y15 | | | AMOUNT | 1,604 | 171,416 | 314,119 | 80,204 | 567,343 |
| Y16 | X2000JP | DOMESTIC | QUANTITY | 0 | 1900 | 38,008 | 42,108 | 82,136 |
| Y17 | | | AMOUNT | 0 | 3,006 | 952,138 | 1,054,848 | 2,057,589 |
| Y18 | X2000US | N.AMERICA | QUANTITY | 0 | 596 | 1,708 29,000 | 24,521 | 55,825 |

DELETE  END

FIG. 27

| | T1 | T2 T3 T4 | T5 | T6 | T7 | T8 | T9 | T10 | T11 | T12 |
|---|---|---|---|---|---|---|---|---|---|---|---|
| | MODEL | SHIPMENT PROPER SELLING | DE | | | ANNUAL SALES (QUANTITY:UNITS; AMOUNT:1000YEN) | | | | |
| | | | | | | 1991 | 1992 | 1993 | 1994 | TOTAL |
| Y01 | | | | | | | | | | |
| Y02 | | | | | | | | | | |
| Y03 | | | | | | | | | | |
| Y04 | X1000JP | | DOMESTIC | QUANTITY | 250 | 12,645 | 35,517 | 57,500 | 24,981 | 130,893 |
| Y05 | | | | AMOUNT | 2,963 | 149,856 | 420,912 | 681,433 | 296,050 | 1,551,213 |
| Y06 | X1000US | | N.AMERICA | QUANTITY | 100 | 5,308 | 11,304 | 28,390 | 6,882 | 51,984 |
| Y07 | | | | AMOUNT | 1,285 | 68,213 | 145,268 | 364,840 | 88,441 | 668,046 |
| Y08 | X1000EU | | EUROPE | QUANTITY | 50 | 2,094 | 46,018 | 27,886 | 6,000 | 82,048 |
| Y09 | | | | AMOUNT | 648 | 27,119 | 595,979 | 361,152 | 77,706 | 1,062,604 |
| Y10 | X1500JP | | DOMESTIC | QUANTITY | 580 | 1,099 | 3,863 | 7,000 | 398 | 12,940 |
| Y11 | | | | AMOUNT | 10,992 | 20,827 | 73,208 | 132,657 | 7,542 | 245,226 |
| Y12 | X1500US | | N.AMERICA | QUANTITY | 230 | 14,328 | 38,619 | 22,000 | 0 | 75,177 |
| Y13 | | | | AMOUNT | 4,589 | 285,858 | 770,488 | 438,922 | 0 | 1,499,856 |
| Y14 | X1500EU | | EUROPE | QUANTITY | 80 | 8,549 | 15,666 | 4,000 | 0 | 28,295 |
| Y15 | | | | AMOUNT | 1,604 | 171,416 | 314,119 | 80,204 | 0 | 567,343 |
| Y16 | X2000JP | | DOMESTIC | QUANTITY | 0 | 120 | 1900 | 38,008 | 42,108 | 82,136 |
| Y17 | | | | AMOUNT | 0 | 3,006 | 47,597 | 952,138 | 1,054,848 | 2,057,589 |
| Y18 | X2000US | | N.AMERICA | QUANTITY | 0 | 596 | 1,708 | 29,000 | 24,521 | 55,825 |

DELETE   END

FIG. 31

| | T1 | T5 | T6 | T7 | T8 | T9 | T10 | T11 | T12 |
|---|---|---|---|---|---|---|---|---|---|
| | MODEL | DESTINATION | | ANNUAL SALES (QUANTITY:UNITS; AMOUNT:1000YEN) | | | | | |
| | | | | 1990 | 1991 | 1992 | 1993 | 1994 | TOTAL |
| Y01 | | | | | | | | | |
| Y02 | | | | | | | | | |
| Y03 | | | | | | | | | |
| Y04 | X1000JP | DOMESTIC | QUANTITY | 250 | 12,645 | 35,517 | 57,500 | 24,981 | 130,893 |
| Y05 | | | AMOUNT | 2,963 | 149,856 | 420,912 | 681,433 | 296,050 | 1,551,213 |
| Y06 | X1000US | N.AMERICA | QUANTITY | 100 | 5,308 | 11,304 | 28,390 | 6,882 | 51,984 |
| Y07 | | | AMOUNT | 1,285 | 68,213 | 145,268 | 364,840 | 88,441 | 668,046 |
| Y08 | X1000EU | EUROPE | QUANTITY | 50 | 2,094 | 46,018 | 27,886 | 6,000 | 82,048 |
| Y09 | | | AMOUNT | 648 | 27,119 | 595,979 | 361,152 | 77,706 | 1,062,604 |
| Y10 | X1500JP | DOMESTIC | QUANTITY | 580 | 1,099 | 3,863 | 7,000 | 398 | 12,940 |
| Y11 | | | AMOUNT | 10,992 | 20,827 | 73,208 | 132,657 | 7,542 | 245,226 |
| Y12 | X1500US | N.AMERICA | QUANTITY | 230 | 14,328 | 38,619 | 22,000 | 0 | 75,177 |
| Y13 | | | AMOUNT | 4,589 | 285,858 | 770,488 | 438,922 | 0 | 1,499,856 |
| Y14 | X1500EU | EUROPE | QUANTITY | 80 | 8,549 | 15,666 | 4,000 | 0 | 28,295 |
| Y15 | | | AMOUNT | 1,604 | 171,416 | 314,119 | 80,204 | 0 | 567,343 |
| Y16 | X2000JP | DOMESTIC | QUANTITY | 0 | 120 | 1900 | 38,008 | 42,108 | 82,136 |

Popup menu: T2: SHIPMENT / T3: PROPER / T4: SELLING

Buttons: DELETE, END, ▲▼, ◄►

FIG. 34

ANNUAL SALES (QUANTITY:UNITS; AMOUNT:1000YEN)

| | T1 | T2 | T3 | T4 | T5 | T6 | T7 | T8 | T9 |
|---|---|---|---|---|---|---|---|---|---|
| | MODEL | DESTINATION | | 1990 | 1991 | 1992 | 1993 | 1994 | TOTAL |
| Y04 | X1000JP | DOMESTIC | QUANTITY | 250 | 12,645 | 35,517 | 57,500 | 24,981 | 130,893 |
| Y05 | | | AMOUNT | 2,963 | 149,856 | 420,912 | 681,433 | 296,050 | 1,551,213 |
| Y06 | X1000US | N.AMERICA | QUANTITY | 100 | 5,308 | 11,304 | 28,390 | 6,882 | 51,984 |
| Y07 | | | AMOUNT | 1,285 | 68,213 | 145,268 | 364,840 | 88,441 | 668,046 |
| Y08 | X1000EU | EUROPE | QUANTITY | 50 | 2,094 | 46,018 | 27,886 | 6,000 | 82,048 |
| Y09 | | | AMOUNT | 648 | 27,119 | 595,979 | 361,152 | 77,706 | 1,062,604 |
| Y10 | X1500JP | DOMESTIC | QUANTITY | 580 | 1,099 | 3,863 | 7,000 | 398 | 12,940 |
| Y11 | | | AMOUNT | 10,992 | 20,827 | 73,208 | 132,657 | 7,542 | 245,226 |
| Y12 | X1500US | N.AMERICA | QUANTITY | 230 | 14,328 | 38,619 | 22,000 | 0 | 75,177 |
| Y13 | | | AMOUNT | 4,589 | 285,858 | 770,488 | 438,922 | 0 | 1,499,856 |
| Y14 | X1500EU | EUROPE | QUANTITY | 80 | 8,549 | 15,666 | 4,000 | 0 | 28,295 |
| Y15 | | | AMOUNT | 1,604 | 171,416 | 314,119 | 80,204 | 0 | 567,343 |
| Y16 | X2000JP | DOMESTIC | QUANTITY | 0 | 120 | 1900 | 38,008 | 42,108 | 82,136 |
| Y17 | | | AMOUNT | 0 | 3,006 | 47,597 | 952,138 | 1,054,848 | 2,057,589 |
| Y18 | X2000US | N.AMERICA | QUANTITY | 0 | 596 | 1,708 | 29,000 | 24,521 | 55,825 |

MODE SEL. — 162
END — 98
▲▼ — 99
◄► — 100
50a, 161, 108

FIG. 36

| | T1 | T2 | T3 | T4 | T5 | T6 | ANNUAL SALES (QUANTITY:UNITS; AMO | | | |
|---|---|---|---|---|---|---|---|---|---|---|
| | | | | | | | T7 | T8 | T9 | T |
| | MODEL | SHIPMENT PRICE (¥) | PROPER PRICE (¥) | SELLING PRICE (¥) | DESTINATION | | 1990 | 1991 | 1992 | 199 |
| Y01 | | | | | | | | | | |
| Y02 | | | | | | | | | | |
| Y03 | | | | | | | | | | |
| Y04 | X1000JP | 4,600 | 13,500 | 9,450 | DOMESTIC | QUANTITY | 250 | 12,645 | 35,517 | |
| Y05 | | | | | | AMOUNT | 2,963 | 149,856 | 420,912 | 68 |
| Y06 | X1000US | 4,700 | 14,400 | 10,800 | N.AMERICA | QUANTITY | 100 | 5,308 | 11,304 | 2 |
| Y07 | | | | | | AMOUNT | 1,285 | 68,213 | 145,268 | 36 |
| Y08 | X1000EU | 4,800 | 14,900 | 11,920 | EUROPE | QUANTITY | 50 | 2,094 | 46,018 | 2 |
| Y09 | | | | | | AMOUNT | 648 | 27,119 | 595,979 | 36 |
| Y10 | X1500JP | 7,800 | 21,000 | 14,700 | DOMESTIC | QUANTITY | 580 | 1,099 | 3,863 | |
| Y11 | | | | | | AMOUNT | 10,992 | 20,827 | 73,208 | 13 |
| Y12 | X1500US | 7,850 | 22,500 | 16,875 | N.AMERICA | QUANTITY | 230 | 14,328 | 38,619 | 2 |
| Y13 | | | | | | AMOUNT | 4,589 | 285,858 | 770,488 | 43 |
| Y14 | X1500EU | 7,900 | 23,200 | 18,560 | EUROPE | QUANTITY | 80 | 8,549 | 15,666 | |
| Y15 | | | | | | AMOUNT | 1,604 | 171,416 | 314,119 | |
| Y16 | X2000JP | 9,400 | 28,100 | 19,670 | DOMESTIC | QUANTITY | 0 | 120 | 1,900 | |
| Y17 | | | | | | AMOUNT | 0 | 3,006 | 47,597 | 9 |
| Y18 | X2000US | 9,500 | 28,800 | 21,600 | N.AMERICA | QUANTITY | 0 | 596 | 1,708 | |

50 · 162 (MODE SEL.) · 161a · 98 (END) · 99 (▲▼) · 100 (◄►)

FIG. 38

| | T1 MODEL | T2 SHIPMENT PRICE (¥) | T3 PROPER PRICE (¥) | T4 SELLING PRICE (¥) | T5 DESTINATION | T6 | ANNUAL SALES (QUANTITY:UNITS; AMO... | | | |
|---|---|---|---|---|---|---|---|---|---|---|
| | | | | | | | T7 1990 | T8 1991 | T9 1992 | T... 199... |
| Y01 | | | | | | | | | | |
| Y02 | | | | | | | | | | |
| Y03 | | | | | | | | | | |
| Y04 | X1000J | CHANGE PASSWORD | | | DOMESTIC | QUANTITY | 250 | 12,645 | 35,517 | 2 |
| Y05 | | CHANGE MODE | | | | AMOUNT | 2,963 | 149,856 | 420,912 | 68... |
| Y06 | X1000U | | | | N.AMERICA | QUANTITY | 100 | 5,308 | 11,304 | 2 |
| Y07 | | | | | | AMOUNT | 1,285 | 68,213 | 145,268 | 36... |
| Y08 | X1000EU | 4,800 | 14,900 | 11,920 | EUROPE | QUANTITY | 50 | 2,094 | 46,018 | 2 |
| Y09 | | | | | | AMOUNT | 648 | 27,119 | 595,979 | 36... |
| Y10 | X1500JP | 7,800 | 21,000 | 14,700 | DOMESTIC | QUANTITY | 580 | 1,099 | 3,863 | 13... |
| Y11 | | | | | | AMOUNT | 10,992 | 20,827 | 73,208 | |
| Y12 | X1500US | 7,850 | 22,500 | 16,875 | N.AMERICA | QUANTITY | 230 | 14,328 | 38,619 | 2 |
| Y13 | | | | | | AMOUNT | 4,589 | 285,858 | 770,488 | 43... |
| Y14 | X1500EU | 7,900 | 23,200 | 18,560 | EUROPE | QUANTITY | 80 | 8,549 | 15,666 | 8 |
| Y15 | | | | | | AMOUNT | 1,604 | 171,416 | 314,119 | |
| Y16 | X2000JP | 9,400 | 28,100 | 19,670 | DOMESTIC | QUANTITY | 0 | 120 | 1900 | 2 |
| Y17 | | | | | | AMOUNT | 0 | 3,006 | 47,597 | 9... |
| Y18 | X2000US | 9,500 | 28,800 | 21,600 | N.AMERICA | QUANTITY | 0 | 596 | 1,708 | |

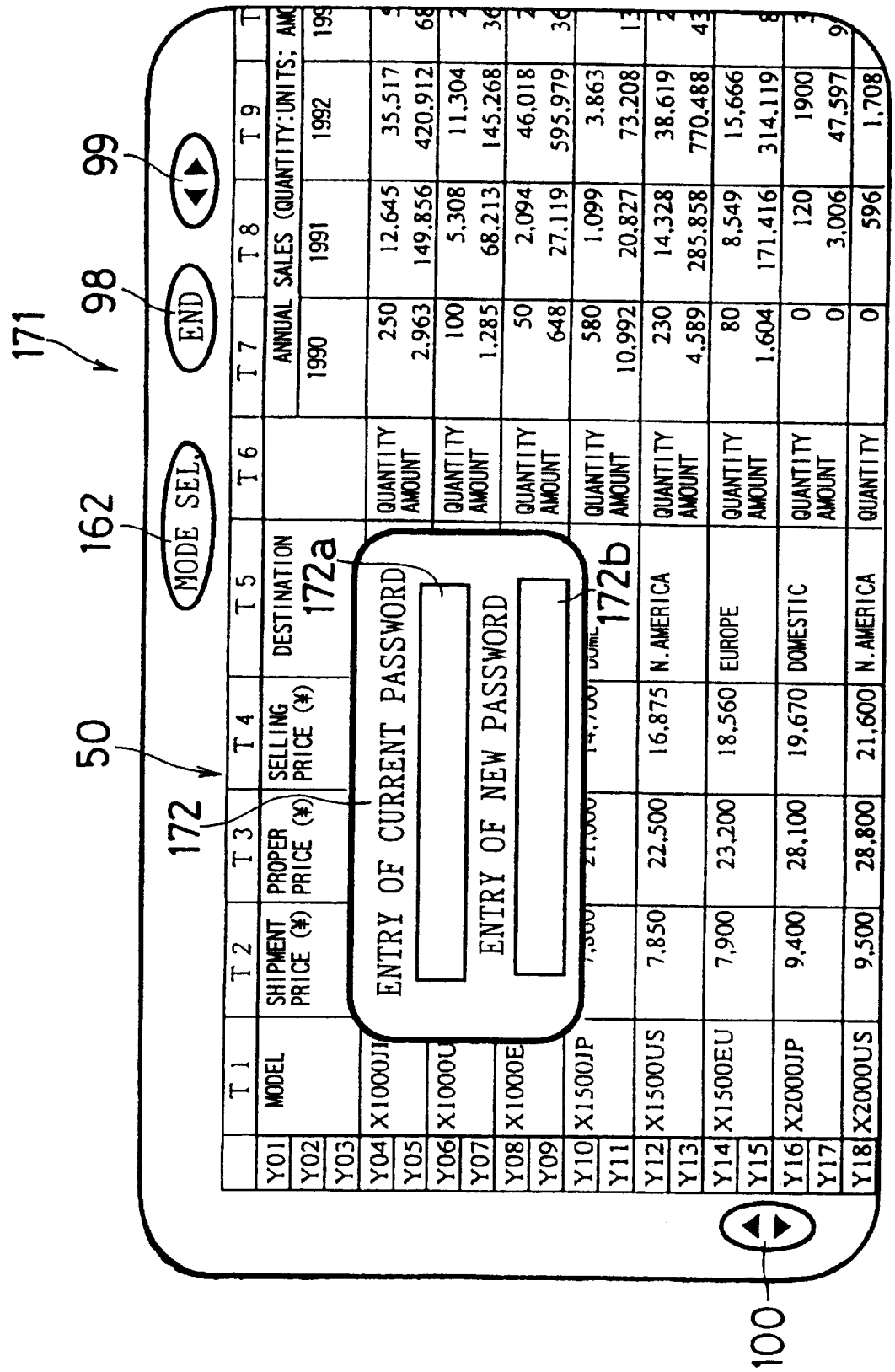

FIG. 40

| | T1 | T2 | T3 | T4 | T5 | T6 | ANNUAL SALES (QUANTITY:UNITS; AMOUNT |||
| --- | --- | --- | --- | --- | --- | --- | --- | --- | --- |
| | | | | | | | T7 | T8 | T9 |
| | MODEL | SHIPMENT PRICE (¥) | PROPER PRICE (¥) | SELLING PRICE (¥) | DESTINATION | | 1990 | 1991 | 1992 |
| Y01 | | | | | | | | | |
| Y02 | | | | | | | | | |
| Y03 | | | | | | | | | |
| Y04 | X1000JP | 4,800 | 14,900 | 11,920 | ...ESTIC | QUANTITY | 250 | 12,645 | 35,517 |
| Y05 | | | | | | AMOUNT | 2,963 | 149,856 | 420,912 |
| Y06 | X1000U... | | | | ...MERICA | QUANTITY | 100 | 5,308 | 11,304 |
| Y07 | | | | | | AMOUNT | 1,285 | 68,213 | 145,268 |
| Y08 | X1000EU | 7,800 | 21,000 | | EUROPE | QUANTITY | 50 | 2,094 | 46,018 |
| Y09 | | | | | | AMOUNT | 648 | 27,119 | 595,979 |
| Y10 | X1500JP | 7,850 | 22,500 | 16,875 | DOMESTIC | QUANTITY | 580 | 1,099 | 3,863 |
| Y11 | | | | | | AMOUNT | 10,992 | 20,827 | 73,208 |
| Y12 | X1500US | 7,900 | 23,200 | 18,560 | N.AMERICA | QUANTITY | 230 | 14,328 | 38,619 |
| Y13 | | | | | | AMOUNT | 4,589 | 285,858 | 770,488 |
| Y14 | X1500EU | 9,400 | 28,100 | 19,670 | EUROPE | QUANTITY | 80 | 8,549 | 15,666 |
| Y15 | | | | | | AMOUNT | 1,604 | 171,416 | 314,119 |
| Y16 | X2000JP | 9,500 | 28,800 | 21,600 | DOMESTIC | QUANTITY | 0 | 120 | 1900 |
| Y17 | | | | | | AMOUNT | 0 | 3,006 | 47,597 |
| Y18 | X2000US | | | | N.AMERICA | QUANTITY | 0 | 596 | 1,708 |

175 — IDENTIFIER DISPLAYED
175a — IDENTIFIER NOT DISPLAYED

162 MODE SEL.
98 END
99 ▲▼
100 ◀▶
174
175b

DATA PROCESSING APPARATUS

BACKGROUND OF THE INVENTION

1. Field of the Invention

The present invention is related to a data processing apparatus which is applicable to a personal computer, a small electric device or the like which has a function of displaying information in the form of a chart, etc., and processing information.

2. Description of Related Art

Some application software used in a personal computer and some small electric devices such as an electric scheduler include data processing apparatuses which display information in the form of a chart, etc., and process information. A data processing apparatus has a chart preparation function of storing and displaying character strings, for example, in the form of a chart and a chart calculation function of calculating the character strings which are stored in the chart.

A chart used in a data processing apparatus is formed by successively arranging plural regions which are rectangular regions, for instance, in the form of a matrix. In each region, information to be stored, such as character strings, is accordingly displayed. In such a chart, a group of plural regions which are arranged vertically is called "a column." Similarly, a group of plural regions which are arranged horizontally is called "a row."

In a data processing apparatus which is used in a small electric device or the like, a chart which is formed by plural regions each storing no information is set in advance in most cases. When this chart is visually displayed, the respective regions are partitioned by frames which are formed by ruling lines, for example. This makes it easy to visually recognize and judge the size of each region. A user of the data processing apparatus enters and displays information, such as figures, formulas and characters, within the respective regions. The data processing apparatus performs editing, such as deleting, copying and cutting/pasting, row by row and column by column, on the information which is displayed in the form of a chart.

The user can also create the regions of the chart each in an optional size. Japanese Patent Unscreened Application Gazette No. 6-75953 discloses a technique of making it easy for the user to create the frames which partition the regions.

In most cases, the sizes of the regions are set before information is entered in the regions. When character strings which express the entered information are displayed in a character size which is set during entering of the information, a display range which is needed to display the character strings may be equal to or larger than a predetermined size which is set for the regions. With the conventional technique described below, if a display range which is needed to display the entered character strings is larger than the predetermined region, the sizes of the regions and the characters can be automatically changed.

For example, Japanese Patent Unscreened Application Gazette No. 4-344562 discloses a technique of changing a character size of characters which constitute character strings so that a display range for displaying character strings does not exceed the predetermined region. On the other hand, Japanese Patent Unscreened Application Gazette No. 6-266743 discloses a technique of expanding the size of the predetermined region so that a display range for displaying entered character strings does not exceed the predetermined region.

The chart as described above is created regardless of the size of a display screen of a display apparatus of a small electric device or a personal computer which includes a data processing apparatus. Hence, in some cases, a display range which is needed to display the created chart becomes larger than the size of the display screen, whereby it is impossible to display the entire chart in the display screen at a time. In such a case, if one wants to visually recognize two separated regions within the chart which are far away from each other by a distance larger than the size of the display screen and to grasp information which is displayed in each region, that person needs to move, e.g., scroll an image of the chart which is displayed in the display screen so that each region to be observed is moved into the display screen at one time and the person can look at the regions in a time-shared manner.

In the conventional electric device, the image of a desired chart is divided into plural images which can be displayed within a display range that is smaller than the size of the display screen. The divided images are switched and each displayed within the display range, and a region to be observed is displayed.

As described above, when the display range which is needed to display the chart is larger than the display screen of the electric device, it is necessary to move the image of the displayed chart during switching of the region to be observed. To move the image of the chart in this manner, a complex operation such as scrolling or switching of the image is needed. A small electric device such as an electric scheduler, in particular, has a small display screen, so that it is necessary to divide the chart into a number of images. In such a case, it is necessary to frequently switch a displayed image.

A display method which displays information as a chart is advantageous in that it makes it easy to compare information by displaying a plurality of related pieces of information next to each other. As described above, if it is impossible to look at regions which display information to be compared at one time, it is difficult to compare the information. When the chart consists of a number of rows and columns, and the information to be compared is displayed on a region which exists within the chart, comparison of the information is even more difficult.

To display a plurality of related pieces of information next to each other and to temporarily conceal information which is displayed within the chart, the regions are deleted, row by row and column by column. A row or a column to be deleted is different depending on in which row or column the information to be compared belongs to, and therefore, a row or column to be deleted is changed every time information to be compared is changed. After a row or column is deleted and comparison of information is performed, if the information is to be compared with other information using the same chart, a deleted row or column in some cases must be restored to the original position of the row or column.

Only a user who deleted a row or column can remember the delete position at which the row or column was deleted. Hence, the user forgets the delete position a while after deleting and does not know where to restore the row or column any more. In addition, since only the user who deleted a row or column can remember the delete position, it is difficult for other user who uses the same device to restore the row or column at the delete position.

SUMMARY OF THE INVENTION

An object of the present invention is to provide a data processing apparatus which easily changes a portion of the image of a chart displayed within a display screen of an electric device by partially deleting or restoring the chart, and which displays only a portion to be displayed of the chart, which consists of a number of regions and whose display range for displaying all of the regions is larger than the display screen, within a display region of the display screen.

The present invention provides a data processing apparatus, wherein information grouped into plural groups is stored in a memory, a group designated by inputting means is selectively deleted and information of only remaining groups of the memory is displayed by display means, an identifier which expresses a position of a deleted group is displayed together with the remaining groups by the displaying means, and the information of the designated group retrieved from the memory is inserted and restored into the information of only the remaining groups by the inputting means and displayed by the display means.

According to the present invention, the data processing apparatus stores information grouped into plural groups, into the memory in advance. In the apparatus, of the information which is grouped and stored in the memory, a user selectively deletes a group designated using the inputting means from the information grouped and stored in the memory so that the display means displays the information of only the remaining groups of information which remain in the memory. The position of the deleted group is denoted by the identifier displayed together with the remaining groups by the display means.

Further, in the data processing apparatus, when the information displayed by the display means includes the deleted group, the information of the deleted group which is designated by a user using the inputting means is retrieved from the memory, and inserted and restored into the information of only the remaining groups so that the display means displays the information of the designated group along with the information of the remaining groups.

Hence, when it is desired to only partially delete and display the information which is stored in the memory, it is possible to delete the information group by group. In addition, it is also possible to restore deleted information group by group. Further, since the identifier denotes the position at which the grouped information is deleted, it is possible to easily learn the position at which the information is to be restored. This makes it easy to partially delete and restore information which is displayed in the form of a chart, a graph, etc., and to edit a displayed image.

Further the invention is characterized in that the information grouped into plural groups is displayed in the form of a chart which consists of at least one row and plural columns or of plural rows and at least one column.

According to the present invention, the information grouped into plural groups is displayed in the form of a chart which consists of rows and columns, to be specific, at least one row and plural columns, or consists of plural rows and at least one column. The grouped information is information which is expressed as the rows or the columns of the chart. When information is displayed as a chart, in most cases, strongly related pieces of information are arranged in the rows and the columns. As described above, when the grouped information is to be partially and temporarily deleted, the information is deleted row by row and column by column which are strongly related to each other. In the data processing apparatus described above, since it is possible to delete and restore the displayed information row by row and column by column, it is easy to delete and restore strongly related information at a time.

Further the invention provides a data processing apparatus comprising:

(a) an original information memory for storing information in the form of a chart, grouped into plural groups;

(b) display means;

(c) a display memory for storing contents which are to be displayed in the display means;

(d) inputting means for designating a group out of the plural groups via input operation; and (e) control means for responding to an output from the inputting means, for transmitting contents stored in the original information memory to the display memory, for selectively deleting the information of the group designated by the inputting means out of the information grouped into the plural groups of the display memory transmitted from the original information memory, for moving information of the remaining groups in the display memory, which is separated into plural parts by space which was occupied by the information of the deleted group, so that the plural parts of the remaining information comes close to each other and the display means displays the information of the remaining groups, for displaying an identifier which indicates a start position or an end position at which the information of the deleted group was displayed, together with the information of the remaining groups, and for transmitting the information of the deleted group from the original information memory to the display memory, and inserting the information of the deleted group at the pre-delete position to be displayed by the display means.

According to the present invention, in the data processing apparatus, the grouped information in the form of a chart is always stored in the original information memory as basic information. The data processing apparatus includes the inputting means so that a user can enter an instruction directed to the data processing apparatus and operate the apparatus. When displaying of the grouped information in the display means is instructed, the control means transmits the information to the display memory.

In most cases, the original information memory compresses or otherwise appropriately processes information to be stored, and stores the information in a format which is different from a format which can be displayed in the display means. When information is transmitted from the original information memory to the display memory, the control means develops the information into a format which can be displayed in the display means and transmits the information. The developed information is visually displayed in a display apparatus, as an image.

In the data processing apparatus according to the present invention, when the information contained in the chart is to be edited, e.g., deleted or restored, instead of editing the information which is always stored in the original information memory, only information which is displayed in the display means is edited. That is, the developed information within the display memory is what is deleted or restored out of the information of the chart.

When deletion operation is carried out using the inputting means, a user designates information of a group which is to be deleted from the display. For example a group containing information which is not needed for the time being by the user is selected. In response to input operation by the user, the inputting means provides the control means with data indicating the group to be deleted.

The control means selectively deletes the information of the designated group of the displayed information from the display memory. At the same time, a condition in which the information of the remaining groups is stored is changed in such a manner that a storing position of the remaining information is closely moved so as to fill space of the display which is occupied by the information of the deleted group. As a result, the information of the chart is edited, and the display means displays the information of the remaining groups which remain after editing.

A display range needed for displaying the edited chart is smaller than that for displaying the chart before editing. For instance, when information in the form of a chart which requires a larger display range than the display region of the display means is edited to leave necessary information alone, it is possible to temporarily make the display range smaller than the display region. Hence, as described above, the display means can easily display and list the necessary information at one time. When the display region of the display means is small, in particular, by reducing the information and displaying only necessary information, it is possible to efficiently utilize the limited display region.

Further, the display means displays the identifier, which denotes a start position or an end position of the pre-delete chart at which the information of the deleted group was displayed, together with the remaining groups of information. Hence, even after deleted, the position of the deleted group within the chart is shown to a user by means of the identifier. Thus, it is always possible to grasp a position at which the deleted group is to be restored.

When a user instructs restoration of the information of the deleted group at the original position, the control means retrieves the information of the deleted group from the original information memory. The information of the retrieved group is transmitted to the display memory, inserted at the pre-delete position, and displayed by the display means together with the information of the remaining groups.

As described above, editing of information is performed by the display memory, which stores information related only to a current display. Hence, even when information is optionally deleted, since basic information is stored, it is possible to restore the deleted information. Thus, in the data processing apparatus according to the present invention, it is possible to optionally and temporarily edit information grouped in the form of a chart.

Furthermore the present invention provides a data processing apparatus which creates a chart composed of at least one row and plural columns, or of plural rows and at least one column, from information in the form of a chart, stored in a memory, the data processing apparatus comprising:

inputting means for designating a row or column;

display means for displaying the information in the form of a chart;

deleting means for deleting information of a row or column designated by the inputting means from the information stored in the memory in response to an output from the inputting means, closely moving rows or columns of remaining information, and displaying the remaining information by the display means;

identifier display control means for displaying an identifier which denotes a position at which the information of the row or column which was deleted by the display means was displayed; and restoring means for inserting and restoring the deleted information which was deleted by the deleting means, at a position designated by the identifier, in response to the output from the inputting means to display the deleted information.

According to the present invention, in the data processing apparatus, the display means displays the information to be displayed in the form of a chart, stored in the memory, in the form of a created chart on display means. The chart is composed by at least one row and plural columns, or of plural rows and at least one column. In this manner, the information of the plural groups can be displayed to a user, in the form of a chart suitable to comparison of information.

In deleting operation, a user uses the inputting means to designate one or more rows or columns of the chart which is displayed in the display means as a target to be deleted from the display. When a row or column to be deleted is designated, the deleting means deletes information of the designated row or column from the information stored in the memory. It is the display memory storing information which is to be supplied to the display means that stores the information which is to be deleted.

Furthermore, the deleting means closely moves rows or columns of the remaining information so that space which was occupied by the deleted row or column is filled up, thereby editing the image of the chart. In other words, from the remaining information excluding the deleted row or column, an image to be displayed is created as a reduced chart which is reduced by an amount corresponding to the deleted row or column. The edited chart is displayed by the display means. In addition, when a row or column is deleted, the identifier display control means displays an identifier which denotes a position at which the deleted row or column was displayed, together with the edited chart.

In most cases, a display range which is needed to display the chart which is created to display plural pieces of information is larger than the size which can be displayed by the display means at one time. Although a chart-style display of information is advantageous in that easy comparison of plural pieces of information is allowed, when it is not possible to display a chart at one time, this advantage is hard to be appreciated. In the data processing apparatus, when such a chart includes information which is not used for the time being, a row or column which displays that information is deleted so that the display range of the chart is reduced to be smaller than the original display range of the chart. Hence, it is possible to select only rows or columns which are needed for the time being from the original chart which lacks visibility, to edit the chart by a display apparatus into a size which can be entirely displayed at one time.

Information of a deleted row or column is stored within the apparatus by some method. Receiving an instruction demanding to restore the deleted row or column via the inputting means, the restoring means inserts, restores and displays the deleted information which is, however, still stored, at a position which is designated by an identifier.

The information of the deleted row or column remains stored within the data processing apparatus, as edition of the chart described above is temporary. The position of the deleted row or column is indicated by an identifier and displayed to a user, and the data processing apparatus itself stores the position. In this manner, by inserting and restoring the deleted row or column at the delete position, it is possible to display the original chart once again. Since it is possible to further edit the chart from this condition by further deleting another row or column, it is easy to edit the chart.

Further, the present invention is characterized in that the identifier display control means controls so that an identifier is displayed to denote a start position or an end position of the position at which the deleted row or column was displayed before.

According to the present invention, the identifier display control means displays an identifier so that the identifier denotes a start position or an end position of the deleted row or column. For example, when there are deleted plural rows or columns, only one identifier is displayed to denote successive rows or columns. In this case, the position which is denoted by the identifier is the position of the first row or column among the successive rows or columns, or the position of the last row or column among the successive rows or columns. Therefore, even when other row or column is closely moved to the position at which the deleted row or column used to be displayed, a user can easily judge between which columns or rows in the original chart the deleted row or column was positioned. That is, the position which is denoted by the identifier is clear.

Further, the present invention is characterized in that the deleting means deletes information of plural successive rows or columns at one time, the inputting means selectively designates deleted plural rows or columns, and the restoring means inserts, restores and displays the information of only rows or columns which are selectively designated by the inputting means, at a position denoted by the identifier, in response to an output from the inputting means.

According to the present invention, the deleting means deletes information of successive rows or columns at one time. As herein termed, successive rows or columns are rows or columns which are adjacent to each other and therefore recognized as one group.

When the deleted rows or columns are to be restored, via the inputting means, a user selectively designates an optional row or column from the deleted successive rows or columns. The restoring means inserts and restores information of only the rows or columns selectively designated by the inputting means, at a position which is denoted by the identifier. That is, only a portion of the information of the deleted successive rows or columns can be restored.

This makes it possible to designate and restore rows or columns to be restored in pieces during restoration. Hence, the operability of the apparatus during edition of a chart is improved.

Further, the present invention is characterized in that the deleting means deletes information of plural successive rows or columns at one time, an identifier displays at least a portion of information of deleted plural successive rows or columns, row by row or column by column in the form of a menu display, the inputting means selectively designate rows or columns which are displayed in the menu display, and among the information of the deleted successive rows or columns which are deleted by the deleting means, and the restoring means inserts and restores information of a row or column which is selectively designated by the inputting means, at a position which is denoted by the identifier.

According to the present invention, the deleting means deletes information of successive rows or columns at one time. The identifier which denotes the delete position displays at least a portion of information of deleted successive rows or columns, row by row or column by column in the form of a menu display. Hence, in the data processing apparatus according to the present invention, the identifier not only expresses that there is a deleted row or column but also informs a user of the contents of information which is displayed by the row or column. In this manner, a user can easily visually grasp and confirm the contents of information displayed by the deleted row or column, even with the row or column deleted.

To restore deleted rows or columns, via the inputting means, a user selectively designates a row or column displayed as a menu display. From information of deleted successive rows or columns, the restoring means inserts and restores information of the designated row or column at a position which is denoted by an identifier.

To only partially restore deleted rows or columns, after restoring images of all of the deleted rows or columns, for instance, a row or column which is to be restored among all deleted rows or columns is selected once again. At this stage, it is necessary that even images of rows or columns which are allowed to remain deleted are restored and displayed in the display means. Therefore, with the identifier of a menu display and by selecting a row or column which is to be restored in the menu display, it is possible to select the row or column which is to be restored within a small space. Moreover, since the menu is displayed partially using information of the rows or columns, it is possible to reduce the quantity to be displayed, rather than in the case where all rows or columns must be displayed. This improves the processing speed for displaying.

Further, the present invention is characterized by further comprising switch setting means for switching and setting of whether an identifier is of a menu display, wherein the identifier display control means responds to an output from the switch setting means, the identifier display control means displays an identifier at a position outside a chart displayed by the display means, when a row or column is deleted, and the identifier display control means allows an identifier of a menu display, only when the identifier is set so as to be of a menu display.

According to the present invention, the data processing apparatus comprises the switch setting means for switching and setting of whether an identifier is of a menu display. The switch setting means displays an identifier in a space outside a display range of a chart which is displayed in the display screen of the display means, when a row or column is deleted. The identifier denotes only the position of a deleted row or column. Only when the identifier is set so as to is of a menu display, under the condition that the identifier denoting only the position is displayed, the identifier is displayed in the form of a menu display.

Displaying an identifier in the form of a menu display requires reading of a portion of a row or column, as compared with displaying of an identifier indicating only a position. This increases the size of a job performed by the identifier display control means. Further, the identifier of a menu display is used when there are deleted plural rows or columns and the deleted rows or columns are to be partially restored. Hence, as described above, by allowing the identifier of a menu display only when the deleted rows or columns are to be partially restored or when information of the deleted rows or columns is to be identified, the size of a job to be performed by the identifier display control means is further reduced and a burden is further decreased.

Further, the present invention is characterized in that the menu display of an identifier is displayed in a region which stretches from a region outside a chart displayed by the display means to a display region of the chart, and displays except the menu display which are displayed within the same display region as the menu display are deleted.

According to the present invention, the menu display of the identifier is displayed stretching between the space outside the display range of the chart which is displayed in the display screen of the display means and the display region of the chart. At the same time, chart images and other images which overlaps the same display region as the menu display are deleted. When there are deleted a number of rows or columns, a large area is needed to show the menu display of the identifier. In such a case, the menu display of the identifier is displayed over the displayed chart. Hence, even when the menu display and the displayed chart overlap each other, it is easy to select a row or column to be partially restored.

Further, the present invention is characterized in that the menu display of the identifier is displayed in an enlarged area which is enlarged by shifting the chart within the display screen and thereby expanding an area surrounding the chart larger than before shifting of the chart.

According to the present invention, the menu display of the identifier is displayed in an enlarged area which is enlarged by shifting the image of the chart within the display screen of the display means and thereby making an area surrounding the chart larger than before shifting of the chart. In the chart and the menu display of the identifier, a number of characters are displayed. When the menu display of the identifier is displayed over the chart, it is sometimes hard to distinguish the identifier from the chart. In order to prevent it, the identifier is displayed only in blank space outside the chart, so that the identifier is visually recognized in an easy manner.

Further, when there are deleted a number of rows or columns, a display range which is necessary to show the menu display of the identifier may become equal or larger than the area outside the chart. In such a case, the image of the chart itself is shifted to ensure the outside area which is large enough to display the identifier. The identifier menu is displayed when deleted rows or columns are partially restored, for example. At this stage, a user does not always look at and utilize the chart in detail. Hence, even if a portion of the chart is not displayed in the display means only while the identifier is displayed, use of the chart is not affected. For this reason, to make the identifier in the form of the menu display easier to visually recognize, the chart may be shifted away. This allows to easily visually recognize the identifier in the form of the menu display and to grasp the contents of the identifier even when there are a number of deleted rows or columns.

Further, the present invention is characterized by further comprising identifier display selecting means for selecting whether to display an identifier, wherein when display of the identifier is selected, the identifier display control means displays the identifier, and when not-display of the identifier is selected, the identifier display control means does not display the identifier.

According to the present invention, a user of the data processing apparatus selects whether to display an identifier, using the identifier display selecting means. The indentifier display is only displayed when the identifier display selecting means selects display of the identifier.

In the data processing apparatus, deleting is performed not only to reduce the overall size of a chart by deleting a row or column which is not used for the time being, but also to temporarily conceal a specific row or column so that a third party other than a user has no chance to learn about information of the specific row or column. In addition to concealing the information, the user may want to hide even a fact itself that the information is concealed from the third party. If an identifier is displayed under such circumstances, the third party easily learns that the user is partially hiding the information. In relation to this, the apparatus of the present invention can prohibit the display means from displaying an identifier, for instance, only when the user does not want to display the identifier. With absence of the identifier, it is hard for the third party who does not know the original chart to judge whether the chart has been edited. In this manner, it is possible to hide a fact that the information contained in the chart is partially concealed from the third party who looks at the edited chart.

Further, the present invention is characterized in that the identifier display selecting means includes:

password inputting means for inputting a password which consists of predetermined characters;

a password memory for storing the password;

comparator means for comparing a password input via the password inputting means with the password stored in the password memory; and means for allowing selection of display of an identifier when the passwords are identical to each other, in response to an output from the comparator means.

According to the present invention, the identifier display selecting means includes a password which allows or prohibits whether to display and not to display an identifier. The password consists of predetermined characters and is stored in the password memory which is disposed within the apparatus. A user inputs the password via the password inputting means, to set whether to display an identifier. The comparator means of the identifier display selecting means compares this password with the password stored in the password memory. When coincidence between the two passwords is detected, it is allowed to select whether to display an identifier.

As described above, in order to conceal desired information, a row or column which includes the information is deleted and a chart is edited. An identifier is not displayed so that a fact that the information is concealed is hidden as a secret. If a third party who looks at the edited chart knows how to operate the data processing apparatus, it is possible that the third party will easily display the identifier. Therefore, the identifier display selecting means does not allow switching of whether to display the identifier unless the password which the owner of the apparatus alone knows is entered. This prohibits a person except for the owner of the apparatus from switching whether to display the identifier.

Further, the present invention is characterized in that the display means includes a nearly flat visual display region, the inputting means is flat two-dimensional position detecting means disposed on the visual display region, which is translucent, and a position corresponding to the identifier is entered.

According to the present invention, the inputting means and the display means are disposed so that one of the two is put on the other of the two. For instance, a user can enter a desired two-dimensional coordinate value by pressing a portion of the inputting means. The inputting means described above is used in combination with, for instance, a displayed image which is displayed in the display means. When a two-dimensional coordinate value immediate above the displayed image is entered, for example, a predetermined instruction which corresponds to the image is judged to be entered. In this manner, when the two-dimensional position detecting means is used in combination with the display means, it is possible to change a so-called key arrangement in an easy manner. In addition, since it is possible to input coordinates by directly pressing the image which is displayed in the visual display region of the display means, an operation is easier than using a keyboard or a mouse.

Further, the present invention is characterized in that the display means is composed of row electrodes, column electrodes, and a dielectric material interposed between the row and column electrodes, intersections of the row and column electrodes form picture elements, and display driving means selectively applies a voltage between the row and column electrodes and scan the row and column electrodes so that the display means conducts displaying, the inputting means includes:

detection means for detecting an electric signal electrostatically or inductively coupled to the row and column electrodes; and guiding means for guiding an output which designates a row or column which is related to a display character displayed by the display means at a position at which the electric signal is generated, and the data processing means further comprises displaying/inputting control means for alternately allowing display operation by the display means and detection operation by the detection means of the inputting means.

According to the present invention, the display means further includes a structure as inputting means. The display means is formed by the row electrodes and the column electrodes with dielectric elements between the same, and intersection positions of the row electrodes and the column electrodes form pixels. Such display means switches display operation by the display means and detection operation by the inputting means in a short period of time.

When display operation is carried out, the display driving means selectively applies a voltage between the row and the column electrodes and scans the row and column electrodes. When input operation is carried out by means of the display means and the detection means of the inputting means, a user contacts or moves a pen-like designating member, for instance, close to an optional pixel of the display means. Based on the contact, the electric signal, which is electrostatically or inductively coupled to the row electrodes and the column electrodes, is detected by the detection means. The guiding means calculates an input two-dimensional position based on the electric signal, and outputs an output which designates a row or column which is related to a display character displayed at a position which is equivalent to the position of the electric signal.

Such inputting means is used in combination with the display means, so that a user can operate as if to directly touch an operation guidance image or the like and therefore operation is easy. In addition, since the inputting means is disposed using a nearly the same region as the visual display region, the inputting means is desirably applicable to a small electric device.

Display operation performed by the display means and detection operation performed by the detection means of the inputting means are alternately allowed by the displaying/inputting control means. Using such display means, it is possible to reduce the number of parts which form the data processing apparatus.

Further, the present invention is characterized in that the restoring means includes position judging means at the position of the display region of the display means which is equivalent to a two-dimensional position which is entered by the inputting means, the position judging means judging whether the identifier is displayed, and when the position judging means judges that a detected two-dimensional position is equivalent to the position at which the identifier is displayed, the restoring means restores a deleted row or column.

According to the present invention, in the restoring means, the position judging means judges whether an optional two-dimensional position is within a range in which the identifier is displayed within the display region of the display means, when the optional two-dimensional position is entered via the inputting means. When the detected two-dimensional position is judged to be equivalent to a position within the display range of the identifier, it is determined that restoration of a deleted row or column has been instructed, and restoration is started.

Therefore, in order to perform restoration processing, a user directly presses the image of the identifier which denotes a position at which the deleted row or column is to be restored, to enter an instruction. This makes it easy to designate the deleted row or column to be restored, when there are displayed plural identifiers. Further, when an identifier is not displayed, restoration processing cannot be instructed. Hence, when the deleted row or column is concealed, it is possible to prevent unwanted restoration of the row or column.

Furthermore the present invention provides a data processing apparatus comprising:

(a) an original information memory for storing information in the form of a chart, grouped into plural groups;

(b) display means;

(c) a first display memory for storing the information grouped into plural groups, in a form in which the information can be displayed by the display means;

(d) a second display memory for storing contents which are to be displayed in the display means;

(e) inputting means for designating the groups via input operation;

(f) control means for responding to an output of the inputting means, for transmitting contents stored in the original information memory to the first and the second display memory, and developing the contents in a form in which the information can be displayed by the display means, for selectively deleting information of a group designated by the inputting means from the information grouped into the plural groups transmitted to the second display memory from the original information memory, for moving information of the remaining groups in the second display memory, which is separated into plural parts by space which was occupied by the information of the deleted group, so that the plural parts of the remaining information comes close to each other and the display means displays the information of the remaining groups, for instructing the display means to display an identifier, which denotes a start position or an end position at which the information of the deleted group was displayed, together with the information of the remaining groups, for transmitting the information of the deleted group from the first display memory to the second display memory, and for inserting the information of the deleted group at the pre-delete position and instructing the display means to display the information of the deleted group along with the information of the remaining groups.

According to the present invention, the data processing apparatus comprises the original information memory, the first display memory and the second display memory. The original information memory stores information which is grouped into plural groups which form a chart. The first display memory stores the information in a format in which the information can be displayed by the display means. The second display memory stores the contents which are to be displayed in the display means, out of the information.

When a user instructs the display means to display the grouped information via the inputting means, the control means transmits the contents stored in the original information memory, to the first display memory and the second display memory, and develops the information in a form in which the information can be displayed by the display means. When deleting is instructed and a row or column, i.e., a group to be deleted, is designated, among the grouped information, only developed information stored in the second display memory is deleted and closely moved. As a result, the information of the remaining groups is stored in the second display memory, and the display means displays the information. Further, the identifier which denotes the position at which the information of the deleted group was displayed is displayed together with the information of the remaining groups.

Further, when restoration of the information of the deleted group is instructed, the control means transmits the information of the deleted group, out of the contents which are stored in the first display memory, to the second display memory. This information is inserted at the pre-delete position and displayed by the display means. As described above, the original grouped information is stored in the original information memory in a different format from the format in which the information can be displayed by the display means. Each time necessary information is to be read from the original information memory so that the information of the deleted group is restored and displayed, it is necessary to develop information. The data processing apparatus according to the present invention comprises the first display memory which stores the original grouped information which serves as a basis for restoration, and the information is developed and stored in advance. Therefore, since developing of data is omitted every time restoration is conducted, it is possible to reduce the quantity of a job to be performed for restoration and to improve the processing speed for restoration.

Further, the present invention is characterized in that the deleting means includes a delete memory which stores at least a portion of information which is used for a menu display, out of information of a deleted row or column, and an identifier displays the contents of the delete memory row by row or column by column in the form of a menu display.

According to the present invention, when a row or column is to be deleted, a portion of information of a row or column which is used for a menu display is stored in the delete memory. Utilizing the information which is stored in the delete memory, the identifier displays a menu display. Therefore, when a menu display is to be shown, it is possible to reduce the quantity of a job to be performed by the restoring means than in an apparatus wherein necessary information is read out of the information regarding the entire chart which is always stored in the data processing apparatus to thereby display a menu display. Thus, the operability of a partial restoration operation is further improved.

Further, the present invention is characterized in that the identifier display control means further includes menu selecting means which sets whether to allow the identifier of a menu display, and only when the menu selecting means sets to allow the identifier of a menu display, the identifier is displayed in the form of a menu display.

According to the present invention, using the menu selecting means, a user can optionally allow or prohibit the identifier of a menu display. This makes it possible for a user to display the identifier according to the condition of use and his or her taste. In this manner, the operability of the data processing apparatus is improved.

Further, the present invention is characterized in that the display memory stores contents which are to be displayed, in correspondence to a virtual display screen larger than the display screen of the display means.

According to the present invention, information within the display memory is information which corresponds to an image which is displayed within the virtual display screen larger than the display screen of the display means. In most cases, the display range of the grouped information described above, e.g., of the image of the information displayed in the form of a chart, is larger than the size of a display allowable region of the display means. The image of a chart displayed by the display means is often moved by scrolling or switching.

As described above, the original information memory stores the grouped information in a format which is different from a format which can be displayed by the display means. When the display memory stores only information which is displayed within the display allowable region of the actual display means, every time a displayed image is switched, it is necessary to read and develop necessary information from the original information memory. In the invention, in particular, deletion and restoration of information of a group are performed on information which is stored in the display memory. Hence, every time a displayed image is switched, it is necessary to delete and restore information which is newly developed.

In the data processing apparatus according to the present invention, virtual display means is set which includes a display allowable region which is large enough to display all grouped information, for instance. The display memory stores information of an image whose size can be displayed in the virtual display means. Hence, when information of a group is deleted or restored, it is possible to perform these operations on information of an image which is not displayed in the actual display screen. This eliminates the need to delete or restore during scrolling or switching. For this reason, the processing speed for moving an image is improved, and the operability of the data processing apparatus is improved.

BRIEF DESCRIPTION OF THE DRAWINGS

Other and further objects, features, and advantages of the invention will be more explicit from the following detailed description taken with reference to the drawings wherein:

FIG. 2 is an enlarged view showing a mode key group 6 of the electric device 1 shown in FIG. 1;

FIG. 3 is an enlarged view showing a function key group 7 of the electric device 1 shown in FIG. 1;

FIG. 5 is a view entirely showing a chart which is stored in a chart data part 38 of a memory 37 shown in FIG. 4;

FIGS. 6A, 6B and 6C are views showing a memory structure of the chart data part 38 of the memory 37 shown in FIG. 4;

FIG. 14 shows a displayed image 107 which is displayed in the display screen of the display means 2 of the electric device 1 shown in FIG. 1;

FIG. 19 shows a displayed image 117 which is displayed in the display screen of the display means 2 of the electric device 1 shown in FIG. 1;

FIG. 22 shows a displayed image 121 which is displayed in a display screen of the display means 2 of an electric device;

FIG. 23 shows a displayed image 125 which is displayed in the display screen of the display means 2 of an electric device;

FIG. 26 shows a displayed image 131 which is displayed in a display screen of the display means 2 of an electric device;

FIG. 27 shows a displayed image 136 which is displayed in the display screen of the display means 2 of an electric device;

FIG. 31 shows a displayed image 151 which is displayed in a display screen of the display means 2 of an electric device;

FIG. 34 shows a displayed image 161 which is displayed in a display screen of the display means 2 of an electric device;

FIG. 36 shows a displayed image 161a which is used for the identifier display switching operation of switching an identifier which is displayed within in the display screen of the display means 2 of an electric device;

FIG. 38 shows a displayed image 167 which is used for the identifier display switching operation of switching an identifier which is displayed within in the display screen of the display means 2 of an electric device;

FIG. 39 shows a displayed image 171 which is used for the identifier display switching operation of switching an identifier which is displayed within in the display screen of the display means 2 of an electric device; and FIG. 40 shows a displayed image 174 which is used for the identifier display switching operation of switching an identifier which is displayed within in the display screen of the display means 2 of an electric device.

DETAILED DESCRIPTION OF THE PREFERRED EMBODIMENTS

Figure 1:
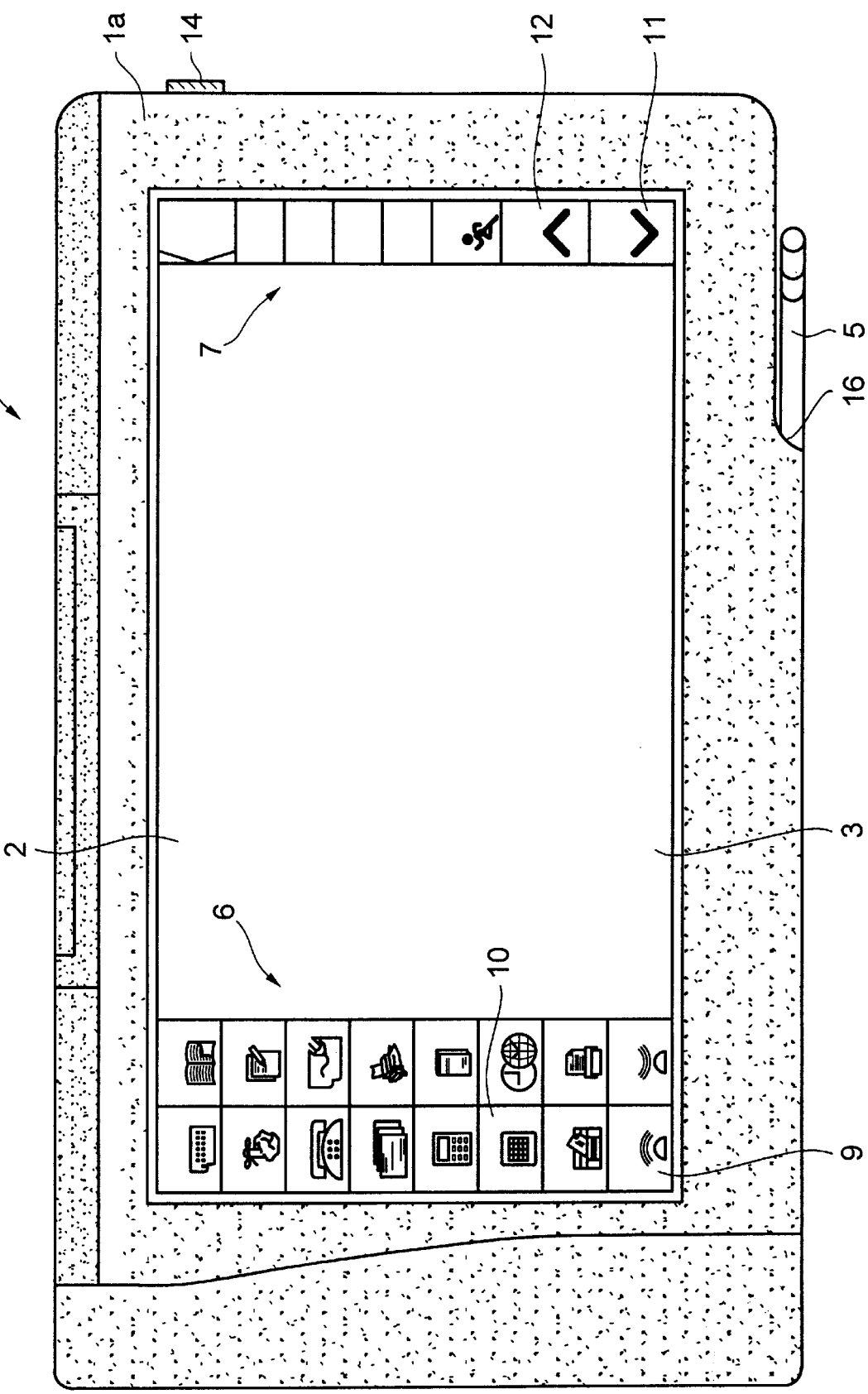
FIG. 1 is a view showing an appearance of an electric device 1 which includes a data processing apparatus of a first embodiment of the invention.

Now referring to the drawings, preferred embodiments of the invention are described below.

FIG. 1 is a view showing an appearance of an electric device 1 which includes a data processing apparatus according to a first embodiment of the invention. The electric device 1 has a management function, such as a telephone book and scheduling, and an input/edit function of storing and editing input character strings. The electric device 1 is a so-called electric scheduler.

The electric device 1 includes display means 2 and coordinates inputting means 3. The display means 2 is realized by a liquid crystal display device, for instance. The coordinates inputting means 3 outputs two-dimensional coordinates of a point at which a user touches the surface of the coordinates inputting means 3 with fingers or a pen 5. The coordinates inputting means 3 is translucent, and is disposed so as to contact a display screen of the display means 2. The coordinates inputting means 3 is realized by a touch panel called "tablet."

Touch panels include resist film type touch panels, electrostatic capacity type touch panels, optical touch panels and supersonic touch panels. Any type of touch panel may be used as the coordinates inputting means, in the embodiment. A structure of a resist film type touch panel will be described in the following, for instance. A resist film type touch panel includes two transparent electrode members which are each formed by growing translucent conductive thin film on translucent glass or film. The touch panel is constituted such that the transparent electrode members are disposed so that the surfaces seating the conductive thin films face each other and an insulation dot spacer is formed in the surface seating the conductive thin film of one of the transparent electrode members. The spacer is formed in order to prevent the two transparent electrode members from contacting each other.

If such a touch panel is pressed at one point, the conductive thin films of the two transparent electrode members short with each other at that point. Utilizing shorting, the pressing position is detected. Resist film type touch panels are classified into digital resist film type touch panels and analog resist film type touch panels, depending on a position detection method. In a touch panel of the digital resist film type, the thin films above are processed to form electrodes each made of a strip-shaped thin film, and the transparent electrode members are disposed so that the longitudinal directions of the strip-shaped electrodes are perpendicular to each other. When an intersection of the strip-shaped transparent electrodes is pressed in a digital resist film type touch panel, shorting and hence electric connection are created between the strip-shaped transparent electrodes which intersect each other. By detecting the shorting position, the position at which the touch panel is pressed is detected.

In a touch panel of the analog resist film type, one uniform translucent conductive thin film is grown on a film as transparent electrode members, and these transparent electrode members are faced each other with a distance from each other. If such a touch panel is pressed at one point, the conductive members short with each other. By means of a potential gradient created within the conductive thin films due to shorting, the pressing position is detected.

Further, when the display means 2 is a liquid crystal display device, for instance, inputting of coordinates may be performed using a part of the display means 2. A liquid crystal display device is formed by arranging substrates seating strip-shaped row electrodes and column electrodes so that liquid crystal which serves as an inductive substance is inserted between the substrates and the row electrodes and the column electrodes run perpendicular to each other. Pixels of the liquid crystal display device are created at intersections of the row electrodes and the column electrodes.

To display using a liquid crystal display device, a voltage is selectively applied and scanned by display control means between the row electrodes and the column electrodes so that the liquid crystal is brought into a desirable condition at each pixel. When a liquid crystal display device is used as the coordinates inputting means, a user touches an optional pixel on the substrates with a pen or the like. As a result, electrostatical coupling or inductive coupling is created within the pixel, whereby a very small current flows between the row electrodes and the column electrodes and an electric signal is generated. Detection means detects the electric signal. Coordinates of the pixel in which the electric signal is generated are regarded as coordinates of the point which is input to the coordinates inputting means 3. The liquid crystal display device alternately performs displaying as the display means and detection as the coordinates inputting means in a period of time which is short enough so that user does not notice that displaying is not successively performed. In this manner, the single structure can serve as the display means and the coordinates inputting means.

Referring back to FIG. 1, the electric device 1 includes a mode key group 6 and a function key group 7, whose enlarged view are shown in FIGS. 2 and 3. The mode key group 6 is a group of keys which switch functions of the electric device 1, such as a management function including a telephone book and scheduling and an input/edit function of storing and editing input character strings. When any one of the keys of the mode key group 6 is manipulated, a function which corresponds to the key is performed. The mode key group 6 includes a chart processing mode key 10 for displaying and editing information in the form of a chart. The function key group 7 is a group of keys which performs common processing which is common to various modes, e.g., to stop a function, while a function which is selected by manipulating a key belonging to the mode key group 6 is performed. The function key group 7 includes a forward key 11 and a reverse key 12 for forwarding and reversing data which are displayed within the display means 2.

Characters are a concept including hiragana characters, katakana characters, Chinese characters, alphabets, figures, symbols, pictograph, etc. A character string is a group of plural characters.

A power source switch 14 for switching a power source condition of the electric device 1 is disposed to a side surface of a housing la of the electric device 1. When the power source switch 14 is manipulated when the power source of the electric device 1 is OFF, the power source is turned on. In contrast, when the power source switch 14 is manipulated when the power source of the electric device 1 is ON, the power source is turned off.

Further, a container part 16 for housing the pen 5, with which coordinates are input to the coordinates inputting means 3, is also disposed to the side surface of a housing laof the electric device 1.

Figure 4:
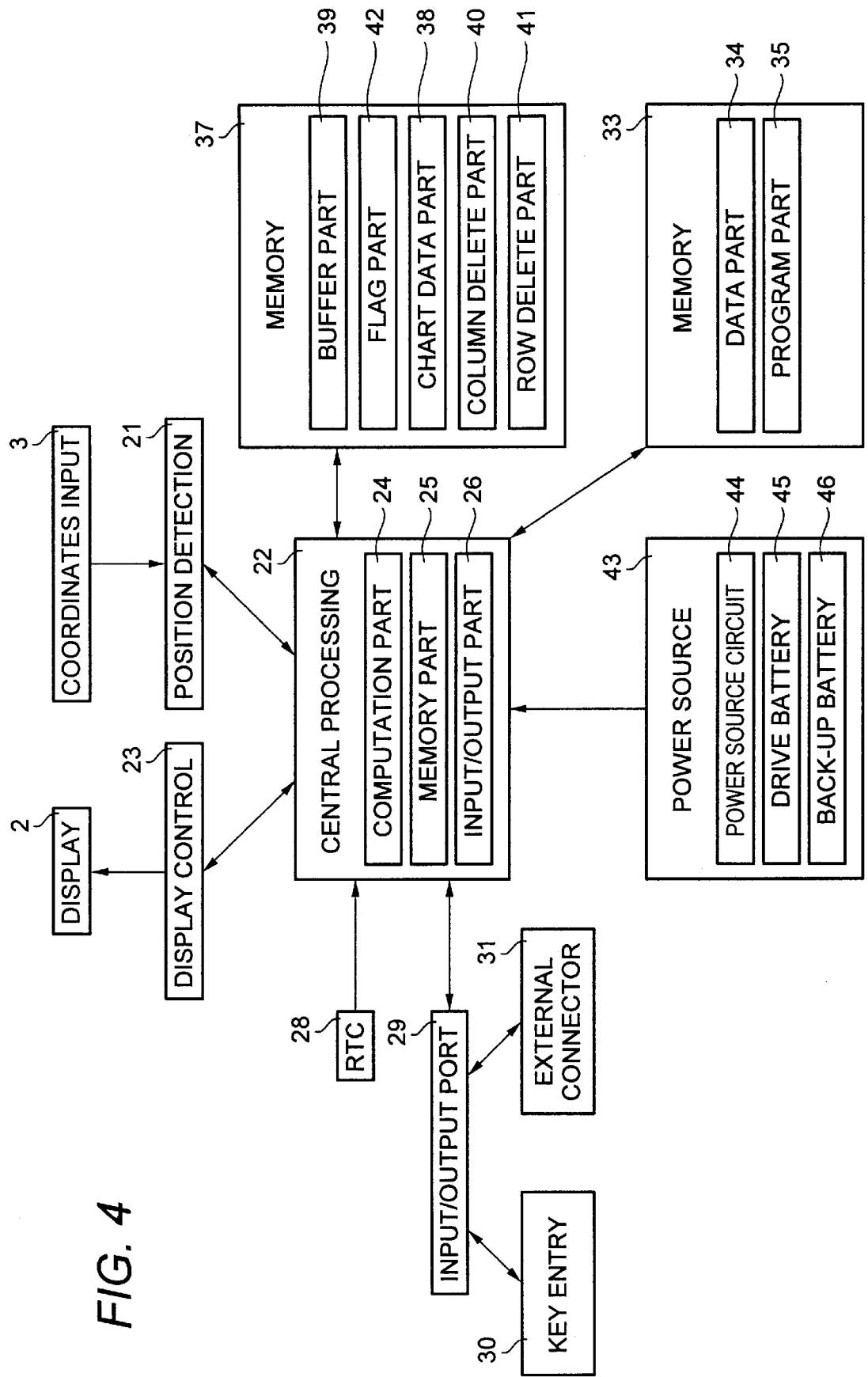
FIG. 4 is a block diagram showing an electric structure of the electric device 1 shown in FIG. 1.

FIG. 4 is a block diagram showing an electric structure of the electric device 1 shown in FIG. 1. The electric device 1 is comprised of the display means 2, the coordinates inputting means 3, position detecting means 21, a central processing unit 22, display control means 23, an RTC (Real Time Clock) 28, an input/output port 29, key inputting means 30, an external connector 31, memories 33, 37, and a power source 43.

When the coordinates inputting means 3 is manipulated by pressing down, etc., the position detecting means 21 detects a coordinates value of a point which is input to the means 3 based on a output of the coordinates inputting means 3, positional information denoting the coordinate value of the input point is supplied to the central processing unit 22. The central processing unit 22 provides the display control means 23 with data for displaying a displayed image within a display screen of the display means 2. The display control means 23 controls the display means 2, according to the data supplied from the central processing unit 22.

The central processing unit 22 includes a computation part 24, a memory part 25, and an input/output part 26. The computation part 24 calculates to perform desired processing based on an output supplied to the central processing unit 22. The memory part 25 includes an internal memory and a register, and stores data used for calculation within the computation part 24 and a calculation result. The input/output part 26 includes an input/output port for receiving an output to the central processing unit 22 and a buffer.

The RTC 28 generates a clock pulse and supplies the same to the central processing unit 22. The input/output port 29 controls the key inputting means 30 including the mode key group 6 and the function key group 7 of the electric device 1, based on an output supplied from the central processing unit 22. Further, an output from the key inputting means 30 is supplied to the central processing unit 22 through the input/output port 29. The input/output port 29 transfers data between other electric devices and the central processing unit 22 of the electric device 1, through the external connector 31.

The memories 33, 37 store an output from the central processing unit 22. The central processing unit 22 reads data which are stored in the memories 33, 37.

The memory 33 is formed to include a data part 34 and a program part 35. The data part 34 stores font data and graphic data for displaying a character in the display means 2, data of a conversion dictionary for converting an input hiragana character into a Chinese character during inputting of Japanese, etc. The program part 35 stores a program for performing a function which corresponds to each key of the mode key group 6 described above, for instance, and a program for controlling an operation of the electric device 1. The memory 33 is realized by a read only memory, for instance.

The memory 37 includes a chart data part 38, a buffer part 39, a column delete part 40, a row delete part 41, and a flag part 42. The memory 37 is realized by a random access memory.

Electricity is supplied to the central processing unit 22 from the power source 43. The power source 43 includes a power source circuit 44, a drive battery 45, and a back-up battery 46. The drive battery 45 is a battery for supplying electricity which is needed to drive the entire electric device 1 including the unit 22. The back-up battery 46 is a battery for supplying electricity which is needed to hold the contents which are stored in the memory 37 and in the memory part 25 of the central processing unit 22. The power source circuit 44 raises or divides the voltages of the batteries 45, 46 to thereby convert the same each into a desired voltage. Further, the power source circuit 44 performs a low battery check for detecting dissipation of the batteries 45, 46.

FIG. 5 is a view of a virtual image which shows entire chart data stored in the chart data part 38 of the memory 37, by visually displaying the chart data in the form of a virtual chart. The chart is formed by arranging regions 51 in the dash-dot-dot lines as a matrix, in this embodiment. The regions 51 are referred to as "elements." Within the elements, character strings such as characters, numbers and symbols are displayed. In FIG. 5, a group of the element which are arranged in a vertical direction are referred to as "columns." Similarly, a group of the element which are arranged in a horizontal direction are referred to as "rows."

To the columns and the rows of the chart 50, designation regions T1 to T12 and Y1 to Y36 for designating a row or columns are added, in addition to the elements for inputting character strings. In the following, these regions will be collectively referred to "a designation region T" or "a designation region Y." The designation regions T, Y are used to designate a row or column to be deleted or restored during deleting or restoration of a row or column which will be described below. For example, when the designation region T2 is designated, an image 55 on the second column denoted with diagonal lines which are slanted downward to the right-hand side is designated. In a similar manner, when the designation region Y6 is designated, an image 56 on the sixth row denoted with diagonal lines which are slanted upward to the right-hand side is designated.

The chart 50 is partitioned into plural rectangular portions by ruling lines. The portion partitioned by the ruling lines are irrelevant to a row or column which is designated. By dividing the regions by the ruling lines, it is possible to visually recognize relevant regions of the displayed contents of the chart 50 in an easy manner. Further, even though plural rows/columns are in the regions which are partitioned by the ruling lines, partitioning with the ruling lines prohibits any influence over a relationship between the designated regions T, Y and the rows and columns.

FIGS. 6A, 6B and 6C are views showing a memory structure of the chart data part 38 of the memory 37 shown in FIG. 4. The chart data part 38 is formed by a chart index part 58, a row/column data part 59, and a chart data part 60. FIG. 6A shows a memory structure of the chart index part 58. FIG. 6B shows a memory structure of the row/column data part 59. FIG. 6C shows a memory structure of the chart data part 60.

The chart data part 38 stores data of plural charts. In the chart index part 58, a memory area 61 is set for each chart which is stored in the chart data part 38. In the memory area 61, areas 62 to 65 each having a fixed length are set. In the area 63, the number of columns of a chart is stored. In the area 64, the number of rows of a chart is stored. The area 65 stores a start address of an area in which data related to the chart are stored, in the row/column data part 59.

Among the areas 62 to 65, if the memory area 61 is 28 bytes, for instance, the area 62 is set to have 20 bytes, the areas 63, 64 are each set to have 2 bytes, and the area 65 is set to have 4 bytes. With such fix lengths, the areas 63, 64 can count the number of columns and rows up to 65536. The area 65 can designate the address of the row/column data part 59 up to 4 giga byte.

The row/column data part 59 stores data which are related to the widths of the columns and the rows of a chart. When the chart 50 shown in FIG. 5 is formed by M columns and N rows, in the row/column data part 59 which corresponds to the chart 50, N memory areas 68 and M memory areas 69 are set. The memory areas 68 are divided into areas 70, 71. The area 70 of each memory area 68 stores data which express the width of each column. The area 71 stores a start address of an area in which data to be displayed at a start element of the associated column in the chart data part 60 is stored.

The chart data part 60 stores data which express data which are to be displayed at each element of the chart 50. In the chart 50, each element is designated by the numbers of a column and a row to which the element belongs to. For instance, an element which is a region 76 belonging to the second column and the sixth row will be referred to as "an element (26)."

In the chart data part 60, (N×M) memory areas 78 are set with respect to the single chart 50. In each memory area 78, data to be displayed at each element of the chart 50 are sequentially stored. For example, data to be displayed are stored primarily in an ascending order of the column numbers and secondarily in an ascending order of the row numbers. That is, to the (N×M) memory areas 78, after data from "an element (11)" on the first column and the first row to "an element (1M)" on the first column and an M-th row are stored from the start area 78, data of "an element (21)" belonging to the second column and the first row are stored. The memory areas 78 are areas having fixed lengths. At the end of data stored in each memory area 78, a hexadecimal code "FF" is attached as a delimiter against other memory area.

Figure 7:
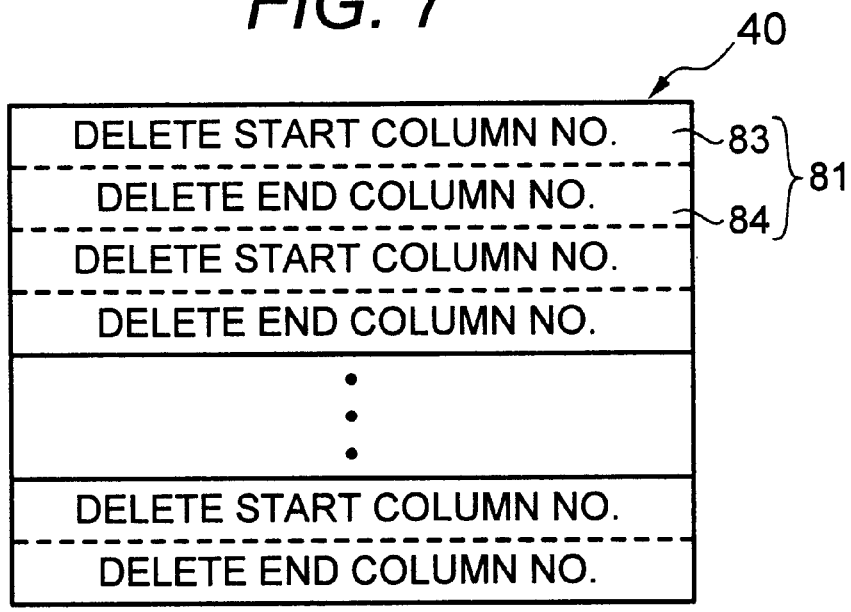
FIG. 7 is a view showing a memory structure of a column delete part 40 of the memory 37 shown in FIG. 4.
Figure 8:
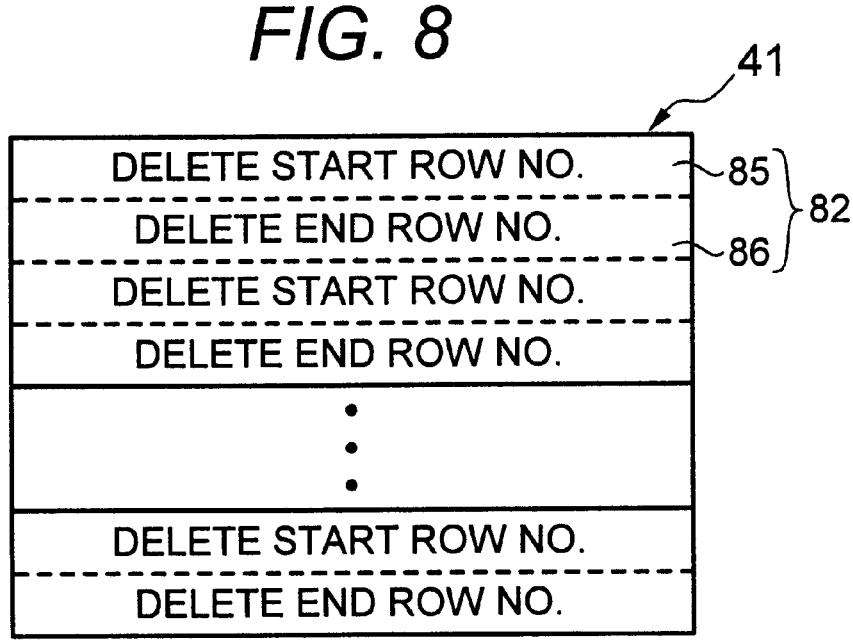
FIG. 8 is a view showing a memory structure of a row delete part 41 of the memory 37 shown in FIG. 4.

FIG. 7 is a view showing a memory structure of a column delete part 40 of the memory 37 shown in FIG. 4. FIG. 8 is a view showing a memory structure of a row delete part 41 of the memory 37 shown in FIG. 4. As described below, in the electric device 1 according to this preferred embodiment, by designating columns and rows of the chart 50 which is displayed in the display screen of the display means 2, it is possible to perform a deleting operation of deleting a designated column or row from the display screen. In deleting operation at one time, one or serially numbered plural columns or rows can be deleted. Columns or rows which are deleted by the deleting operation at one time are considered as one block.

The column delete part 40 and the row delete part 41 include memory areas 81, 82 which are as many as the number of blocks which are deleted by each deleting operation. The memory areas 81 are divided into areas 83, 84. The area 83 stores the number of a column having the smallest number, namely, the number of a delete start column, i.e., the first column which is deleted, among the columns of an optional block which is deleted. The area 84 stores the number of a delete end column having the largest number out of the optional block which is deleted. In a similar manner, the memory area 82 is divided into areas 85, 86. The areas 84, 85 respectively store the number of a delete start row and the number of a delete end row. The memory areas 81, 82 and the areas 83 to 86 are areas having fixed lengths.

Figure 9:
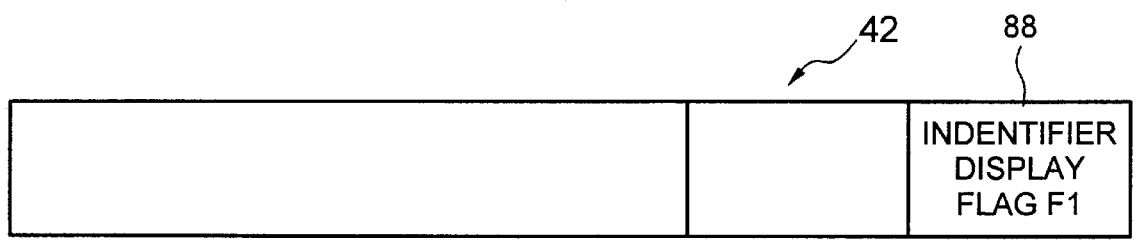
FIG. 9 is a view showing a memory structure of a flag part 42 of the memory 37 of the electric device 1 shown in FIG. 4.

FIG. 9 is a view showing a memory structure of the flag part 42 of the memory 37 shown in FIG. 4. In the flag part 42, a memory area 88 is set, for instance, which stores an identifier display flag F1 which will be described below. The memory area 88 is set to have a fixed length of 1 byte. The identifier display flag F1 is a flag for designating whether to display an identifier which will be described below.

Figure 10:
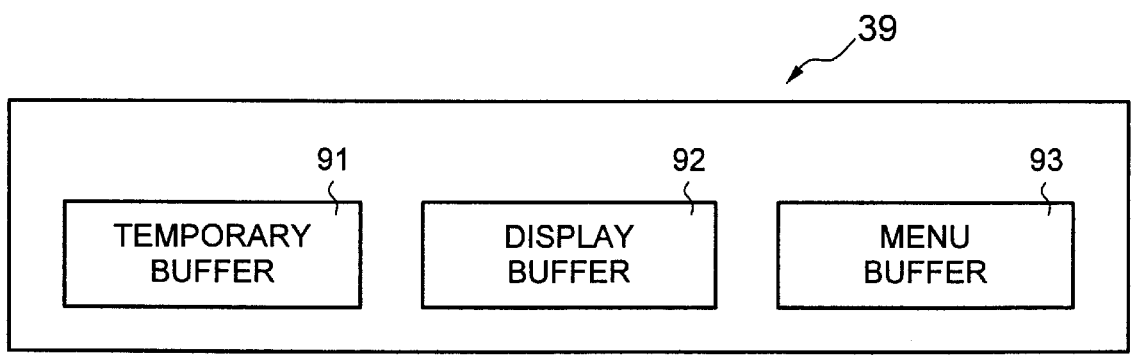
FIG. 10 is a view showing a structure of a buffer part 39 of the memory 37 of the electric device 1 shown in FIG. 4.

FIG. 10 is a view showing a memory structure of the buffer part 39 of the memory 37 shown in FIG. 4. In the buffer part 39, a temporary buffer 91, a display buffer 92, a menu buffer 93 are set. The temporary buffer 91 temporarily stores the number which is assigned to a column or row which is deleted from the display screen, during deleting or restoration of a row or column which will be described below. The menu buffer 93 is a delete memory which stores data which are needed for a menu display of an identifier which will be described below.

The display buffer 92 is a display memory which stores the entire display data of an image of a chart which is displayed in the display screen. The memory capacity of the display buffer 92 is larger than the display screen of the display means 2, for instance, and is set to correspond to a virtual display screen which is enough large to entirely display a virtual image of the chart 50 shown in FIG. 5.

Hence, the display buffer 92 stores data for displaying the virtual image of the chart 50.

The data of a chart stored in the chart data part 38 of the memory 37 are compressed, in general, and in many cases, are in a different format from that of data for displaying the image of the chart in the display screen. The display buffer 92 converts and stores the data of the virtual image of the chart 50 in a format which can be displayed, in correspondence to the virtual display screen which is larger than the actual display screen. Hence, when the image of the chart is scrolled and moved so that the image of the chart which used not to be displayed in the display screen before scrolling is newly displayed in the display means 2, an operation is performed faster than in a case where the data of the chart data part 38 are developed into a displayable format every time scrolling is performed.

Figure 11:
FIG. 11 shows a displayed image 96 which is displayed in a display screen of display means 2 of the electric device 1 shown in FIG. 1.

The virtual image of the chart 50 to be processed within the electric device 1 according to the present invention is set independently of the size of the display screen of the display means 2. Hence, the size of the virtual image of the chart 50 becomes larger than the size of the display screen of the display means 2 in some cases. FIG. 11 shows a displayed image 96 of the chart 50 of FIG. 5 which is displayed as it is in the display screen of the display means 2 of the electric device 1 shown in FIG. 1.

In the displayed image 96, images of an end button 98 and move buttons 99, 100 are drawn together with a partial image of the chart 50. The end button 98 and the move buttons 99, 100 are each formed as combination of an oval image which is drawn in the displayed image 96 and a partial region of the coordinates inputting means 3 which is positioned immediately on the displayed image 96 when the displayed image 96 is displayed in the display screen. That is, when coordinates of a point which is input to the coordinates inputting means 3 denote a point of the coordinates inputting means 3 of a portion which overlaps the positions at which the images of the buttons 98 to 100 are drawn within, the buttons 98 to 100 are judged to be manipulated. In other words, the partial region of the coordinates inputting means 3 which is partitioned by an image which is displayed by the display means 2 is used as an entry key. When coordinates of the partitioned region are detected, a function which is expressed by the image which is displayed by the display means 2 immediately below the partitioned region is executed.

Further, with respect to the buttons each set as combination of the display means 2 and the coordinates inputting means 3, only by changing a program which defines a relationship between input two-dimensional coordinates and a displayed image, it is possible to change the positions of the buttons in an easy manner. Hence, it is possible to use the display screen of the display means which is disposed within an electric device which has a limited size, e.g., a small electric scheduler, as large as possible.

A display range of the displayed image 96 is smaller than the display range of the chart 50 shown in FIG. 5. Hence, the chart 50 which is drawn within the displayed image 96 is displayed as it lacks the tenth to twelfth columns and the eighteenth to the thirty-sixth rows, for instance. In the electric device 1, when the display range of a chart is larger than the display screen, only a partial image of the chart is displayed.

When a value of the second column is to be compared with a value of the twelfth column in the chart 50 which is displayed in the electric device 1, for example, a user moves a displayed image by scrolling to display the desired columns in the display screen, stores the values of these columns, and compares the values. In this embodiment, of the columns and the rows of the chart 50, a column or row which is not needed for the time being is deleted so that images of only desired columns and rows are displayed in the display screen.

Figure 12:
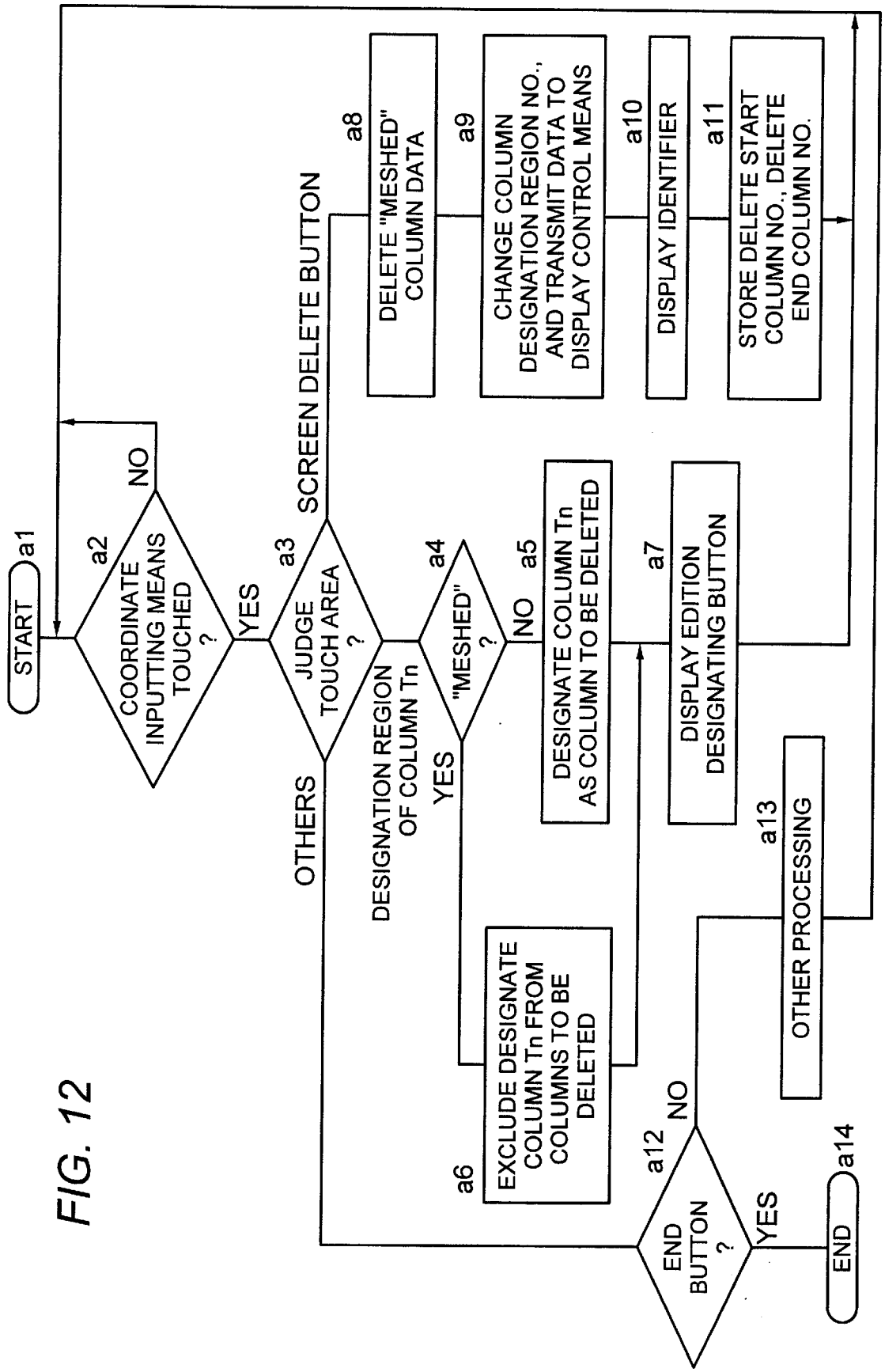
FIG. 12 is a flow chart for describing a column deleting operation of deleting a designated column from the displayed image 96 shown in FIG. 11, using the electric device 1 shown in FIG. 1.

FIG. 12 is a flow chart for describing a column deleting operation of deleting a designated column from the displayed image 96 shown in FIG. 11, using the electric device 1 shown in FIG. 1. In this operation, a column to be deleted is designated and deleted from the chart 50 which is displayed in the display screen of the display means 2.

Proceeding from a step a1 to a step a2, whether entry of coordinates into the coordinates inputting means 3 has been executed is judged. When the pen 5 is detached from the coordinates inputting means 3 after the coordinates inputting means 3 is pressed by the pen 5, entry is judged to have been executed. The sequence returns to the step a2 when there is no entry of coordinates, but advances to the step a3 when there is entry of coordinates.

At the step a3, based on an output from the coordinates inputting means 3, the position detecting means 21 judges a coordinate value, i.e., coordinates of the input point. Positional information output from the position detecting means 21 is supplied to the central processing unit 22. The central processing unit 22 judges in which position within the displayed image 96 displayed in the display screen the input coordinates correspond, based on data and a program which are stored in the memory 33 and display data which are stored in the display buffer 92 of the buffer part 39 of the memory 37.

In this embodiment, of the displayed image which is displayed in the display screen, the coordinates inputting means 3 in a predetermined range which is located immediately above predetermined images, such as the buttons 98 to 100 and the designated regions T, Y, is distinguished as a touch area which corresponds to each image. When a point within the touch area is pressed, operations related to the buttons and the regions which are displayed as images immediately below the touch area are judged to be executed. When the input coordinates are in a touch area of a designated region which is added to an n-th column, the sequence proceeds to a step a4. In the following, the n-th column will be indicated as "COLUMN Tn" in the drawings. At the step a4, whether an image of the n-th column is processed by half-tone dot meshing is judged. A column processed by half-tone dot meshing is a column which is designated as a column to be deleted. Alternatively, to denote a column to be deleted, other method may be used rather than processing the image of the column by half-tone dot meshing. When the n-th column is not processed by half-tone dot meshing, the sequence proceeds to a step a5, to thereby process the image of the area of the designated n-th column by half-tone dot meshing. When the n-th column is processed by half-tone dot meshing, the sequence proceeds to a step a6 from the step a4, meshing of the n-th column is canceled so that the n-th column returns to its original condition.

In short, when the touch area of the designated region is touched, if the last touching is an odd-numbered touching, the column is designated as a column to be deleted. If the last touching is an even-numbered touching, the column is excluded from columns to be deleted. When a user looks at and manipulates the display screen by processing a column is designated as a column to be deleted by half-tone dot meshing, the user can easily visually recognize and confirm which column is designated as a column to be deleted. When designation and canceling of a column to be deleted are completed, the sequence proceeds from the steps a5 and a6 to a step a7.

At the step a7, an edition designating button is displayed which instructs to execute processing on a column which is designated as a column to be deleted. In deletion in this flow chart, for instance, the image of a screen delete button is displayed. When the edition designating button is displayed, the sequence returns from the step a7 to the step a2.

Figure 13:
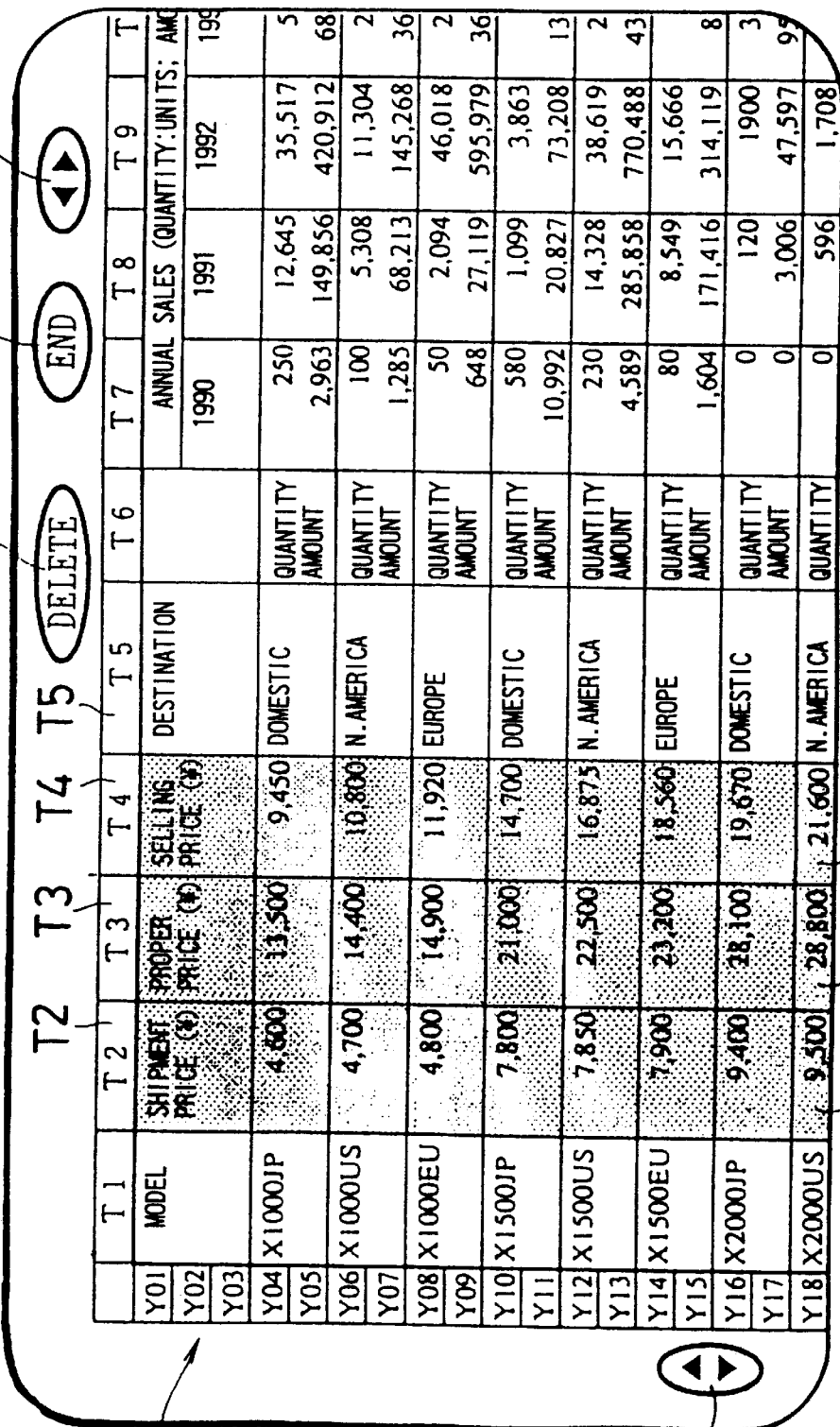
FIG. 13 shows a displayed image 101 which is displayed in the display screen of the display means 2 of the electric device 1 shown in FIG. 1.

FIG. 13 shows a displayed image 101 as it is displayed with a column to be deleted designated and with the image of the screen delete button 105 displayed at the steps a1 to a7. In the displayed image 101, touch areas of the designation regions T2 to T4 are touched, so that the second to the fourth columns are designated as columns to be deleted. The images 102 to 104 of the second to the fourth columns are processed by half-tone dot meshing. Although only elements which belong to the first to the eighteenth rows among the second to the fourth columns are processed by half-tone dot meshing in the displayed image 101, elements which belong to the nineteenth to the thirty-sixth rows of the second to the fourth columns are also recognized as columns to be deleted by the electric device 1, and therefore, by scrolling the displayed image 101 and displaying a partial image which is not displayed, it is possible to confirm these elements as well.

Further, images of the end button 98, the move buttons 99, 100 and the screen delete button 105, which serves as the edition designating button used in this flow chart, are also drawn in the displayed image 101. When the touch area of the screen delete button 105 is touched, the second to the fourth columns which are designated as columns to be deleted are deleted from the displayed image.

Referring to FIG. 12 once again, at step a3 of judgement of touch area, when input coordinates are in a touch area which is located immediately above the screen delete button 105 of the displayed image 101 shown in FIG. 13, the sequence proceeds to a step a8 from the step a3. At the step a8, data of columns to be deleted are deleted from the display data stored within the display buffer 92. This means that the images of the columns to be deleted are deleted from the image of the chart 50. Next, on the image, the display data are corrected so that images of columns having numbers which follow those of the deleted columns are moved close to columns having numbers which are followed by those of the deleted columns and so that a space which is created by deleting the images of the columns is filled up. In addition, during deleting of data, the number of a column which is to be deleted is stored in the buffer part 39.

For instance, in the displayed image 101 shown in FIG. 13, the images 102 to 104 of the second to the fourth columns and the designation regions T2 to T4 are deleted. Following this, images of the fifth to the twelfth columns and images of the designation regions T5 to T12 which are added to the fifth to the twelfth columns are moved close to the images of the first column and the designation region. When these images are moved close, the sequence proceeds to a step a9 from the step a8.

At the step a9, the display data are corrected so that the column numbers which are displayed in the designation regions which are added to the column having numbers which follow those of the deleted columns are changed. For instance, in the displayed image 101 shown in FIG. 13, "T5" is displayed at the designation region T5 on the fifth column. When the images of the second to the fourth columns are deleted and the fifth to the twelfth columns are moved close, the number which is displayed in the designation region is sequentially changed by a number corresponding to deleted columns. In the case of the designation region T5, for example, a display is changed from "T5" to "T12." A similar operation is performed on the designation regions of the sixth to the twelfth columns. When the number of the designation region is changed, the display data which are corrected so that a column is deleted and a display of the designation region T is changed are transmitted to the display control means 23. Upon transmission of the data, the sequence proceeds to a step a10 from the step a9.

At the step a10, within the display screen of the display means 2, an identifier which denotes the position at which a deleted column used to be displayed is displayed at a start position or an end position of the deleted column. Upon displaying of the identifier, the sequence proceeds to a step a11 from the step a10. At the step a11, of the numbers of the columns-to-be-deleted which are stored in the temporary buffer 91, with the smallest number as the delete start column, the numbers are stored in the area 83 of the column delete part 40 of the memory 37. In a similar manner, with the largest number as the delete end column among the numbers of the columns-to-be-deleted, the numbers are stored in the area 84. When the numbers of the columns-to-be-deleted are stored, the sequence returns to the step a2 from the step a11.

FIG. 14 shows a displayed image 107 as it is processed by the processing at the steps a3, a8 to a11 on the displayed image 101 shown in FIG. 13. In the displayed image 107, the second to the fourth columns are deleted from the chart 50, the image of a chart 50a in which designation regions which are added to the fifth to the twelfth columns is displayed. At the same time, an identifier 109 which is shaped like a reversed triangle is displayed to point a ruling line 108 between the adjacent first and fifth columns. The identifier 109 is displayed to point the position at which the second to the fourth columns used to be displayed before the second to the fourth columns are deleted. The identifier 109 is not limited to a reversed triangle identifier, but may have other configuration. Alternatively, the ruling line 108, which is a boundary line of the position at which the second to the fourth columns used to be displayed, may be shown as a double line or in a different color, or other processing may be performed for the purpose of displaying.

In this manner, when a chart which requires a larger display range than the width of the display screen is to be displayed, the width of the chart 50 along a horizontal direction which is perpendicular to the columns can be reduced narrower than the width of the display screen. This makes it possible to display the entire chart without scrolling and moving the displayed image nor switching the displayed image. Columns-to-be-deleted are preferably columns in which data which are not needed for the time being during use of the chart 50 are described, for example. Further, columns-to-be-deleted are preferably columns in which data to be concealed from a third party who looks at the chart 50 are described.

Referring back to FIG. 12, when at the step a3 of judgement of touch area, input coordinates are judged to be in areas other than the designation region Tn of the n-th column and the touch area of the screen delete button 105, of the areas of the entire coordinates inputting means 3, the sequence proceeds to a step a12 from the step a3. At the step a12, whether the input coordinates are in the touch area of the end button 98 is judged. If the input coordinates are not in the touch area of the end button 98, the sequence proceeds to a step a13 at which processing corresponding to the touch area which includes the input coordinates is executed. For instance, when the input coordinates are in the touch areas of the move buttons 99, 100, scrolling to move the chart which is displayed in the display screen in the vertical direction and the horizontal direction is performed. On the other hand, when the coordinates are in portions except for the designation region T and the buttons 98 to 105, processing corresponding to the coordinates is executed. Upon completion of other processing at the step a13, the sequence returns to the step a2.

When the input coordinates are in the touch area of the end button 98 at the step a12, the sequence proceeds to a step a14 from the step a12, to thereby conclude the processing which is shown in the flow chart.

Through such processing as above, the image of a designated column is deleted from the image of the chart which is displayed in the display screen, so that the horizontal width of the image of the chart is reduced.

By the first deleting operation, it is possible to delete plural columns. When plural columns are to be deleted, the number of the columns to be deleted are separated from each other in some cases. In this case, assuming that the second and the third columns and the seventh and the eighth columns are the columns which are to be deleted, for instance, after touching the touch areas assigned to the designation regions T2, T3, T7, T8 which are added to the respective columns and thereby designating the respective columns, the touch area of the screen delete button 105 is touched. As a result, there are two identifiers 109, one pointing the position at which the second and the third columns used to be displayed, and the other pointing the position at which the seventh and the eighth columns used to be displayed. Further, when plural columns which are far away from each other are to be deleted, the seventh and the eighth columns may be deleted after deleting the second and the third columns.

In the memory areas of the column delete part 40 and the row delete part 41 of the memory 37, plural columns to which successive numbers are assigned out of the deleted plural columns are stored as one block. That is, the plural columns whose delete position is displayed by one identifier are stored as one block.

Figure 15:
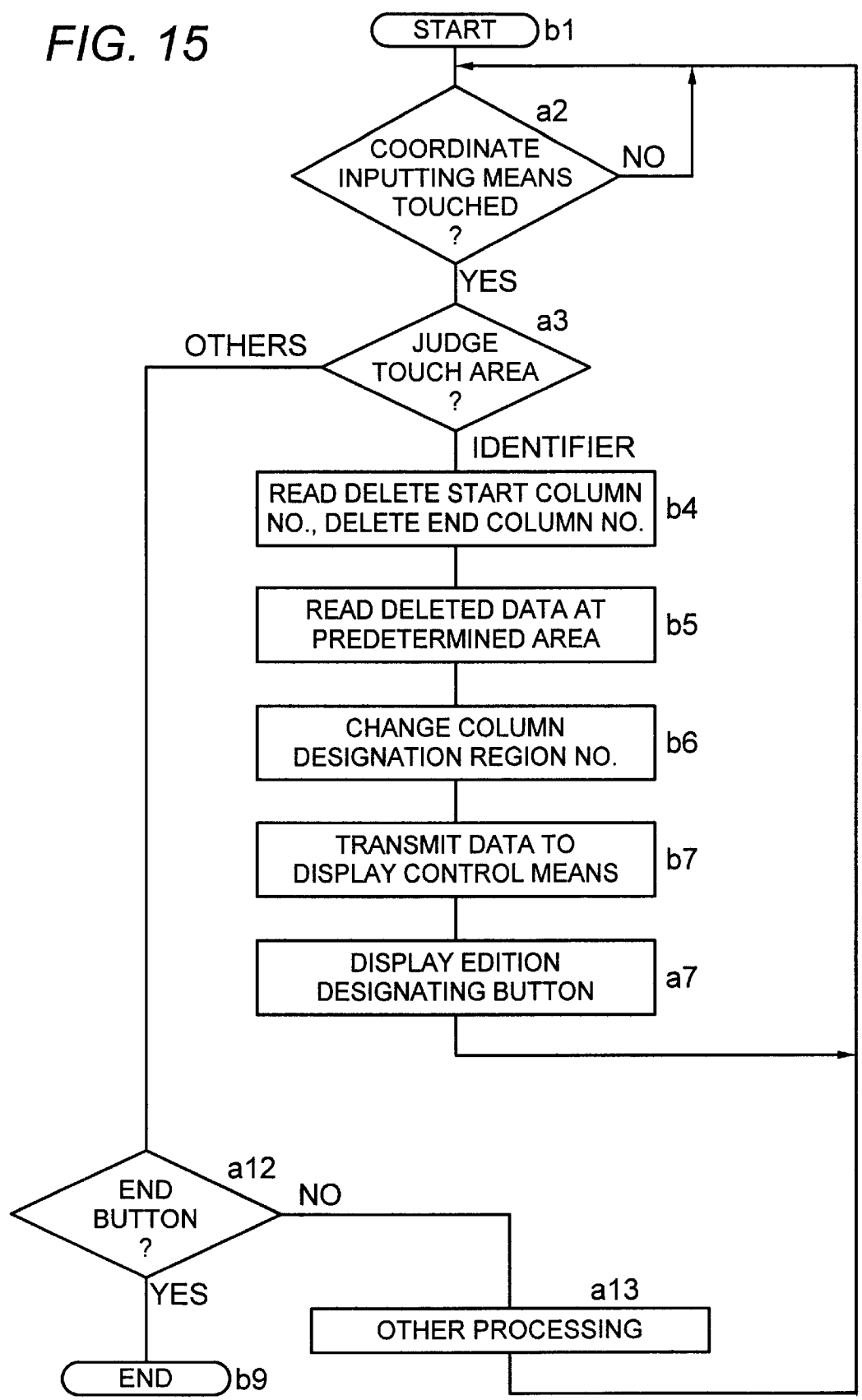
FIG. 15 is a flow chart for describing a column restoring operation of restoring a column which is deleted from the displayed image 107 shown in FIG. 14, using the electric device 1 shown in FIG. 1.

The electric device 1 of the embodiment is capable of restoring a deleted column at the original delete position. FIG. 15 is a flow chart for describing a column restoring operation of restoring a column which is deleted from the displayed image 107 shown in FIG. 14, using the electric device 1 shown in FIG. 1. The flow chart in FIG. 15 is similar to the flow chart in FIG. 12, and therefore, identical reference characters are assigned to steps at which identical operations are performed. A redundant description will be simply omitted.

In the condition where the displayed image 107 shown in FIG. 14 is displayed, the sequence proceeds to the step a2 from a step b1. At the step a2, whether the coordinates inputting means 3 is touched is judged. When the coordinates inputting means 3 is touched, the sequence proceeds to the step a3 to judge a touch area. When the coordinates inputting means 3 is not touched, the sequence returns to the step a2.

If the input coordinates are judged as a touch area on the identifier 109 at the step a3, the sequence proceeds to a step b4 from the step a3. At the step b4, the numbers of a delete start column and a delete end column which are deleted at the position which is denoted by the identifier are read from a memory area which corresponds to the identifier which is touched within the column delete part 40 of the memory 37, and stored in the temporary buffer 91 of the buffer part 39. Upon storing of the numbers, the sequence proceeds to a step b5 from the step b4. At the step b5, data of the deleted columns are read and inserted at the position at which the data of the columns of the display buffer 92 of the buffer part 39 are deleted. The sequence then proceeds to a step b6.

At the step b6, the number which is displayed in the designation region T of each column is changed. When a column is deleted, the numbers are changed so that the numbers displayed in the designation regions do not skip at the deleted column. When the deleted column is restored, since the same number appears as the number which is displayed in the designation region, the changed number is returned to the original number to correct the displayed number. Upon correction of the number, the sequence proceeds to a step b7 from the step b6. At the step b7, the display data of the chart with the column restored and the number corrected are transmitted from the display buffer 92 to the display control means 23 and displayed by the display means 2. Upon transmission of the data, the sequence proceeds to a step a7 from the step b7. At the step a7, the images of the buttons 98 to 100 are displayed and the sequence returns to the step a2. In this manner, only by touching a touch area immediately above an identifier which denotes a deleted column, the display means 2 can display the deleted column.

If at the step a3 the input coordinates are judged to be coordinates which are in a region other than the touch area of the identifier, the sequence proceeds to the step a12 at which whether the input coordinates are in the touch area of the end button 98 is judged. If the input coordinates are therein, the sequence proceeds to the step a13, and returns to the step a2 after performing other processing. Otherwise, the sequence proceeds to a step b9 from the step a12, to thereby complete the processing which is illustrated in the flow chart.

Figure 16:
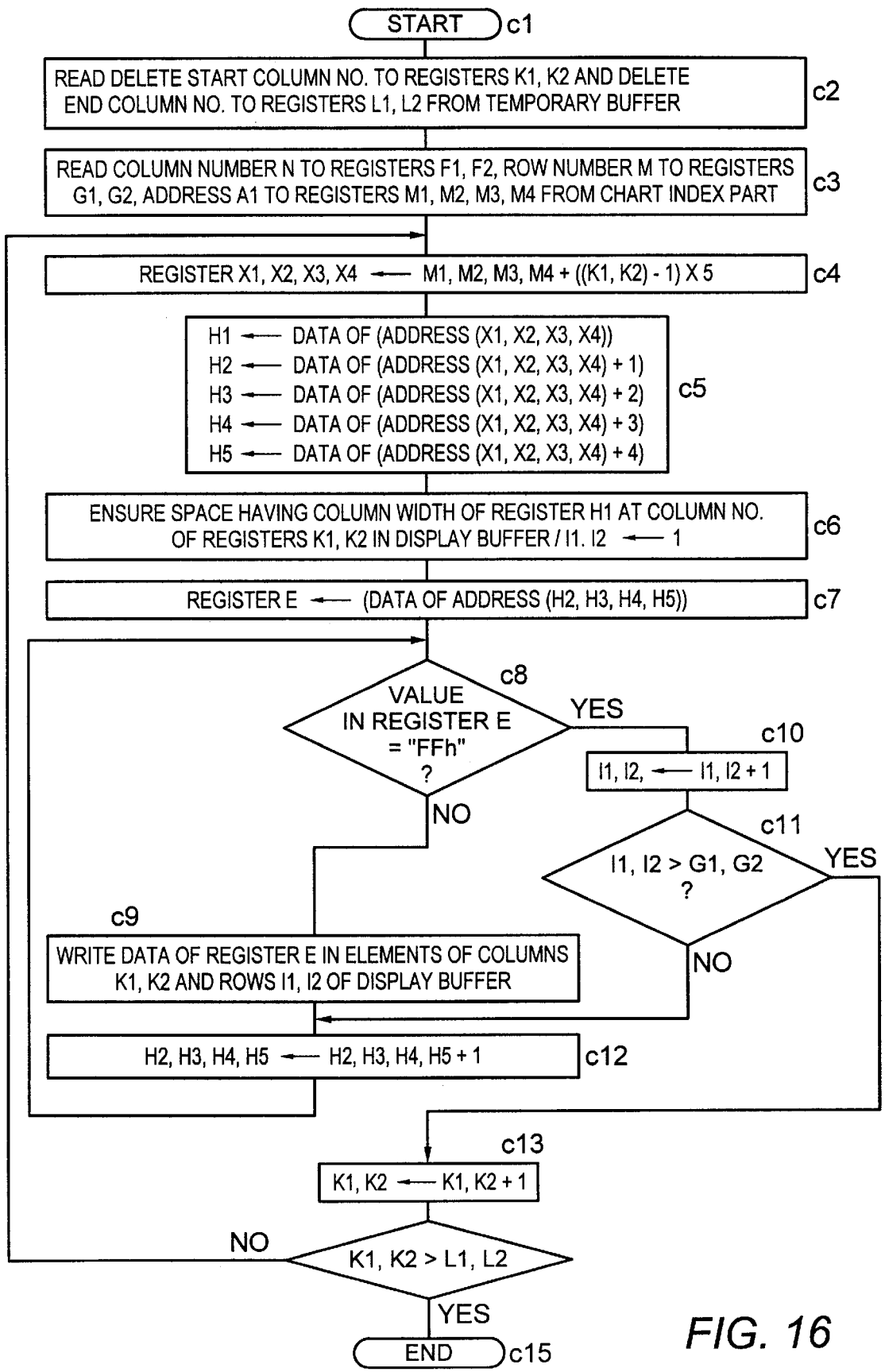
FIG. 16 is a flow chart for describing a reading operation of reading data of a deleted column element into a predetermined data area at a step b5 of the flow chart shown in FIG. 15.

FIG. 16 is a flow chart for describing a reading operation of reading data of a deleted column at the step b5 of the flow chart shown in FIG. 15.

Upon reading of the numbers of the delete start and end columns, the sequence proceeds to a step c2 from a step c1. At the step c2, the central processing unit 22 reads the number of the start column from the temporary buffer 91 of the buffer part 39 of the memory 37 to registers K1, K2. At the same time, the number of the delete end column is read to registers L1, L2. Upon reading, the sequence proceeds to a step c3 from the step c2. At the step c3, the central processing unit 22 reads the number N of the columns from the chart index part 58 of the chart data part 38 to registers F1, F2. The central processing unit 22 reads the number M of the rows to registers G1, G2, in a similar manner. Further, the central processing unit 22 reads an address A to registers M1 to M4. Upon reading, the sequence proceeds to a step c4 from the step c3. At the step c4, an address for reading data of the chart data part 60 corresponding to the values of the registers K1, K2 storing the number of the delete start column is set in registers X1 to X4. Values stored in the registers X1 to X4 are calculated by the following formula:

$$X1, X2, X3, X4 \leftarrow M1, M2, M3, M4 + ((K1, K2) - 1) \times 5 \quad (1)$$

The first term of the formula is a start address of row/column data of a chart which is to be processed. The second term denotes the length of a memory area measured the start address of the chart to an end address of a memory area which stores row/column data of a column whose assigned number is one number smaller than the number of the start column of the deleted columns.

Hence, the registers X1 to X4 are a start address of a memory area which stores the width of the delete start column and the start address of the chart data part. The reason for multiplying the value which is obtained by subtracting one from the column number by five in the second term is that the memory area 68 of the row/column data part 59 is set to a fixed length of 5 bytes in the embodiment. That is, in the second term, the number which is smaller than the column number by one is multiplied by the number which is equal to the byte number of the memory area 68. Upon setting of the registers X1 to X4, the sequence proceeds to a step c5 from the step c4.

At the step c5, in accordance with the values in the registers X1 to X4, from the memory area of the address within the row/column data part 59, a start address of the area storing the width of the delete start column and data of an element of the column of the chart data part 60 are read. For example, data of areas whose addresses are equal to the values in the registers X1 to X4 are stored in a register H1. In registers H2 to H5, data of areas whose addresses are larger than the values in the registers X1 to X4 by 1 to 4 are stored. In other words, the data which are stored in the area 70 are stored in the register H1, whereas the data which are stored in the area 71 are stored in the registers H2 to H5. Upon reading from the row/column data part 59, the sequence proceeds to a step c6 from the step c5.

At the step c6, a space having a column width of the column which is stored in the register H7 is set at the position of a column whose number is equal to the values in the registers K1, K2 of the display buffer 92, i.e., the position of the delete start column. As a result, an area for storing the data of the column to be restored in the display buffer 92 is ensured. At the same time, of the elements which belong to an optional column to be restored which will be described below, 1 is substituted as a value in counters I1, I2 which counts the number of elements to which data are read, to thereby initialize the counters. Upon initializing of the counters, the sequence proceeds to a step c7 from the step c6.

At the step c7, within the chart data part 60, data which are stored at an address which is equal to the value stored in the registers H2 to H5, are read and stored in a register E. Upon reading, the sequence proceeds to a step c8 at which whether the value stored in the register E is "FFh" is judged. The value "FFh" is a hexadecimal code, i.e., data which denote a delimiter between data of the respective elements. Hence, when "FFh" is stored in the register E, data of elements which are to be read are all judged to be read. In this case, the sequence proceeds to a step c10, to thereby add 1 to the counters I1, I2 and update the counters I1, I2. The sequence proceeds to a step c11 from the step c10, to thereby judge whether the updated values in the counters I1, I2 are larger than the values in the registers G1, G2 which store the number M of the rows. If the updated values in the counters I1, I2 are not larger than the values in the registers G1, G2, the sequence proceeds to a step c12. If the updated value in the counters I1, I2 are larger than the values in the registers G1, G2, the sequence proceeds to a step c13 from the step c11.

When the value stored in the register E is not "FFh," the sequence proceeds to a step c9 from the step c8. At the step c9, data which are stored in the register E are written in the space which is ensured by the display buffer 92 at the step c6, i.e., a portion which corresponds to an element which belongs to the row whose number is in the counters I1, I2.

The sequence proceeds to a step c12 from the step c9. At the step c12, 1 is added to each one of the values in the registers H2 to H5 to update the registers H2 to H5. The sequence then returns to the step c7. In other words, at the step c7 to the step c12, the elements belonging to the deleted columns are written in the space which is ensured at the step c6, sequentially in the order of the column number from 1 to M.

When at the step c11 the values in the counters I1, I2 are judged to be larger than the values in the registers G1, G2 which store the number M of the rows, the sequence proceeds to a step c13. At the step c13, 1 is added to the registers K1, K2 which store the number of the delete start column to update the registers K1, K2. The sequence then proceeds to a step c14. At the step c14, whether the updated values in the registers K1, K2 are larger than the values in the registers L1, L2 which store the number of the delete end column is judged. If the updated values in the registers K1, K2 are not larger than the values in the registers L1, L2, the sequence returns to the step c4 to restore the deleted column with the subsequent number. If the updated values in the registers K1, K2 are larger than the values in the registers L1, L2, judging that all deleted columns to be restored are restored, the sequence proceeds to a step c15 from the step c14, thereby completing the processing which is illustrated in the flow chart.

The registers and the counters described above are all set in the memory part 25 of the central processing unit 22. The chart data part 38 stores the chart data divided in the chart index part 58, the row/column data part 59, and the chart data part 60, in order to quickly read the data when the data within the chart data part 60 needs be partially retrieved for the purpose of restoring a deleted column, etc. Hence, in the embodiment it is possible to quickly read necessary data during restoration of a deleted column.

Further, in the embodiment only the numbers of the start and the end columns of deleted columns are stored in a memory area of the column delete part 40. In response to an instruction demanding to restore a deleted column, detailed data are read from the chart data part 38. As another embodiment of the invention, data of all of deleted columns may be stored in the memory 37, and in response to an instruction demanding to restore a deleted column, data of the demanded column may be retrieved from the data of all deleted columns and displayed.

Figure 17:
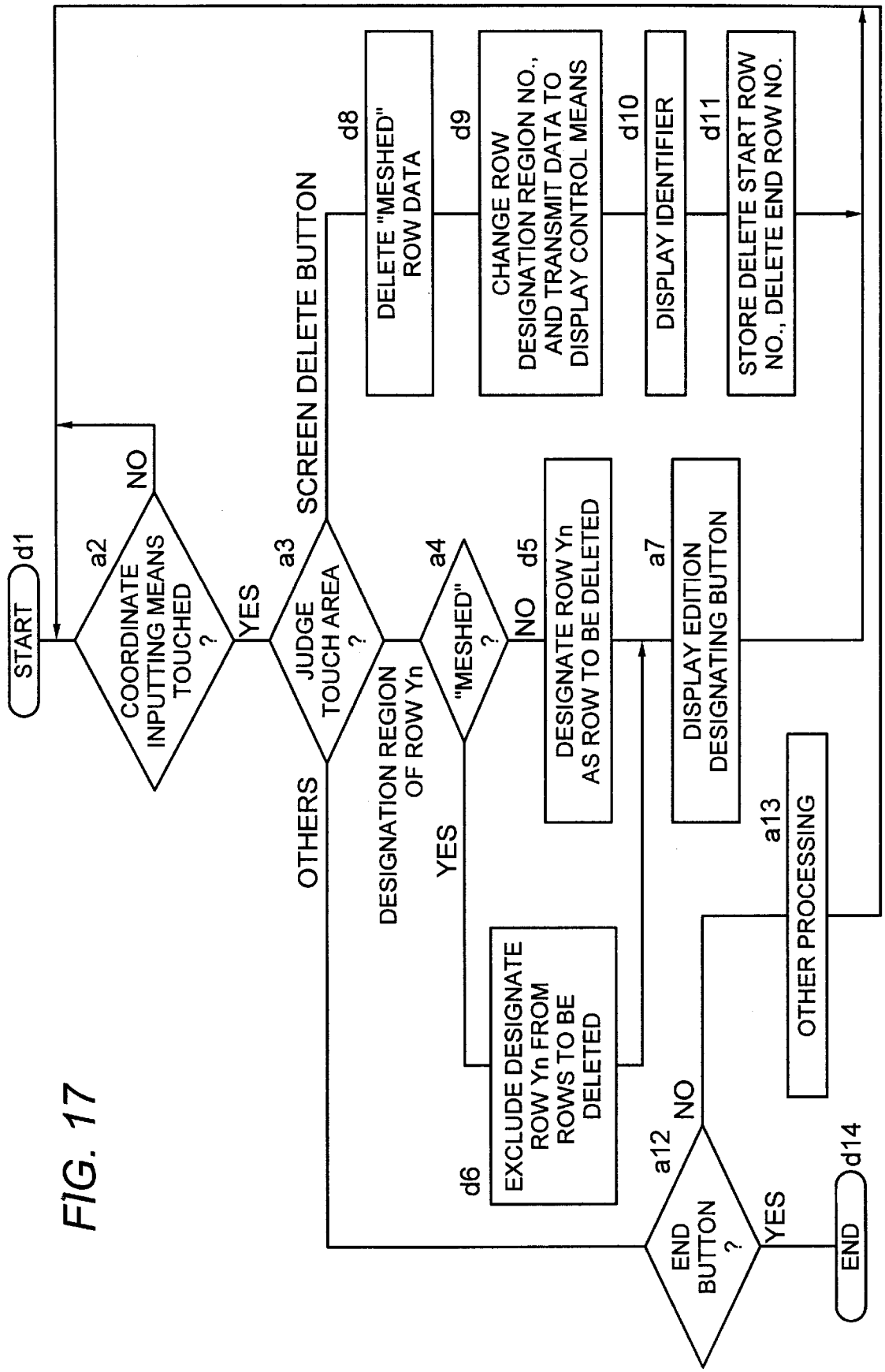
FIG. 17 is a flow chart for describing a row deleting operation of deleting a designated row from the displayed image 96 shown in FIG. 11, using the electric device 1 shown in FIG. 1.

Similarly to deleting and restoration of columns of a chart, the electric device 1 is capable of deleting and restoring rows. FIG. 17 is a flow chart for describing a row deleting operation of deleting a designated row, in a condition where the displayed image 96 shown in FIG. 11 is displayed in the display screen of the display means 2, using the electric device 1 shown in FIG. 1. The flow chart in FIG. 17 is similar to the flow chart in FIG. 12, and therefore, identical reference characters are assigned to steps at which identical operations are performed. A redundant description will be simply omitted.

In a condition where the displayed image 96 is displayed in the display screen of the display means 2, the sequence proceeds to the step a2 from a step d1, to thereby judge whether the coordinates inputting means 3 is touched. When the coordinates inputting means 3 is not touched, the sequence returns to the step a2. When the coordinates inputting means 3 is touched, the sequence proceeds to the step a3 to judge a touch area. When input coordinates are a designation region Yn which is added to an n-th row, the sequence proceeds to the step a4 from the step a3, to thereby judge whether the n-th row is processed by half-tone dot meshing and designated as a row to be deleted.

When the n-th row is not designated as a row to be deleted, the sequence proceeds to a step d5 from the step a4, to process the designated n-th row by half-tone dot meshing, designate the same as a row to be deleted, and clearly display that the n-th row is designated as a row to be deleted. When the n-th row is designated as a row to be deleted, the sequence proceeds to a step d6 from the step a4, to cancel half-tone dot meshing on the image of the designated n-th row, return the designated n-th row to the original display state, and exclude the designated n-th row from rows to be deleted. Upon designating and canceling at the step d5 and the step d6, the sequence proceeds to a step a7 to display the edition designating button. The sequence then returns to the step a2.

Figure 18:
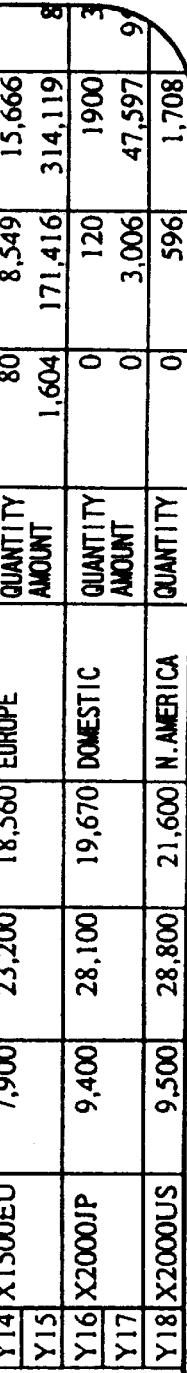
FIG. 18 shows a displayed image 111 which is displayed in the display screen of the display means 2 of the electric device 1 shown in FIG. 1.

FIG. 18 shows a displayed image 111 as it is with the displayed image 96 of FIG. 11 processed from the step d1 through the step a7. In the displayed image 111, the chart 50 and the buttons 98 to 100, 105 are displayed. Further, the images of the sixth to the ninth rows are processed by half-tone dot meshing and designated as rows to be deleted. To designate a row as a row to be deleted, the touch area of the designation region Y which is added to a row to be deleted is touched.

Referring to FIG. 17 once again, during judgement of a touch area at the step a3, when input coordinates are judged to be in the touch area of the screen delete button 105, the sequence proceeds to a step d8 from the step a3. At the step d8, data of the rows to be deleted are deleted, and the numbers of the deleted rows are stored in the temporary buffer 91. Further, the data are moved close so that the images of the rows whose row numbers are deleted are close to the images of the rows whose numbers are followed by those of the deleted rows. Upon deleting and moving of the data of the rows, the sequence proceeds to a step d9 from the step d8.

At the step d9, the number of a row which is displayed in the designation region Y is changed in accordance with the numbers of the deleted rows and the display data are corrected, so that the numbers are sequential. Upon correction of the number, the corrected display data within the display buffer 92 are transmitted to the display control means 23, and displayed by the display means 2. Upon transmission of the data, the sequence proceeds to a step d10 from the step d9. After displaying an identifier which denotes the position of the deleted rows, the sequence proceeds to a step d11. At the step d11, the number of the delete start row and the number of the delete end row which are stored in the temporary buffer 91 are stored in the memory area 82 of the row delete part 41 of the memory 37. After the processing at the step d11, the sequence returns to the step a2.

FIG. 19 shows a displayed image 117 with the processing at the step a3, d8 to d11 completed in a condition where the displayed image 111 of FIG. 17 is displayed. In the displayed image 117, the image of a chart 50b with the sixth to the ninth rows deleted and an identifier 118 are displayed. The identifier 118 is displayed to point at a ruling line 119 which expresses the position at which the sixth to the ninth rows used to be displayed. Further, of the sixth to the thirty-sixth designation regions Y06 to Y36 of the designation region Y which are added to all rows, displays within at least the designation regions Y10 to Y21, Y22 which are displayed in the display screen of the display means are corrected. Hence, in the displayed image 117, the connected designation regions Y10a to Y22a are drawn.

Referring to FIG. 17 once again, when at the step a3 of judgement of touch area, input coordinates are judged to be in region other than the designation region Y of the n-th row or the screen delete button, the sequence proceeds to the step a12. At the step a12, whether the touch area of the end button 98 is touched is judged. If the touch area of the end button 98 is not touched, the sequence is concluded after performing other processing at the step a13. If the touch area of the end button 98 is touched, the sequence proceeds to the step d14, to thereby conclude the processing which is shown in the flow chart.

Figure 20:
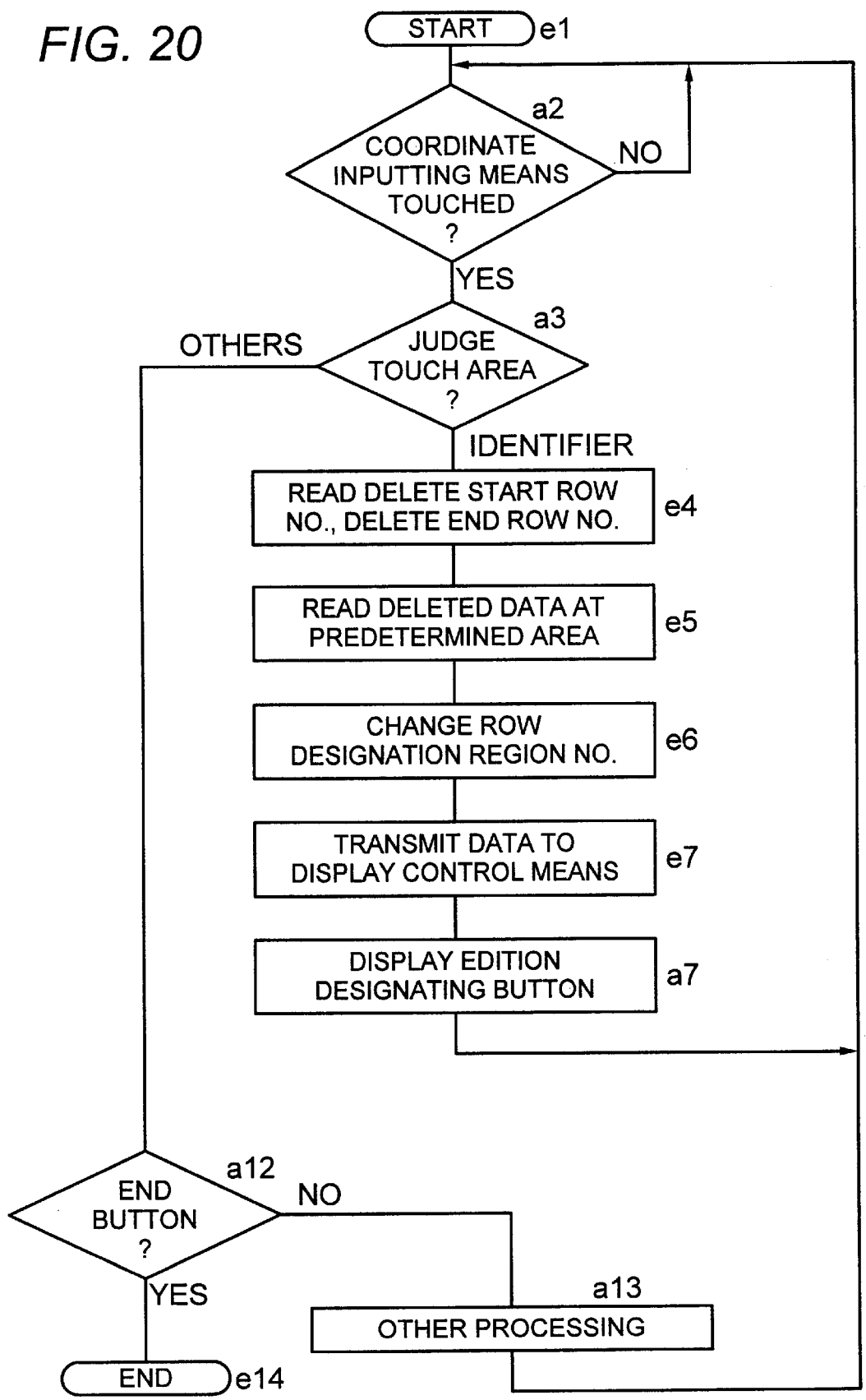
FIG. 20 is a flow chart for describing a row restoring operation of restoring a row which is deleted from the displayed image 117 shown in FIG. 19, using the electric device 1 shown in FIG. 1.

FIG. 20 is a flow chart for describing a row restoring operation of restoring a row which is deleted using the electric device 1 shown in FIG. 1, in a condition where the displayed image 117 shown in FIG. 19 is displayed. The flow chart in FIG. 20 is similar to the flow chart in FIG. 15, and therefore, identical reference characters are assigned to steps at which identical operations are performed. A redundant description will be simply omitted.

In a condition where the displayed image 117 shown in FIG. 19 is displayed, the sequence proceeds to the step a2 from a step e1. At the step a2, whether the coordinates inputting means 3 is touched is judged. When the coordinates inputting means 3 is touched, the sequence proceeds to the step a3. When the coordinates inputting means 3 is not touched, the sequence returns to the step a2. At the step a3, the touch area is judged. When input coordinates are in the touch area of an identifier, the sequence proceeds to the step e4. At the step e4, the numbers of the delete start and end rows are read from the row delete part 41 and stored in the temporary buffer 91. Upon storing of the numbers, the sequence proceeds to a step e5 from the step e4.

At the step e5, data of rows which are deleted and designated as rows to be restored are read in a predetermined area of the display buffer 92. The sequence then proceeds to a step e6. At the step e6, the number of a row which is displayed in the designation region Y is corrected. The sequence then proceed s to a step e7. At the step e7, the corrected display data within the display buffer 92 including the data of the restored rows and data regarding the number of the corrected designation region are transmitted to the display control means 23. Upon transmission of the data, the sequence proceeds to the step a7 from the step e7. After displaying the edition designating button, the sequence returns to the step a2.

Further, during judgement of a touch area at the step a3, when coordinates of a portion other than the touch area of the identifier are entered, the sequence proceeds to the step a12 to judge whether the touch area of the end button 98 is touched. When the touch area of the end button 98 is not touched, after performing other processing at the step a13, the sequence returns to the step a2. When the touch area of the end button 98 is touched, the sequence proceeds to a step e14 to complete the processing which is illustrated in the flow chart.

In this manner, by the operations which are almost similar to the column deleting operation and the column restoring operation, deleting and restoration can be realized row by row. Further, when deleting is performed row by row, it is possible to display an identifier at the delete position.

Further, at the step e5 shown in FIG. 20, the operation of reading the data of the rows which are deleted and designated as rows to be restored at the predetermined area is performed by the same operation as that described with reference to FIG. 16. In this case, the row data are read so that unnecessary row data are skipped.

Figure 21:
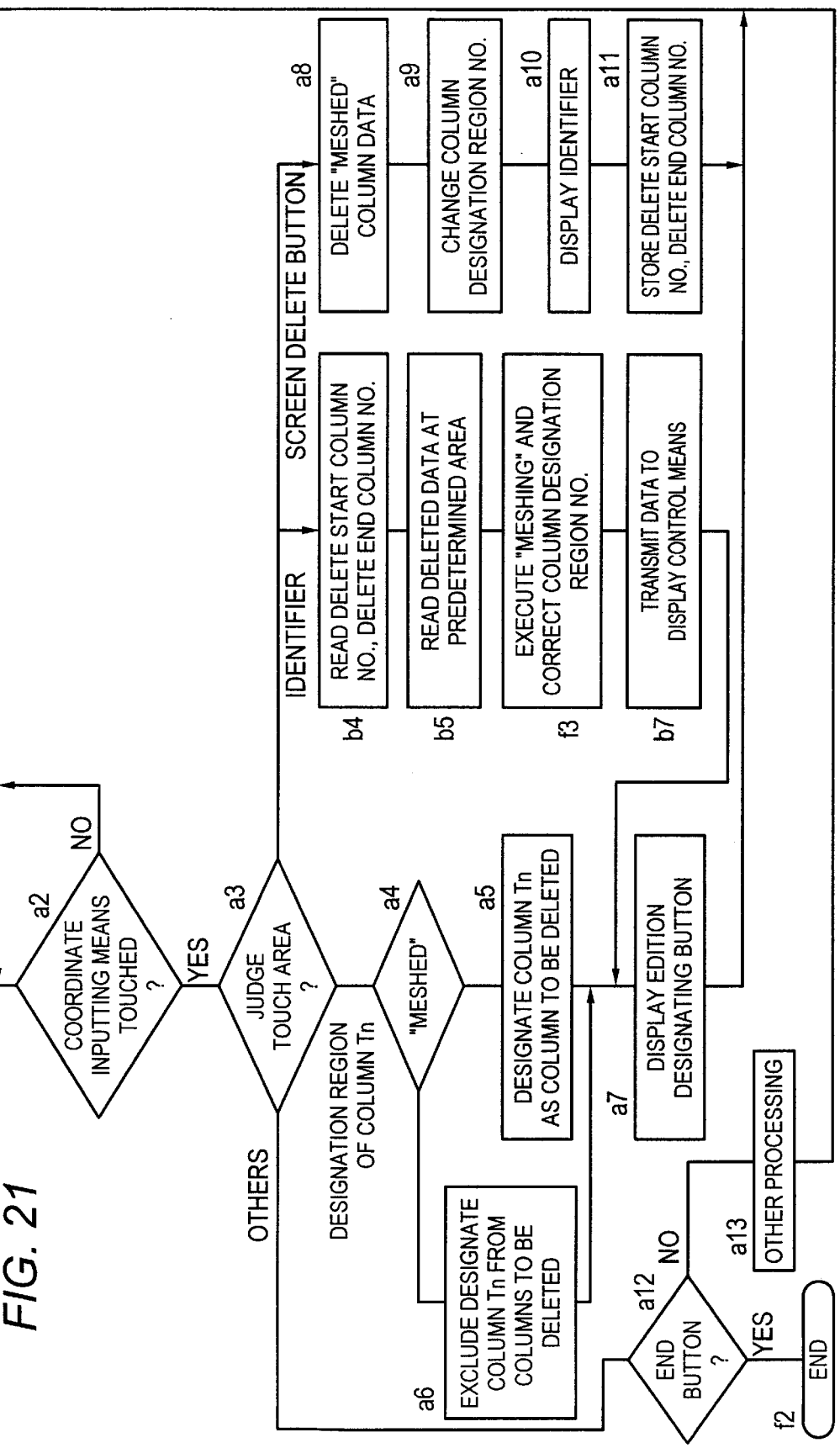
FIG. 21 is a flow chart for describing a column deleting operation of deleting a column which is designated using an electric device of a second embodiment of the invention, and a column restoring operation of restoring a deleted column.

FIG. 21 is a flow chart for describing a column deleting operation of deleting a column of the chart 50 which is designated using an electric device of a second embodiment of the invention, and a column restoring operation of restoring the deleted column. The electric device of the second embodiment has a similar structure to that of the electric device 1 of the first embodiment. The flow chart in FIG. 21 is similar to the flow chart in FIG. 12 and FIG. 15, and therefore, identical reference characters are assigned to steps at which identical operations are performed. A redundant description will be simply omitted. In the second embodiment, when plural columns are deleted at the same time, for restoration by touching the touch area of an identifier which denotes the deleted columns, a column to be restored is optionally selected from the deleted plural columns.

In a condition where the displayed image 96 shown in FIG. 11 is displayed, the sequence proceeds to the step a2 from a step f1. At the step a2, whether the coordinates inputting means is touched is judged. When the coordinates inputting means is touched, the sequence proceeds to the step a3 to judge the touch area. When the coordinates inputting means 3 is not touched, the sequence returns to the step a2.

At the step a3, in which touch area the coordinates which are input via the coordinate inputting means are is judged. When the input coordinates are in the touch area of the designation region of the n-th column, the steps a4 to a7 are performed to designate columns which are to be deleted, or to cancel designation of columns which are to be deleted and to return to the step a2.

When the input coordinates are in the touch area of the screen delete button 105, the steps a8 to a11 are performed to delete the columns which are to be deleted and an identifier which denotes the position of the deleted columns. The sequence then returns to the step a2.

When the input coordinates are in the remaining region except for the designation region T of the column, the touch area of the screen delete button 105 and the identifier, the sequence proceeds to the step a12, to thereby judge whether the end button 98 is touched. If the end button 98 is not touched, after performing other processing at the step a13, the sequence returns to the step a2. When the touch area of the end button 98 is manipulated, the sequence proceeds to a step f2 to complete the processing.

If at the step a3 the input coordinates are judged to be in the touch area of the identifier, the sequence proceeds to the step b4 from the step a3. At the step b4, the numbers of the delete start and end columns are read from the column delete part of the memory. The sequence then proceeds to the step b5. At the step b5, the data of the deleted columns are read in the memory area of the corresponding display buffer 92 so that the data of the deleted columns are displayed at a position at which the deleted columns used be displayed. The sequence then proceeds to a step f3.

At the step f3, the data of the columns which are read at the step b5 are changed so that half-tone dot meshing is performed when the data are displayed by the display means 2. That is, the restored columns are restored as columns to be deleted. Further, at the step f3, the restored data are processed by half-tone dot meshing and the number which is displayed in the column designation region T is corrected.

Proceeding from the step f3 to the step b7, the corrected display data are transmitted to the display control means 23 from the corresponding display buffer 92, and displayed by the display means 2. Proceeding from the step b7 to the step a7, after displaying the edition designating button, the sequence returns to the step a2.

Hence, in the condition where the displayed image 107 shown in FIG. 14 is displayed, when the touch area of the identifier 109 is touched, the processing from the steps b4 to a7 is performed, whereby the displayed image 101 shown in FIG. 11 is displayed in the display screen of the displaying means. In other words, the restored columns are restored as columns to be deleted. Following restoration, a user performs the processing from the steps a2 to a7, so that out of the plural columns which are restored as columns to be deleted, a desired column-to-be-deleted can be canceled.

FIG. 22 shows a displayed image 121 as it is with half-tone dot meshing on the second column is canceled from a condition where the displayed image 101 shown in FIG. 13 is displayed. Canceling of half-tone dot meshing is realized by touching the designation region T of the column with half-tone dot meshing once again. In the condition where the displayed image 121 shown in FIG. 22 is displayed, when the touch area of the screen delete button 105 is touched, the processing from the steps a8 to a11 is performed, whereby the images of the third and the fourth columns are deleted.

FIG. 23 is a view showing a displayed image 125 including a chart 50c from which the images of the third and the fourth columns are deleted. An identifier 126 is displayed to point at a ruling line 127 between the second column and the fifth column, i.e., a position at which the third and the fourth columns used to be displayed. In addition, the numbers of columns which are displayed in the designation regions T5b to T11b of the columns which follow the deleted third and fourth columns are corrected.

Figure 24:
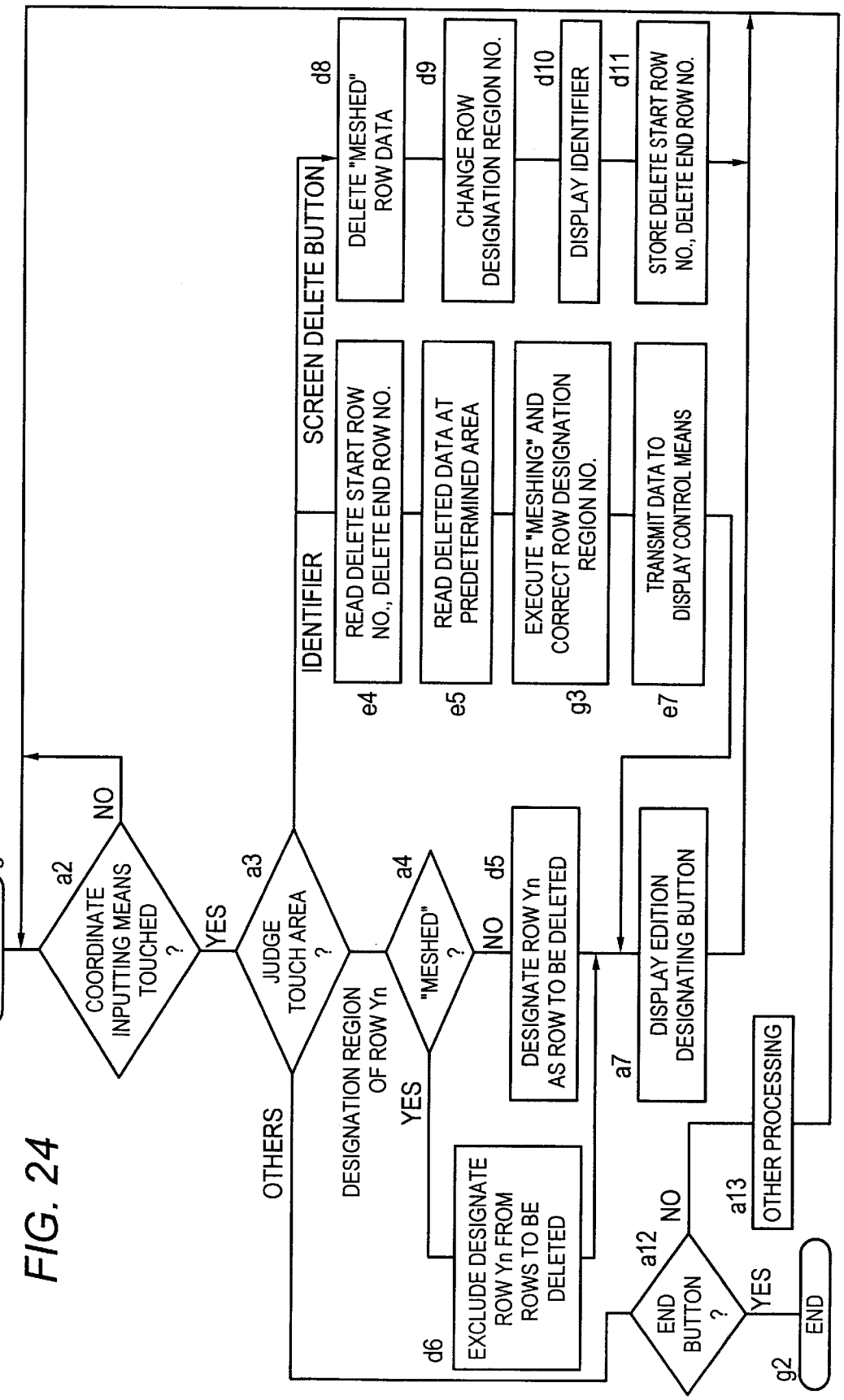
FIG. 24 is a flow chart for describing a row deleting operation of deleting a row which is designated using an electric device and a row restoring operation of restoring a deleted row.

FIG. 24 is a flow chart for describing a row deleting operation and a row restoring operation which are performed on a designated row within the chart 50 by the electric device of the second embodiment. The flow chart in FIG. 24 is similar to the flow chart in FIG. 17 and FIG. 20 and therefore, identical reference characters are assigned to steps at which identical operations are performed. A redundant description will be simply omitted. In the row deleting operation and the row restoring operation of the second embodiment, a deleted row is recovered as a row to be deleted, as in the column deleting operation and the column restoring operation shown in FIG. 21.

That is, when the touch area of an identifier is manipulated, the numbers of the delete start and end rows are read at the step e4. After reading the data of the rows at the step e5, the sequence proceeds to a step g3. At the step g3, the number of the designation region Y of the column is corrected, and the row is processed by half-tone dot meshing and designated as row to be deleted. The data of the image as it is after restoration and correction are transmitted to the display control means at the step e7.

As described above, in the second embodiment, deleted columns and rows are recovered as columns and rows to be deleted. In the electric device 1 of the first embodiment, in a condition where plural columns and rows are deleted at the same time, to recover the columns and rows only partially, it is necessary to recover all deleted columns and rows once and to thereafter delete unnecessary columns and rows. In the electric device of the second embodiment, this operation is performed a series of successive restoration/deleting operations. Hence, a partial restoration operation to partially restore columns and rows from deleted columns and rows is easy.

Figure 25:
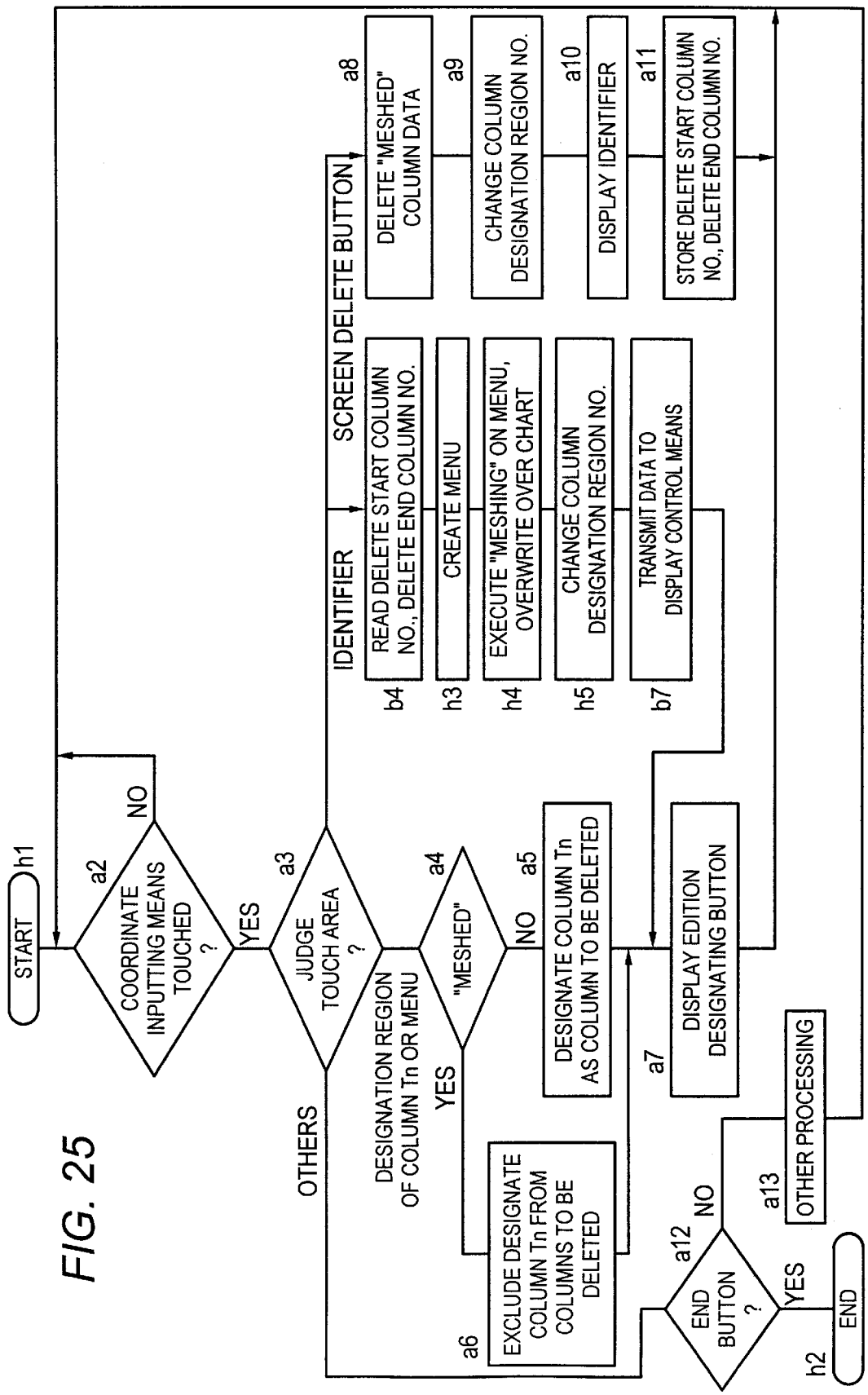
FIG. 25 is a flow chart for describing a column deleting operation of deleting a column which is designated using an electric device according to a third embodiment of the invention, and a column restoring operation of restoring a deleted column.

FIG. 25 is a flow chart for describing a column deleting operation and a column restoring operation of a chart which is displayed by the display means, using an electric device of a third embodiment of the invention. The electric device of the third embodiment has a similar structure to that of the electric device 1 according to the first embodiment. The flow chart in FIG. 25 is similar to the flow charts in FIGS. 12, 15 and 21, and therefore, identical reference characters are assigned to steps at which identical operations are performed. A redundant description will be simply omitted. In the third embodiment, when the touch area of an identifier is touched, a menu display is displayed which only momentarily displays before displaying the image of a column once again.

In the condition where the displayed image 96 shown in FIG. 11 is displayed, the sequence proceeds to the step a2 from a step h1. At the step a2, whether the coordinates inputting means 3 is touched is judged. When the coordinates inputting means 3 is touched, the sequence proceeds to the step a3. When the coordinates inputting means 3 is not touched, the sequence returns to the step a2. At the step a3, the touch area is judged. When the input coordinates are in the touch area of the designation region of the n-th column, the steps a4 to a7 are performed to designate a column to be deleted or cancel such designation. The sequence then returns to the step a2.

At the step a3, if the input coordinates are in the touch area of the screen delete button, the steps a8 to all are executed to delete the image of the column designated to be deleted, and the identifier is displayed. Thereafter the sequence returns to the step a2. Thereby the image displayed in the display screen of the display means 2 is changed to the display image shown in FIG. 14.

At the step a3, if the input coordinates are judged to be in the touch area of the identifier, the sequence proceeds to the step b4 from the step a3. At the step b4, the numbers of the delete start and end columns are read from the column delete part 40 of the memory 37 and stored. The sequence then proceeds to a step h3. At the step h3, a menu is created according to an operation which will be described below. The menu partially displays the number which is displayed in the designation region of a deleted column and a part of a character string which is displayed in each element of this column. Upon creation of the menu, the sequence proceeds to a step h4 from the step h3.

At the step h4, the menu of each column is processed by half-tone dot meshing, that is, to indicate that the respective columns in the menu display are recognized as columns to be deleted. Following this, this menu display is overwritten on the image of the chart, and overwriting to erase the overlapped image portion of the chart is performed. Upon overwriting, the sequence proceeds to a step h5. At the step h5, the number which is displayed in the designation region which is added to a column having the number of a deleted row in the menu display is corrected. The sequence then proceeds to the step b7. At the step b7, the changed data within the display buffer 92 are transmitted to the display control means 23, and displayed by the display means 2. Proceeding to the step a7, after displaying the edition designating button, the sequence returns to the step a2.

FIG. 26 shows a displayed image 131 which is obtained by performing the processing at the steps b4 to a7 from the condition where the displayed image 107 is displayed. A chart 50d which is displayed within the displayed image 131 is an image which is similar to the chart 50 which is displayed within the displayed image 107 shown in FIG. 14. In the chart 50d, the numbers which are displayed in the designation regions of the fifth to the tenth columns, i.e., the columns which follow the deleted second to fourth columns, are changed to the same numbers as those before deleting of the second to the fourth columns.

An identifier 132 which is displayed as a menu display is overwritten on the chart 50d. The identifier 132 is formed by a menu part 133 for displaying the contents of a deleted column as a menu, and an identifier part 134 for pointing a position at which the deleted column used to be displayed. The identifier part 134 is displayed to denote the ruling line 108 which used to be denoted by the identifier 109 within the displayed image 107 shown in FIG. 14.

Referring to FIG. 25 once again, in a condition where the displayed image 131 shown in FIG. 26 is displayed, at the step a3 of judgement of touch area, if input coordinates are judged to be in the touch area of a menu part corresponding to the n-th column, the sequence proceeds to the step a4 from the step a3.

At the step a4, whether the image of the touched menu part is processed by half-tone dot meshing is judged. In other words, whether a column which is displayed in the touched menu part is designated as a column to be deleted is judged. If this column is not designated as a column to be deleted is judged, the menu part corresponding to the designated n-th column is processed by half-tone dot meshing, and designated as a column to be deleted. A column or row with half-tone dot meshing is denoted with slanted lines in the drawing. When the n-th column designated at the step a4 is judged as a column to be deleted, the sequence proceeds to the step a6 from the step a4. At the step a6, the designated n-th column is excluded from columns to be deleted, and half-tone dot meshing on the image of menu part corresponding to the n-th column is canceled. Upon touching of the menu part to designate a column to be deleted or to cancel such designation, the sequence proceeds to the step a7 from the steps a5 and a6. After displaying the edition designating button, the sequence returns to the step a2.

FIG. 27 shows a displayed image 136 which is obtained by performing the processing at the steps a2 to a7 from the condition where the displayed image 131 shown in FIG. 24 is displayed. For instance, of the menu part 133 of the identifier 132 which is displayed as a menu display, only a menu part 133*a* which denote the second column is processed by half-tone dot meshing. In short, the touch areas of the menu parts 133*b*, 133*c* which correspond to the third and the fourth columns are touched. In this manner, when half-tone dot meshing on menu parts which correspond to plural columns is to be canceled in the menu part 133 of the identifier 132, a pen touching a touch area immediately above the menu part 133 traces the dash-dot-dot line 137, for example. That is, touch areas on menu parts which denote columns which are to be excluded from columns-to-be-deleted are touched successively. Alternatively, when the identifier part 134 is touched, all columns which are displayed in the menu display may be restored.

Referring to FIG. 25 once again, when the touch area of the screen delete button 105 is touched in the condition where the displayed image 136 shown in FIG. 27 is displayed, the processing at the steps a8 to a11 is performed. This displays a displayed image in which only a column which corresponds to a menu part with half-tone dot meshing is deleted within the menu part 133 of the identifier 132 which is displayed as a menu display.

Further, during judgement of a touch area at the step a3, when coordinates of a portion other than the designation region T or the menu part 133 of the n-th column, the identifier part 134 and the coordinates area on the screen delete button 105 are entered, the sequence proceeds to the step a12 from the step a3, to thereby judge whether the end button 98 is touched. If the end button 98 is not touched, after performing other processing at the step a13, the sequence returns to the step a2. When the touch area of the end button 98 is touched, the sequence proceeds to a step h2 to complete the processing shown in the flow chart.

When deleted columns are to be partially restored, immediately after touching the identifier, deleted columns are displayed small as a menu display so that it is not necessary to enlarge the displayed image. Further, when there are a number of deleted columns, it is possible to prevent any display which partially conceals the chart once again.

Figure 28:
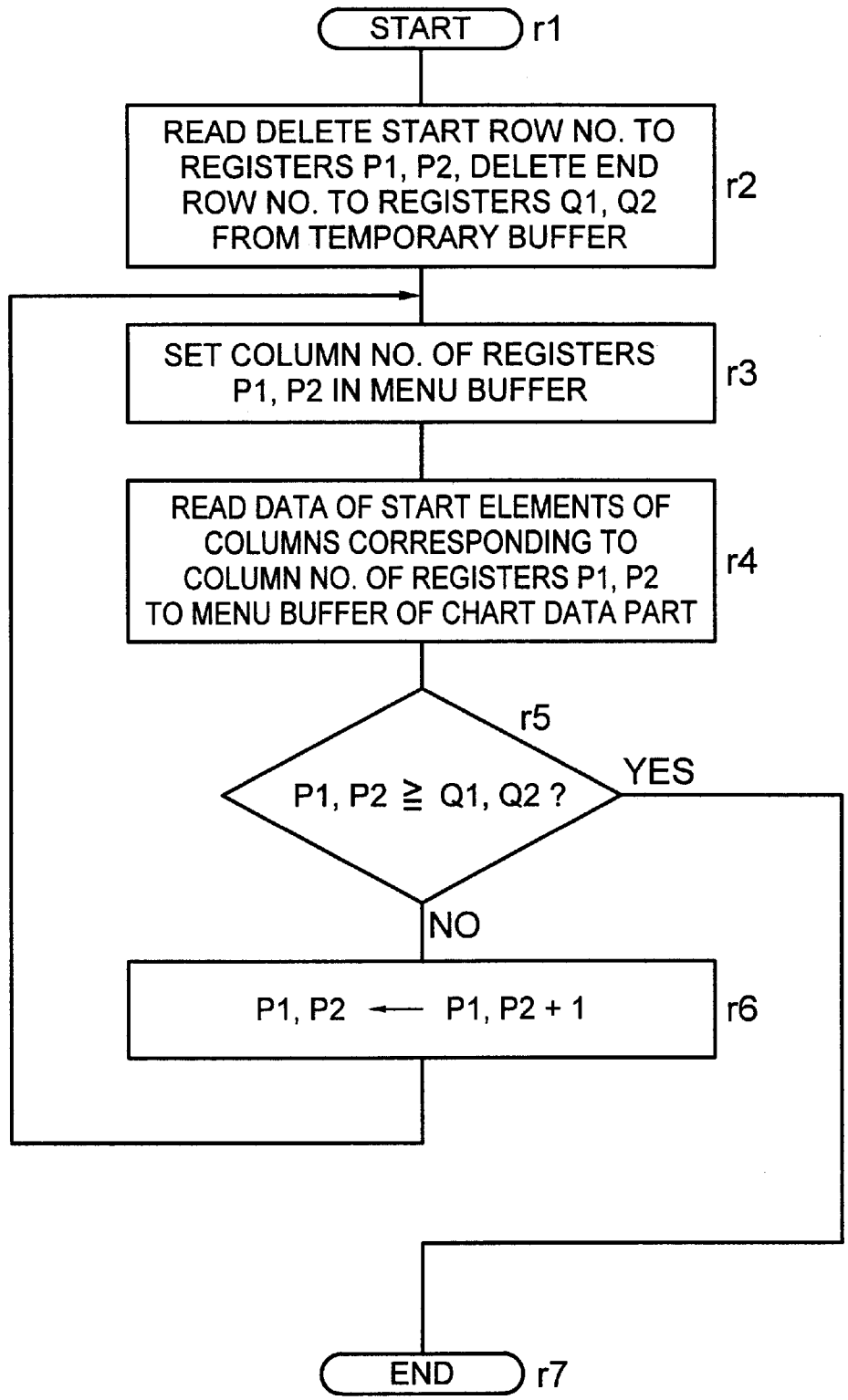
FIG. 28 is a flow chart for describing an operation of creating a menu part of an identifier which is displayed as a menu display.

FIG. 28 is a flow chart for describing an operation of creating a menu at the step h3 of the flow chart in FIG. 25.

After reading the numbers of the delete start and end columns from the column delete part of the memory and storing the numbers in the temporary buffer 91 at the step b4, the sequence proceeds to a step r2 from a step r1. At the step r2, the central processing unit 22 reads the number of the delete start column from the temporary buffer 91 into registers P1, P2. In a similar manner, the central processing unit 22 reads the number of the delete end column into registers Q1, Q2. Upon reading of the numbers, the sequence proceeds to a step r3. The registers P1, P2 and the registers Q1, Q2 are set in the memory part 25 of the central processing unit 22.

At the step r3, the numbers of the columns which are stored in the registers P1, P2 are set in the menu buffer 93. The sequence proceeds to a step r4. At the step r4, data of a start element of the column which is denoted by the column number in the registers P1, P2 are read from the actual chart data part 60 of the chart data part 38 of the memory 37, and stored in an area which follows the number which is set in the menu buffer 93. The operation of reading the data which are designated by the values in the registers P1, P2 from the actual chart data part 60 is similar to the operation of reading data from the chart data part 60 described in the flow chart in FIG. 16.

Upon reading of the data, the sequence proceeds to a step r5 from a step r4, to thereby judge whether the values which are stored in the registers P1, P2 are equal to or larger than the values which are stored in the registers Q1, Q2. If the values which are stored in the registers P1, P2 are not equal to or larger than the values which are stored in the registers Q1, Q2, the sequence proceeds to a step r6 from a step r5, to thereby add 1 to the registers P1, P2 and update the registers P1, P2. The sequence then returns to the step r3. If the values in the registers P1, P2 are judged to be equal to or larger than the values in the registers Q1, Q2 at the step r5, all data for creating a menu part which corresponds to each one of the deleted plural columns are judged to be read. In this case, the sequence proceeds to a step r7 from the step r5, to thereby complete the processing shown in the flow chart.

In the embodiment, displayed contents of the menu part which corresponds to each column are created by combining the number of the column and the contents which are displayed in the start element of the column. In many cases, a header of the contents stored in the column is displayed in a start element of each column and row. By displaying displayed contents of the start element as a menu part, it is possible to learn the contents which are stored in the column which is displayed in the menu in an easy manner. Further, the menu parts of the respective columns which used to be arranged in the horizontal direction are arranged in the vertical direction, in the embodiment. This is because to display menu parts in the vertical direction appears concise and smaller than to display menu parts in the horizontal direction. The menu parts corresponding to the respective columns may be arranged and displayed in the horizontal direction.

The electric device of the embodiment is capable of deleting and restoring rows, in a similar manner of deleting and restoring columns. As in restoration of columns, in restoration of rows, when the touch area of an identifier which denotes a position to instruct restoration of a row is touched, the identifier denoting the menu display position is displayed.

Figure 29:
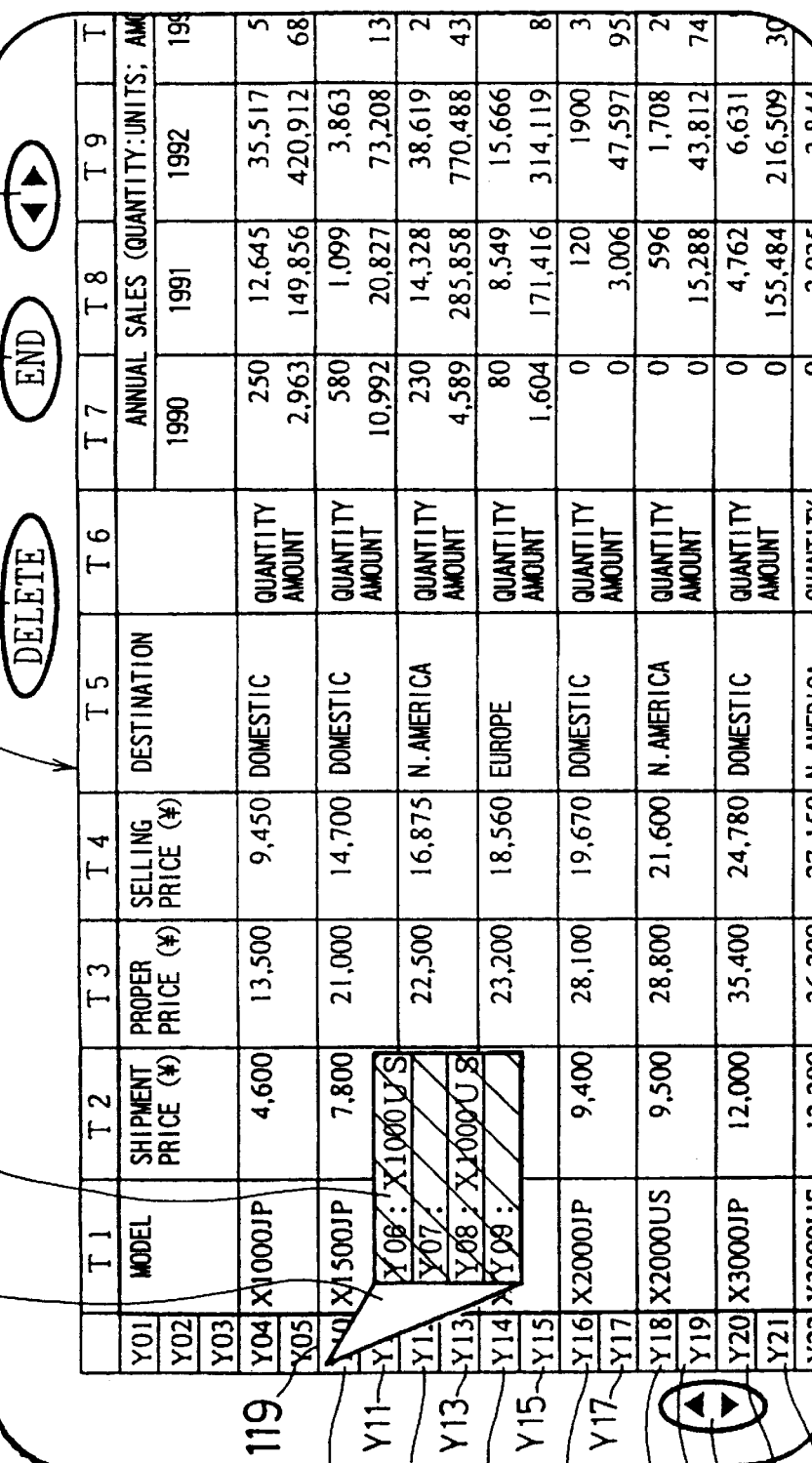
FIG. 29 shows a displayed image 141 which is displayed in a display screen of the display means 2 of an electric device.

FIG. 29 shows a displayed image 141 as it is displayed after the touch area of the identifier 118 is touched in the condition where the displayed image 117 shown in FIG. 19 is displayed. When the touch area of the identifier 118 is touched, the identifier 118 is changed to an identifier 142 with a menu display. The identifier 142 is comprised of a menu part 143 denoting deleted rows, and an identifier part 144 denoting a ruling line 119 expressing a position at which the deleted rows used to be displayed. For partial restoration of the rows, first, a user touches the touch area of the menu part 143 of the identifier 142 having a menu display, to designate a desired row and exclude this column from rows-to-be-deleted. Following this, when the touch area of the screen delete button 105 is touched, such an image is displayed in which only a column which corresponds to a column with half-tone dot meshing is deleted within the menu part 143.

Figure 30:
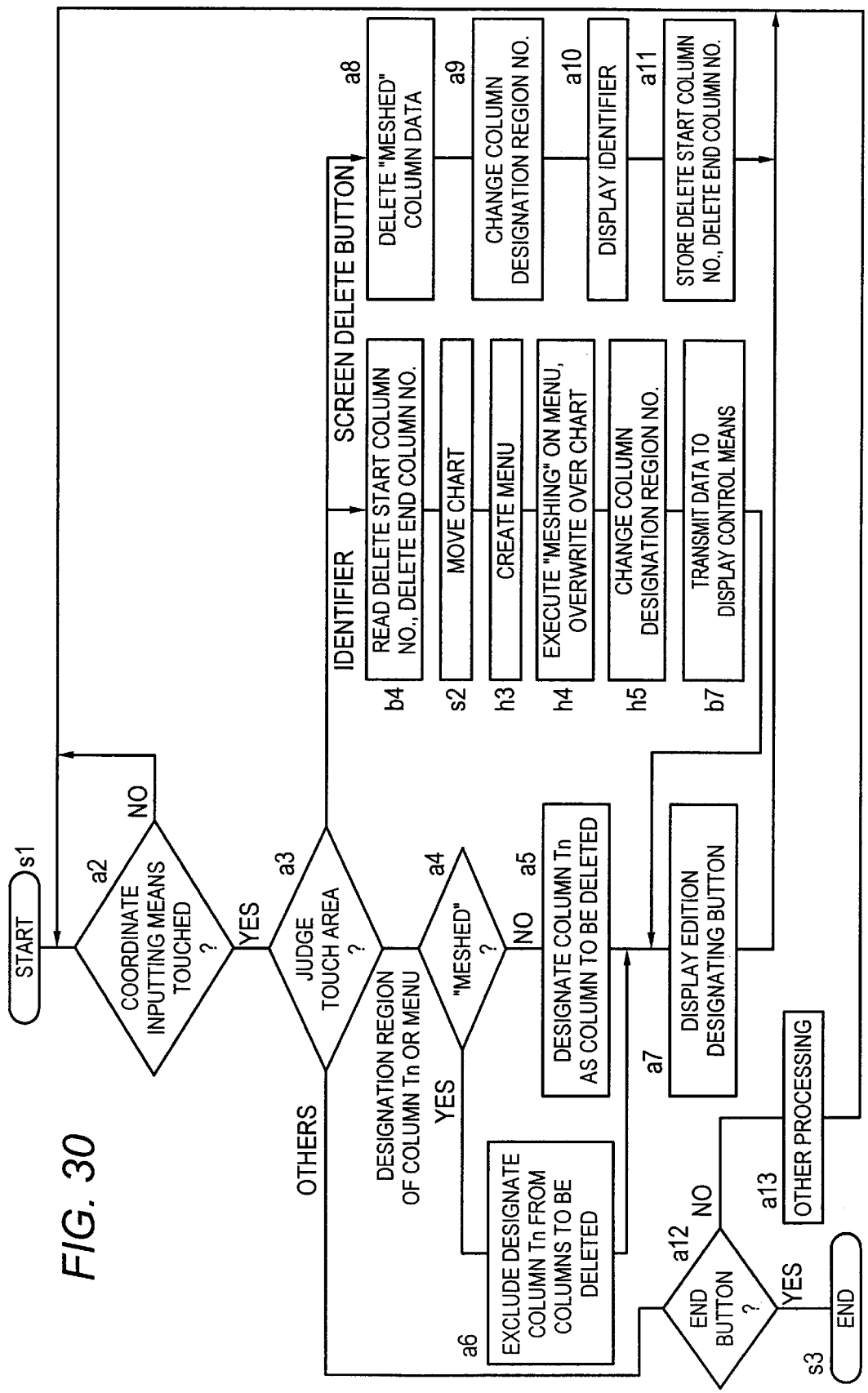
FIG. 30 is a flow chart for describing a column deleting operation of deleting a column which is designated using an electric device of a fourth embodiment of the present invention, and a column restoring operation of restoring a deleted column.

FIG. 30 is a flow chart for describing a column deleting operation and a column restoring operation performed on a column which is displayed in the display screen, using an electric device of a fourth embodiment of the present invention. The electric device of the fourth embodiment has a similar structure to that of the electric device 1 of the first embodiment. The flow chart in FIG. 30 is similar to the flow charts in FIGS. 12, 15, 21 and 25, and therefore, identical reference characters are assigned to steps at which identical operations are performed. A redundant description will be simply omitted. Jn the fourth embodiment, an identifier realizing a menu display is located outside a chart.

In the condition where the displayed image 96 shown in FIG. 11 is displayed, the sequence proceeds to the step a2 from a step s1. At the step a2, whether the coordinates inputting means 3 is touched is judged. When the coordinates inputting means 3 is touched, the sequence proceeds to the step a3. When the coordinates inputting means 3 is not touched, the sequence returns to the step a2. At the step a3, the touch area where the input coordinates are is judged. When the input coordinates are in the designation region T, the steps a4 to a7 are performed to designate a column to be deleted or cancel such designation. At the step a3 of judgement of touch area, if the input coordinates are judged to be in the touch area on the screen delete button 105, the processing at the steps a8 to a11 is performed to delete rows-to-be-deleted and display the identifier 109.

At the step a3 of judgement of touch area, if the input coordinates are judged to be in the touch area on the identifier 109, the sequence proceeds to the step b4 from the step a3. At the step b4, the numbers of the delete start and end columns are read from the column delete part 40 of the memory 37 and stored in the temporary buffer 91. Upon reading of the numbers, the sequence proceeds to a step s2 from the step b4, to thereby shift the entire image of the chart 50 which is displayed in the display screen and expand the space area outside the chart 50.

When the menu parts corresponding to respective columns are arranged in the vertical direction within a menu part of an identifier in the form of a menu display, for instance, to display the identifier outside a chart, a space which is large enough to contain as many rows as deleted columns is necessary. By shifting the entire image of the displayed chart 50, it is possible to ensure a space which is large enough to display the identifier in the form of a menu display outside the chart within the display screen. When an identifier in the form of a menu display showing deleted columns, for instance, is to be displayed, a space is ensured outside and above the chart.

To ensure a space outside a chart, elements of the respective columns are shifted for the number or rows needed in a direction along which the row number increases, so that data are not displayed in elements of plural rows from the row start number. In addition, the position at which the contents of the elements are displayed is moved, and so is a ruling line.

Upon ensuring the space, the sequence proceeds to the step h3 from the step s2. Through the processing from the steps h3 to h5 and b7, display data of the displayed image displaying the identifier in the form of a menu display are created. Proceeding to the step b7 from the step h5, the display data within the changed display buffer 92 are transmitted to the display control means 23, and displayed by the display means 2. The sequence proceeds to the step a7. Upon displaying the edition designating button at the step a7, the sequence returns to the step a2 from the step a7.

FIG. 31 shows a displayed image 151 as it is displayed after the processing from the steps b4, s2, h3 to h5 and b7 from the condition where the displayed image 107 shown in FIG. 14 is displayed. An identifier 152 in the form of a menu display includes an identifier part 154 denoting the ruling line 108 of the chart 50d within the displayed image 151 and a menu part 153. The chart 50d is shifted downward by a width W1, from the position at which the image of the chart 50a used to be displayed in the displayed image 107 in the dash-dot-dot line 155 in FIG. 14. Hence, the displayed image 151 has a wider area outside and above the chart 50d than the displayed image 107. The identifier 152 is displayed in the expanded area outside and above the chart 50d. In this manner, by displaying the identifier 152 in the form of a menu display in the area outside the chart 50d, the menu part 153 of the identifier 152 in the form of a menu display is displayed easier to look at.

Referring to FIG. 30 once again, at the step a3 of judgement of touch area, if input coordinates are judged to be in the menu part 153 of the identifier 152 in the form of a menu display outside chart 50d, the processing at the steps a4 to a7 is performed to designate a column to be deleted or cancel such designation. At the step a3 of judgement of touch area, if coordinates not existing in the touch area of the designation region Tn of the n-th column, the menu part 153, the identifier part 154 and the screen delete button 105 are judged to be input, the sequence proceeds to the step a12 from the step a3, to judge whether the touch area of the end button 98 is touched. When the touch area of the end button 98 is not touched, after performing other processing at the step a13, the sequence returns to the step a2. When the touch area of the end button 100 is touched, the sequence proceeds to a step s3 from the step a12, thereby completing the processing shown in the flow chart.

The electric device of the embodiment is capable of deleting and restoring rows, in a similar manner of deleting and restoring columns. In restoration of rows, to select a row to be recovered, an identifier in the form of a menu display is displayed outside a chart.

Figure 32:
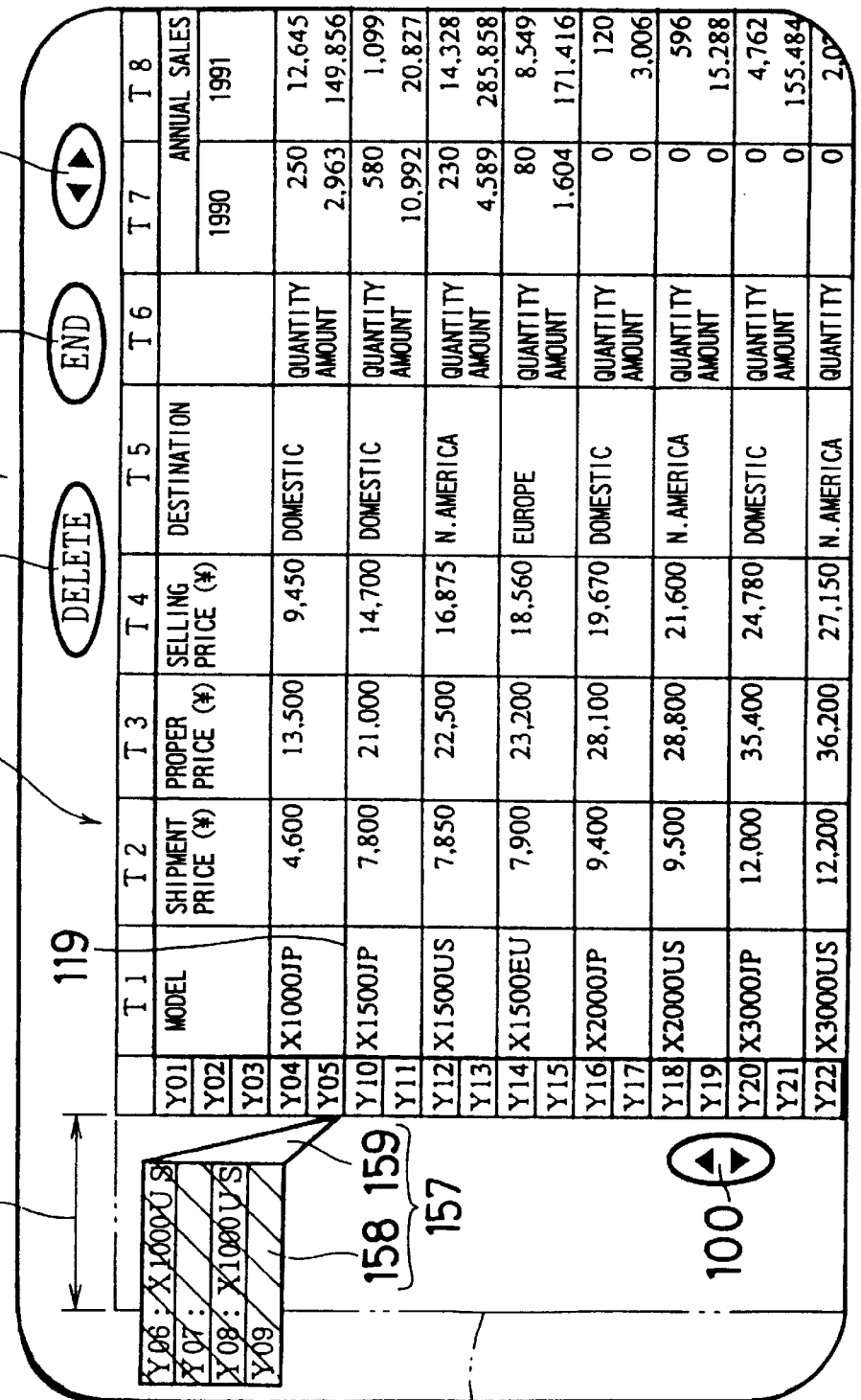
FIG. 32 shows a displayed image 156 which is displayed in the display screen of the display means 2 of an electric device.

FIG. 32 shows a displayed image 156 as it is displayed after the touch area of the identifier 118 is touched in the condition where the displayed image 117 shown in FIG. 19 is displayed in the electric device of the embodiment. In the displayed image 156, an identifier 157 in the form of a menu display which includes an identifier part 159 denoting the ruling line 119 and a menu part 158 is displayed in an area outside a chart 50e. The chart 50e is shifted rightward by a width W2, from the position at which the image of the chart 50b used to be displayed in the displayed image 117 in the dash-dot-dot line 160 in FIG. 19. This ensures an area outside the chart which is enough large to display the identifier 157.

Figure 33:
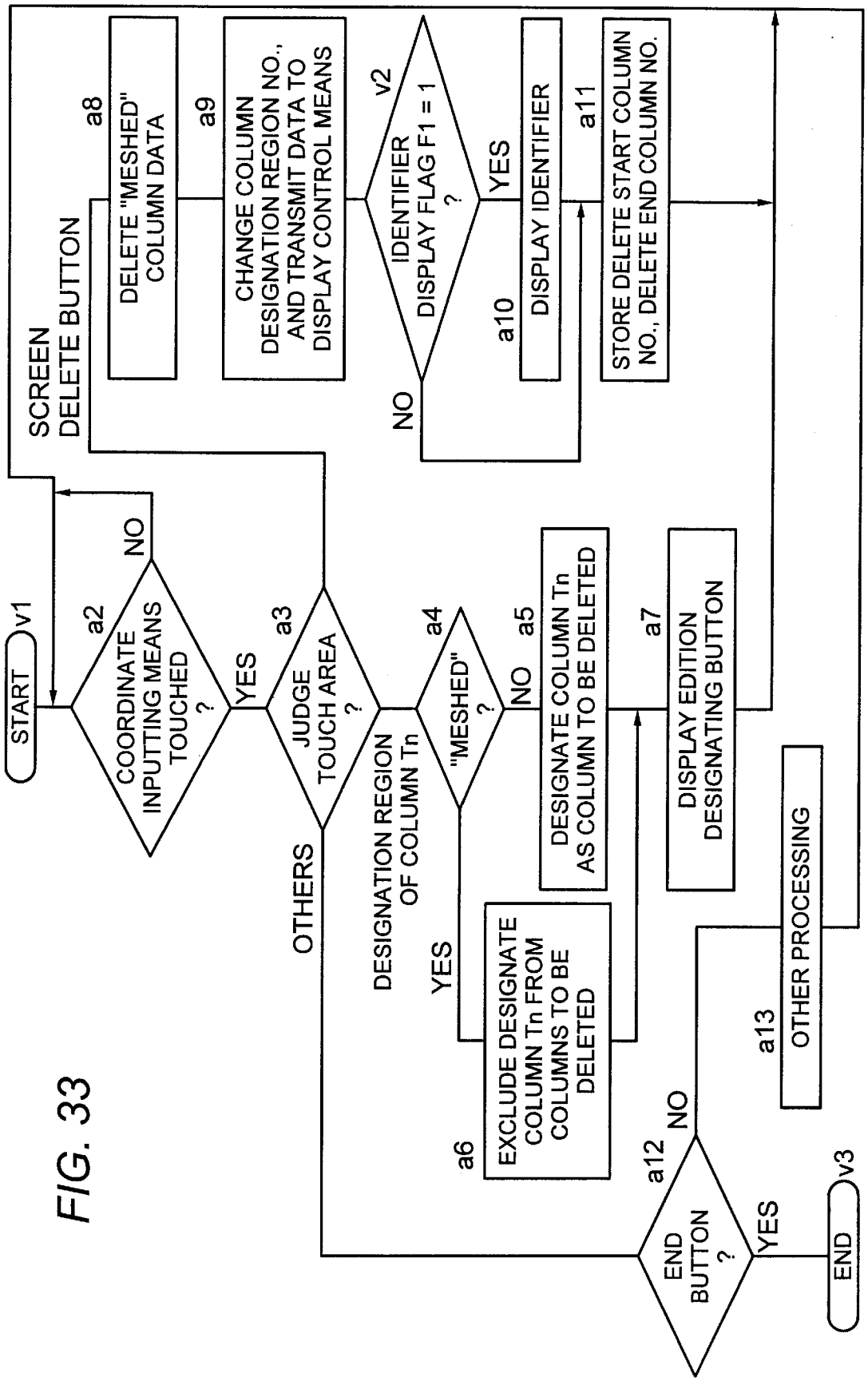
FIG. 33 is a flow chart for describing a column deleting operation of deleting a column which is designated using an electric device of a fifth embodiment of the invention.

FIG. 33 is a flow chart for describing a column deleting operation on a chart which is displayed by the display means, using an electric device of a fifth embodiment of the invention. The electric device of the fifth embodiment has a similar structure to that of the electric device 1 of the first embodiment. The flow chart in FIG. 33 is similar to the flow charts in FIGS. 12, 15, 21, 25 and 30, and therefore, identical reference characters are assigned to steps at which identical operations are performed. A redundant description will be simply omitted.

As the electric device of the first embodiment, the electric device of the fifth embodiment performs a similar operation to delete a column. Further, when a column is deleted, whether to display the identifier 109 in the display screen can be optionally decided by a user.

In the condition where the image of the chart 50 is displayed by the display means 2, the sequence proceeds to the step a2 from a step v1, to thereby judge whether the coordinates inputting means 3 is touched. When the coordinates inputting means 3 is touched, the sequence proceeds to the step a3. When the coordinates inputting means 3 is not touched, the sequence returns to the step a2. At the step a3, the touch area of input coordinates is judged. When the input coordinates are the designation region T of the n-th column, the sequence proceeds to the step a4 from the step a3. Through the processing at the steps a4 to a7, a designated column is designated as a column to be deleted, or the designated column is excluded from columns to be deleted.

At the step a3 of judgement of touch area, if the input coordinates are judged to be in the touch area of the screen delete button 105, the sequence proceeds to the step a8 from the step a3, to delete display data of the columns to be deleted. The sequence then proceeds to the step a9. At the step a9, the numbers which are displayed in the designation regions following the deleted columns are corrected, and the deleted and corrected display data are transmitted to the display control means 23. The sequence thereafter proceeds to a step v2.

At the step v2, whether the identifier display flag F1 is 1 is judged. The identifier display flag F1 is a flag which switches whether to display the identifier 109 in the display screen. When the identifier display flag F1 is set at 1, the identifier 109 is displayed. When the identifier display flag F1 is reset at 0, the identifier 109 is not displayed. If at the step v2 the identifier display flag F1 is judged to be 1, the sequence proceeds to the step a10, to display the identifier 109. The sequence then proceeds to the step a11. If at the step v2 the identifier display flag F1 is judged to be reset at 0, the sequence proceeds directly to the step a11. At the step a11, the numbers of the delete start and end columns are stored in the column delete part 40 of the memory 37. The sequence thereafter returns to the step a2.

At the step a3 of judgement of touch area, if coordinates are judged to be entered in areas other than the designation region T of a column and the touch area of screen delete button 105, the sequence proceeds to the step a12 from the step a3, to judge whether the touch area of the end button 98 is touched. When the touch area of the end button 98 is not touched, after performing other processing at the step a13, the sequence returns to the step a2. When the touch area of the end button 98 is touched, the sequence proceeds to a step v3 from the step a12 to complete the processing shown in the flow chart.

FIG. 34 shows a displayed image 161 as it is displayed in a condition where an identifier is set not to be displayed and where deleting of columns is performed in accordance with the flow chart in FIG. 33. The displayed image 161 is similar to the displayed image 107 shown in FIG. 14. The displayed image 161 does not include the identifier 109 which is included in the displayed image 107. In addition, the displayed image 161 includes the image of a mode select button 162 for switching whether to display an identifier. Hence, within the displayed image 161, it is difficult to specify a position at which a column is deleted within the chart 50a, and it is not possible to learn a fact that a column in a portion of the chart is deleted.

Figure 35:
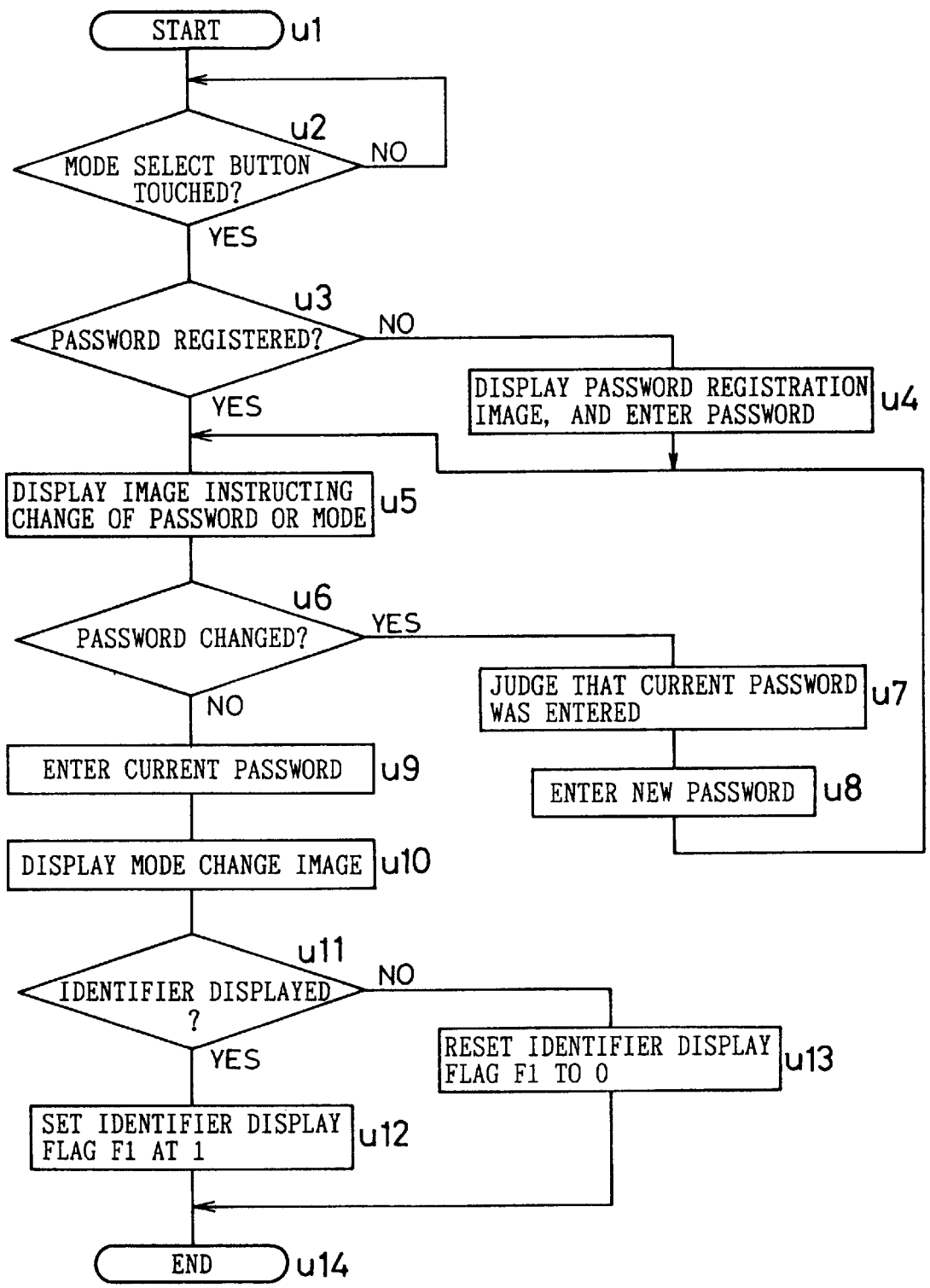
FIG. 35 is a flow chart for describing an identifier display switching operation to change a display of an identifier and a password.

FIG. 35 is a flow chart for describing a mode switching operation for switching whether to display an identifier. In the condition where a displayed image 161a shown in FIG. 36 is displayed, the sequence proceeds to a step u2 from a step u1. The displayed image 161a is similar to the displayed image 96 shown in FIG. 11. As compared with the displayed image 96, the displayed image 161a further includes the mode select button 162.

At the step u2, first, whether the coordinates inputting means 3 is touched is judged. When the coordinates inputting means 3 is touched, whether input coordinates are in the touch area of the mode select button 162 is judged. If the input coordinates are judged to be in the touch area of the mode select button 162 and the mode select button 162 is touched, the sequence proceeds to a step u3. When the mode select button 162 is judged not to be touched, the sequence returns to the step u2.

Figure 37:
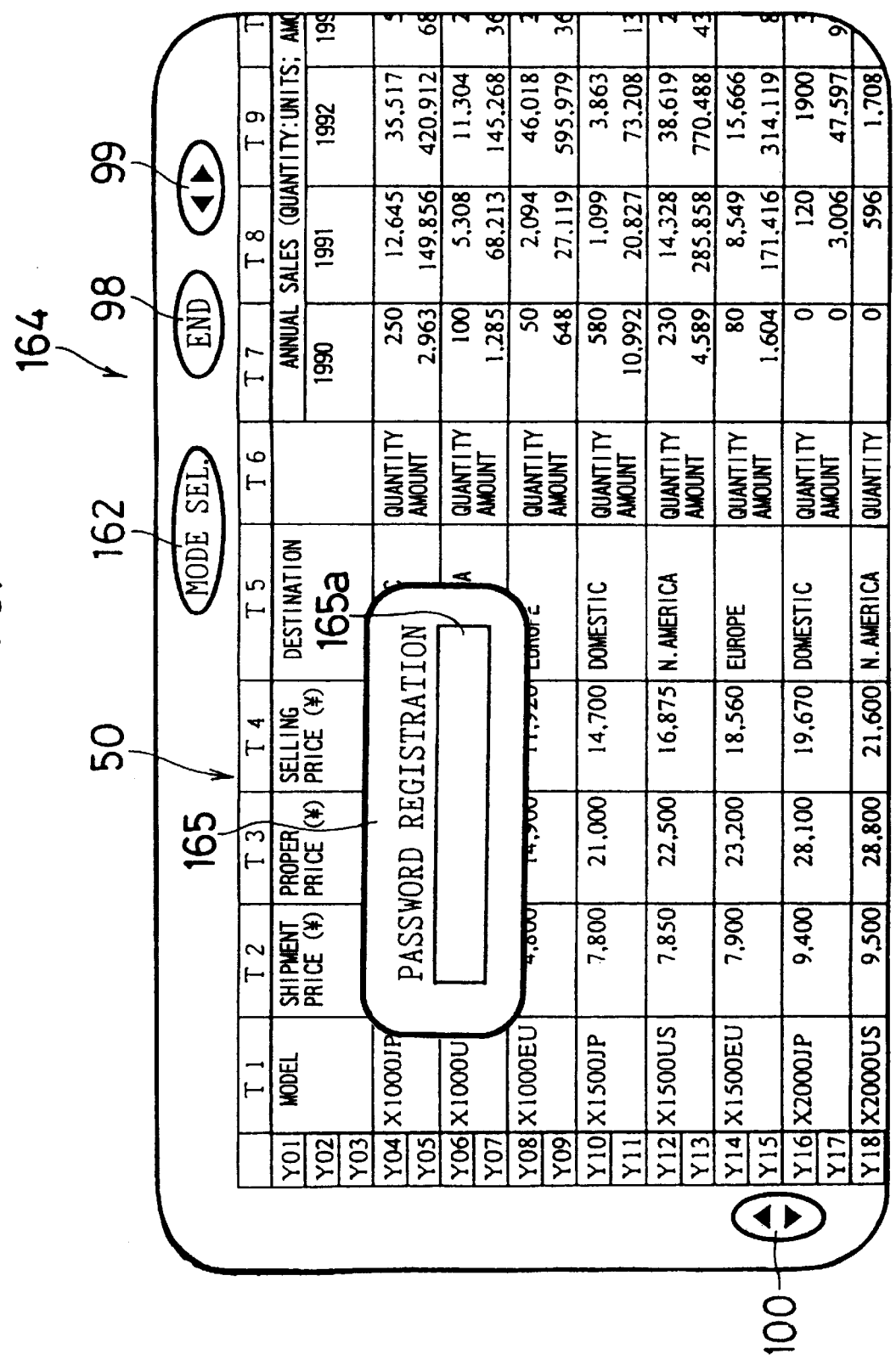
FIG. 37 shows a displayed image 164 which is used for the identifier display switching operation of switching an identifier which is displayed within in the display screen of the display means 2 of an electric device.

At the step u3, whether a password is registered is judged. The password is to permit switching of whether to display an identifier 109. Only a person who knows the registered password, such as the owner of the electric device, is allowed to switch whether to display an identifier. If the step u3 the a password is judged not to be registered, the sequence proceeds to a step u4, to thereby display a password registration image 165 shown in a displayed image 164 of FIG. 37. The displayed image 164 is similar to the displayed image 161a shown in FIG. 36, and the image 165 is displayed over the image of the chart 50. When there is no password registered, a password is registered using the password registration image 165. Registration of a password is realized by entering and finalizing a password out of optional character strings, for instance, within a rectangular frame 165a within the password registration image 165.

The electric device allows to enter a character string via a touch panel which serves as the coordinates inputting means 2, or by any other method. A character string may be input on a keyboard which serves as external inputting means which is connected to a connector 31, for example. Upon entry of the password, the sequence proceeds to a step u5 from the step u4. If at the step u3 a password is judged to be registered, the sequence proceeds directly to the step u5 from the step u3.

At the step u5, a designation image 168 is displayed which selects and designates whether to change the password or a mode for switching whether to display an identifier.

FIG. 38 shows a displayed image 167 in a condition where the designation image 168 is displayed. The displayed image 167 is similar to the displayed image 161a shown in FIG. 36, and the designation image 168 is displayed over the image of the chart 50. A user touches the touch area on either one of an area 168a of the designation image 168 displaying the letters "CHANGE PASSWORD" and an area 168b of the designation image 168 displaying the letters "CHANGE MODE," to select whether to change the password or the mode. Upon displaying the designation image 168, the sequence proceeds to a step u6 from the step u5. At the step u6, whether an operation designated using the designation image 168 is a change of the password is judged.

When a change of the password is designated, the sequence proceeds to a step u7 from the step u6. At the step u7, a password inputting image 172 shown in the displayed image 171 of FIG. 39 is displayed. The displayed image 171 is similar to the displayed image 161*a* shown in FIG. 36, and the image 172 is displayed over the image of the chart 50. A user enters the currently registered password in an area 172*a* of the password inputting image 172, and enters a character string which serves as a new password in an area 172*b* of the password inputting image 172. Whether the password entered by the user is the same as the currently registered password is judged. If the password entered by the user is the same as the currently registered password, the sequence proceeds to a step u8. At the step u8, the character string which is entered in the area 172*b* of the password inputting image 172 is recognized as a new password, and registered as such. Upon entry of the new password at the step u8, the sequence returns to the step u5.

If at the step u6 a change of the password is judged not to be designated, the sequence proceeds to a step u9 from the step u6, judging that a change of the mode is designated. At the step u9, whether the password entered by the user is the same as the currently registered password is judged. When the password entered by the user is the same as the currently registered password, the sequence proceeds to a step u10 from the step u9, to display a mode change image 175 shown in a displayed image 174 of FIG. 40. The displayed image 174 is similar to the displayed image 161*a* shown in FIG. 36, and the image 175 is displayed over the image of the chart 50. Upon displaying the image, the sequence proceeds to a step u11.

A user touches the touch area which is immediately above either one of an area 175*a* of the mode change image 175 displaying the letters "IDENTIFIER TO BE DISPLAYED" and an area 175*b* of the mode change image 175 displaying the letters "IDENTIFIER NOT TO BE DISPLAYED," thereby selecting whether to display an identifier. The area whose touch area is touched is processed by half-tone dot meshing to indicate that this area is touched. In FIG. 40, an area with half-tone dot meshing is shaded with slanted lines.

At the step u11, whether an instruction entered using the mode change image 175 allows to display an identifier is judged. When the instruction allows to display an identifier, the sequence proceeds to a step u12 from the step u11, to set the identifier display flag F1 at 1. When at the step u11 the instruction is judged to prohibit to display an identifier, the sequence proceeds to a step u13 from the step u11, to reset the identifier display flag F1 to 0. Upon setting the identifier display flag F1 at the steps u12, u13, the sequence proceeds to a step u14 to complete the processing shown in the flow chart. The identifier display flag F1 is stored in the flag part 42 of the memory 37.

To show a chart which is stored in the electric device to a third party other than the owner of the electric device, for instance, in some cases, a row or column which displays data which the owner desires to conceal from the third party is deleted. If the identifier 109 is displayed under this circumstances, the third party can easily learn that a column or row in a portion of the chart is hidden. In the electric device of the embodiment, a user can optionally select whether to display an identifier. When the identifier is not displayed, it is difficult for other people who do not know the construction of the chart 50 as it was before deleting to judge whether a column or row is hidden, or to judge which part in the chart is deleted. This makes it possible for the owner to conceal even a fact that he or she conceals a column displaying information which is to be hidden. In addition, restoration of a deleted column or row is instructed by touching the touch area of the identifier. When the identifier is not displayed, as there is no touch area to be touched, it is possible to prevent careless restoration of a deleted column or row.

The electric device of the embodiment is capable of switching whether to display an identifier during deleting of rows, as in switching whether to display an identifier during deleting of columns. Further, switching whether to display an identifier may be performed in the electric devices according to the second to the fourth preferred embodiments.

While a triangle-shaped identifier, for instance, is displayed in response to deleting of a column or row and an identifier in the form of a menu display is displayed only when the deleted column or row is to be restored in the electric devices according to the third and the fourth preferred embodiments, an identifier in the form of a menu display may be displayed in a condition where a column is deleted but an operation other than restoration is performed. Further, it is allowable to set that a user can optionally select whether to display an identifier as a menu display.

In addition, in the electric devices according to the first to the fifth preferred embodiments, data which are edited by deleting or restoring a column or row are display data of a chart which is stored in the display buffer 92 which serves as a display memory. Data of a chart which is stored in the chart data part 38 are not edited even when a column or row is deleted or restored. In this manner, according to the present invention, a display of data is temporarily edited when the data are displayed.

In a condition where the edited chart as above is displayed, data within elements of the chart may changed and corrected. In this case, not only the data stored in the display buffer 92 but also the data which are always stored in the chart data part 38 are corrected.

Further, in the electric devices according to the first to the fifth preferred embodiments, data of a column or row which is to be restored are read from the chart data part 38 of the memory 37 which serves as the original information memory. The data which are always stored in the chart data part 38 are compressed, for instance, and therefore are not in a format which can not be directly displayed by the display means 2 in some cases. In such a case, the electric devices may include a first display memory which stores the data not only in the chart data part 38 and the display buffer 92, but also in a format which can be displayed by the display means 2, and which does not edit the stored data.

At the same time when data which are developed in a displayable format are transmitted to the display buffer 92 in response to an instruction demanding to display the chart, the first display memory receives the same developed data. when a column or row of the chart is deleted, the data only in the display buffer 92 are edited, but the data in the first display memory are not edited. when restoration of a column or row of the chart is instructed, the central processing unit reads data of a predetermined column or row from the first display memory, corrects the data within the display buffer 92, and restores and displays the column or row. In this manner, as basic information which are developed in advance is prepared, it is not necessary to develop data for each restoration of a column or row. This reduces the quantity of a job for restoration.

Further, in the electric devices according to the present invention, not only chart-format data but also some groups of grouped information of other format may be deleted or restored. For example, in a circle graph where there are plural concentric circles are disposed and data are displayed by means of plural areas which are partitioned by the circles, a portion of the areas may be deleted or restored. In such a case, the areas are moved in such a manner that the area internally contacting a deleted area is adjacent to the area externally contacting the deleted area. As an identifier, a circle which is a boundary between the inner and the outer areas which are adjacent to each other as a result of moving is drawn in a different format from that for the circles which partition the other adjacent areas. For instance, the color of the circle may be changed, the circle may be shown in a double line, etc., to distinguish the circle from the other circles.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data processing apparatus, comprising:
   memory for storing information grouped into plural groups;
   inputting means for designating a group out of said plural groups;
   display for displaying information of said plural groups, the display including a display memory for storing contents which are to displayed; and
   control means for responding to an output from said inputting means, for selectively deleting information of the group designated out of said plural groups by said inputting means, so that only information of the remaining groups are displayed on the display,
   said control means further for moving information of the remaining groups stored in the display memory into a space in the display memory previously occupied by the information of the deleted group, so that plural parts of the information of the remaining groups are closer to each other, and
   said control means still further for displaying an identifier which expresses a position of the deleted group together with the remaining groups on the display,
   wherein the information of the deleted group, retrieved from the memory, is inserted and restored into the information of the remaining groups by the inputting means, and displayed by the display.

2. The data processing apparatus of claim 1, wherein the information grouped into plural groups is displayed in the form of a chart which consists of at least one row and plural columns or of plural rows and at least one column.

3. A data processing apparatus comprising:
   (a) an original information memory for storing information, in the form of a chart, grouped into plural groups;
   (b) display means;
   (c) a display memory for storing contents which are to be displayed in the display means;
   (d) inputting means for designating a group out of the plural groups via input operation; and
   (e) control means for responding to an output from the inputting means,
      for transmitting contents stored in the original information memory to the display memory,
      for selectively deleting the information of the group designated by the inputting means out of the information grouped into the plural groups of the display memory transmitted from the original information memory,
      for moving information of the remaining groups in the display memory, which is separated into plural parts by space which was occupied by the information of the deleted group, so that the plural parts of the remaining information comes close to each other and the display means displays the information of the remaining groups,
      for displaying an identifier which indicates a start position or an end position at which the information of the deleted group was displayed, together with the information of the remaining groups, and
      for transmitting the information of the deleted group from the original information memory to the display memory, and inserting the information of the deleted group at the pre-delete position to be displayed by the display means.

4. A data processing apparatus which creates a chart composed of at least one row and plural columns, or of plural rows and at least one column, from information in the form of a chart, stored in a memory, the data processing apparatus comprising:
   inputting means for designating a row or column;
   display means for displaying the information in the form of a chart;
   deleting means for deleting information of a row or column designated by the inputting means from the information stored in the memory in response to an output from the inputting means, closely moving rows or columns of remaining information, and displaying the remaining information by the display means;
   identifier display control means for displaying an identifier which denotes a position at which the information of the row or column which was deleted by the display means was displayed; and
   restoring means for inserting and restoring the deleted information which was deleted by the deleting means, at a position designated by the identifier, in response to the output from the inputting means to display the deleted information.

5. The data processing apparatus of claim 4, wherein the identifier display control means controls so that an identifier is displayed to denote a start position or an end position of the position at which the deleted row or column was displayed before.

6. The data processing apparatus of claim 4, wherein
   the deleting means deletes information of successive rows or columns at one time,
   the inputting means selectively designates plural deleted rows or columns, and
   the restoring means inserts, restores and displays the information of only rows or columns which are selectively designated by the inputting means, at the position denoted by the identifier, in response to an output from the inputting means.

7. The data processing apparatus of claim 4, wherein
   the deleting means deletes information of plural successive rows or columns at one time, an identifier displays at least a portion of information of deleted successive rows or columns, row by row or column by column in the form of a menu display, the inputting means selectively designate rows or columns which are displayed in the menu display, and among the information of the deleted plural successive rows or columns which was deleted by the deleting means, and the restoring means inserts and restores information of a row or column which is selectively designated by the inputting means, at a position which is denoted by the identifier.

8. The data processing apparatus of claim 7, the data processing apparatus further comprising switch setting means for switching and setting of whether an identifier is of a menu display, wherein the identifier display control means responds to an output from the switch setting means, the identifier display control means displays an identifier at a position outside a chart displayed by the display means, when a row or column is deleted, and the identifier display control means allows an identifier of a menu display, only when the identifier is set so as to display a menu display.

9. The data processing apparatus of claim 7, wherein the menu display of an identifier is displayed in a region stretching from a region outside a chart displayed by the display means to a region where the chart is displayed, and displays except the menu display which are displayed within the same display region as the menu display are deleted.

10. The data processing apparatus of claim 7, wherein the menu display of the identifier is displayed in an enlarged area which is enlarged by shifting the chart within the display screen and thereby expanding an area surrounding the chart larger than before shifting of the chart.

11. The data processing apparatus of claim 4, the data processing apparatus further comprising identifier display selecting means for selecting whether to display an identifier, wherein when display of the identifier is selected, the identifier display control means displays the identifier, and when not-display of the identifier is selected, the identifier display control means does not display the identifier.

12. The data processing apparatus of claim 11, wherein the identifier display selecting means includes:

password inputting means for inputting a password which consists of predetermined characters;

a password memory for storing the password;

comparator means for comparing a password input via the password inputting means with the password stored in the password memory; and means for allowing selection of display of an identifier when the passwords coincide with each other, in response to an output from the comparator means.

13. The data processing apparatus of any one of claims 3 to 12, wherein the display means includes a nearly flat visual display region, the inputting means is flat two-dimensional position detecting means disposed on the visual display region, which is translucent, and a position corresponding to the identifier is entered.

14. The data processing apparatus of any one of claims 3 to 12, wherein the display means is composed of row electrodes, column electrodes, and a dielectric material interposed between the row and column electrodes, intersections of the row and column electrodes form picture elements, and display driving means selectively applies a voltage between the row and column electrodes and scan the row and column electrodes so that displaying is conducted by the display means, and wherein the inputting means includes:

detection means for detecting an electric signal electrostatically or inductively coupled to the row and column electrodes; and guiding means for guiding an output which designates a row or column which is related to a display character displayed by the display means at a position at which the electric signal is generated, the data processing apparatus further comprising displaying/inputting control means for alternately allowing display operation by the display means and detection operation by the detection means of the inputting means.

15. The data processing apparatus of claim 13 or, wherein the restoring means includes position judging means at the position of the display region of the display means which is equivalent to a two-dimensional position which is entered by the inputting means, the position judging means judging whether the identifier is displayed, and when the position judging means judges that a detected two-dimensional position is equivalent to the position at which the identifier is displayed, the restoring means restores a deleted row or column.

16. A data processing apparatus comprising:

(a) an original information memory for storing information in the form of a chart, grouped into plural groups;

(b) display means;

(c) a first display memory for storing the information grouped into plural groups, in a form in which the information can be displayed by the display means;

(d) a second display memory for storing contents which are to be displayed in the display means;

(e) inputting means for designating the groups via input operation;

(f) control means for responding to an output of the inputting means, for transmitting the contents stored in the original information memory to the first and the second display memory, and developing the contents in a form in which the information can be displayed by the display means, for selectively deleting information of a group designated by the inputting means from the information grouped into the plural groups transmitted to the second display memory from the original information memory, for moving remaining information which is separated into plural parts by space which was occupied by the information of the deleted group, so that the plural parts of the remaining information comes close to each other and the display means displays the information of the remaining groups, for instructing the display means to display an identifier, which denotes a start position or an end position at which the information of the deleted group was displayed, together with the information of the remaining groups, for transmitting the information of the deleted group from the first display memory to the second display memory, and for inserting the information of the deleted group at the pre-delete position and instructing the display means to display the information of the deleted group along with the information of the remaining groups.

17. The data processing apparatus of claim 7, wherein the deleting means includes a delete memory which stores at least a portion of information which is used for a menu display, out of information of a deleted row or column, and an identifier displays the contents of the delete memory row by row or column by column in the form of a menu display.

18. The data processing apparatus of claim 7, wherein the identifier display control means further includes menu selecting means which sets whether to allow the identifier of a menu display, and only when the menu selecting means sets to allow a menu display, the identifier is displayed in the form of a menu display.

19. The data processing apparatus of claim 3, wherein the display memory stores contents which are to be displayed, in correspondence to a virtual display screen larger than a display screen of the display means.

20. The data processing apparatus of claim 14, wherein the restoring means includes position judging means at the position of the display region of the display means which is equivalent to a two-dimensional position which is entered by the inputting means, the position judging means judging whether the identifier is displayed, and when the position judging means judges that a detected two-dimensional position is equivalent to the position at which the identifier is displayed, the restoring means restores a deleted row or column.

21. A data processing apparatus, comprising:

a memory for storing chart information grouped into plural groups;

a display for displaying the chart information, the display including a display memory; and a controller for responding to an input designating a selected one of said plural groups for deletion from the display, so that only information of the remaining groups are displayed, said controller further for moving information of the remaining groups stored in the display memory into a space previously occupied by information of the deleted group, so that plural parts of the information of the remaining groups are closer to each other, and said controller still further for displaying an identifier which indicates a start or end position at which information of the deleted group is displayed, together with information of the remaining groups.

22. The data processing apparatus of claim 21, wherein the display includes a nearly flat visual display region, the inputting means is a flat and translucent two-dimensional position detecting means disposed on the visual display region, and wherein a position corresponding to the identifier is entered.

23. The data processing apparatus of claim 21, wherein the display further includes:

row electrodes, column electrodes, and a dielectric materiel interposed between the row and column electrodes, wherein intersections of the row and column electrodes form picture elements;

display driving means for selectively applying a voltage between the row and column electrodes and for scanning the row and column electrodes so that displaying is conducted by the display; and wherein the inputting means includes:

detection means for detecting an electric signal electrostatically or inductively coupled to the row and column electrodes; and guiding means for guiding an output which designates a row or column which is related to a display character displayed by the display at a position at which the electric signal is generated.

24. The data processing apparatus of claim 23, further comprising displaying/inputting control means for alternately allowing display operation by the display and detection operation by the detection means.

25. The data processing apparatus of claim 21, wherein the display memory stores contents which are to be displayed, in correspondence to a virtual display screen which is larger than a display screen of the display.

* * * * *